US008706262B2

(12) United States Patent
Nishiyama et al.

(10) Patent No.: US 8,706,262 B2
(45) Date of Patent: Apr. 22, 2014

(54) CPU UNIT OF PLC, SYSTEM PROGRAM FOR PLC, AND RECORDING MEDIUM STORING SYSTEM PROGRAM FOR PLC

(75) Inventors: Yoshihide Nishiyama, Yokohama (JP); Shigeyuki Eguchi, Joyo (JP); Osamu Hamasaki, Kyoto (JP); Tatsuya Kojima, Kyoto (JP)

(73) Assignee: Omron Corporation, Kyoto (JP)

( * ) Notice: Subject to any disclaimer, the term of this patent is extended or adjusted under 35 U.S.C. 154(b) by 193 days.

(21) Appl. No.: 13/399,128

(22) Filed: Feb. 17, 2012

(65) Prior Publication Data

US 2012/0239172 A1 Sep. 20, 2012

Related U.S. Application Data

(63) Continuation of application No. PCT/JP2011/056771, filed on Mar. 22, 2011.

(30) Foreign Application Priority Data

Mar. 15, 2011 (JP) .................................. 2011-056773
May 24, 2011 (JP) .................................. 2011-115812

(51) Int. Cl.
*G06F 3/00* (2006.01)
*G06F 5/00* (2006.01)
*G05B 15/00* (2006.01)

(52) U.S. Cl.
USPC ...................... 700/1; 710/52; 710/58; 710/61

(58) Field of Classification Search
USPC .................................... 710/52, 58, 61; 700/1
See application file for complete search history.

(56) References Cited

U.S. PATENT DOCUMENTS

| | | | | |
|---|---|---|---|---|
| 3,812,475 | A | * 5/1974 | Christiansen et al. | 710/7 |
| 4,065,862 | A | * 1/1978 | Meyer | 713/400 |
| 5,432,911 | A | 7/1995 | Mura et al. | |
| 2002/0052998 | A1 * | 5/2002 | Ito et al. | 710/305 |
| 2006/0075162 | A1 * | 4/2006 | Shiraishi | 710/52 |
| 2007/0297433 | A1 * | 12/2007 | Lin et al. | 370/412 |

FOREIGN PATENT DOCUMENTS

| | | |
|---|---|---|
| JP | 63-298503 | 12/1988 |
| JP | 5-173986 | 7/1993 |
| JP | 10-21206 | 1/1998 |
| JP | 2000-29508 | 1/2000 |
| JP | 2000-105604 | 4/2000 |
| JP | 2000-293210 | 10/2000 |
| JP | 2007-140655 | 6/2007 |
| JP | 2009-157752 | 7/2009 |

* cited by examiner

*Primary Examiner* — Ronald Hartman, Jr.
(74) *Attorney, Agent, or Firm* — Greenblum & Bernstein, P.L.C.

(57) ABSTRACT

A system program causes, as an execution preparation process for a control operation of a PLC, execution of a process for generating a reception buffer for storing received input data, and execution of a process for generating, for each input data referred to by a control program, an input synchronization buffer used by the control program as a reference target for the input data. The system program causes, as an execution control process for the control operation of the PLC, execution of an input copy process for copying the received input data from the reception buffer to the input synchronization buffer corresponding to the input data, and execution of a control program start process for starting execution of the control program.

44 Claims, 33 Drawing Sheets

CPU UNIT OF PLC, SYSTEM PROGRAM FOR PLC, AND RECORDING MEDIUM STORING SYSTEM PROGRAM FOR PLC

CROSS-REFERENCE TO RELATED APPLICATIONS

This is a continuation application of PCT/JP2011/056771 filed Mar. 22, 2011, designating the United States of America, the disclosure of which, including the specification, drawings, and claims, is incorporated by reference in its entirety. The disclosures of Japanese Patent Application No. 2011-115812 filed May 24, 2011 and Japanese Patent Application No. 2011-056773 filed Mar. 15, 2011, including the specifications, drawings, and claims are expressly incorporated herein by reference in their entireties.

FIELD OF THE DISCLOSURE

The present disclosure relates to data transfer between an input/output process and a control program in a PLC (Programmable Logic Controller, also referred to as a programmable controller) used for controlling operation of a machine, equipment, etc.

BACKGROUND INFORMATION

A PLC includes a plurality of units, such as a CPU (Central Processing Unit) unit including a microprocessor which executes a control program, an IO (Input Output) unit, which receives a signal from an external switch or sensor and outputs a signal to an external relay or actuator, or the like. The CPU unit controls an object of control by repeating transmission of output data to other units, reception of input data from other units, and execution of a control program for producing the output data using the input data. The control program includes a user program which is produced based on a user's purpose of control. The control program may include a motion operation program. The user program instructs the CPU unit to execute the motion operation program.

As described in Patent Document 1 (JP 2000-105604 A), in conventional PLCs, one sequence program (control program) and one set of output refresh and input refresh are executed in each control cycle. In this case, the control cycle is equal to the execution cycle of the control program.

In PLCs, it is known that a plurality of control programs may be executed in a time-division manner.

Patent Document 2 (JP 2007-140655 A) describes a device in which a motion control function of controlling a motor and a PLC function of executing a sequence operation are processed by a single CPU. In the device, "a fixed-cycle motion control process and each axial process" and "a high-speed sequence process" are executed in each cycle of a basic clock, and "a low-speed sequence process" or "a non-fixed-cycle motion control process" is executed in the remainder of each basic clock cycle. Patent Document 2 also describes that when the low-speed sequence process is not completed within a basic clock cycle, the remainder of the process is executed after being suspended for a period of time corresponding to a predetermined number of basic clocks (e.g., paragraph 0004).

Patent Document 3 (JP 2000-293210 A) describes, relating to an operation of a control device, that a plurality of refresh blocks for performing an input process and a plurality of refresh blocks for performing an output process are provided in addition to periodic tasks (control program), and some of the refresh blocks and some of the periodic tasks are selectively executed in each control cycle.

PATENT DOCUMENTS

Patent Document 1: JP 2000-105604 A
Patent Document 2: JP 2007-140655 A
Patent Document 3: JP 2000-293210 A

Problem to be Solved by the Disclosure

In a conventional PLC which executes one set of input and output processes (input/output process) and one control program in each control cycle, there is a one-to-one correspondence between input/output processes and control programs. Therefore, it is easy to transfer input data and output data between an input/output process and a control program. However, in some cases, such as when an input/output process and a control program may have different execution periods, when a plurality of control programs may be related to one set of input and output processes, or when a plurality of sets of input and output processes are related to one control program, there is not a one-to-one correspondence between input/output processes and control programs. In these cases, a person who produces control programs needs to perform programming so that input data and output data are appropriately transferred between input/output processes and control programs, with the legitimate knowledge of a system execution control form (scheduling) relating to execution of the control program and execution of the input/output process. This places a significant burden on the person who produces the control program.

In particular, if the same input data is used in a plurality of control programs, there may be a conflict between accesses from the control programs to the input data. Also, input data which is being used may be overwritten by, for example, execution of one control program during execution of another control program, or reception of new input data. To prevent these things, the control program itself may need to copy the input data to its own local variable before using the input data.

It is an object of the present disclosure to, even when there is not a one-to-one correspondence between input/output processes and control programs, appropriately allow the control program to use at least received input data without the need of a process which is performed by the control program itself.

SUMMARY OF THE DISCLOSURE

According to an aspect of the present disclosure, a CPU unit (a central processor) of a PLC controlling an object of control is provided. The CPU unit of a PLC includes a microprocessor, storage means (a storage), and a communication circuit. The CPU unit of a PLC is configured to control the object of control by repeating transmission of output data, reception of input data, and execution of a control program producing (generating) the output data using the input data. The storage means is used for storing the control program and a system program. The microprocessor executes the system program and the control program stored in the storage means. The communication circuit transmits the output data and receives the input data. The system program includes, as an execution preparation process for a control operation of the PLC, a process for producing (generating) a reception buffer for storing the received input data in the storage means, and a process for producing (generating), for each input data referred to by the control program, an input synchronization buffer used by the control program as a reference target for the input data. The system program includes, as an execution control process for the control operation of the PLC, an input copy process for copying the received input data from the reception buffer to the input synchronization buffer corresponding to the input data, and a control program start process for starting execution of the control program.

Preferably, the process for producing the input synchronization buffer is a process for producing (generating) a first input synchronization buffer and a second input synchronization buffer as a set of input synchronization buffers, for each input data referred to by the control program. To the first input synchronization buffer and the second input synchronization buffer, any (at least one of) of a write target state in which the input data can be copied from the reception buffer and a reference target state in which reference can be made by the control program, are allocated without overlapping. The input copy process is a process for copying to that input synchronization buffer which is in the write target state.

More preferably, the process for producing the input synchronization buffer is a process for producing (generating) the first input synchronization buffer, the second input synchronization buffer, and a third input synchronization buffer as a set of input synchronization buffers for each of the input data referred to by the control program. To the first input synchronization buffer, the second input synchronization buffer, and the third input synchronization buffer, any (at least one of) of the write target state, the reference target state, and a standby state are allocated without overlapping. The input copy process further includes a first interchange process for interchanging the write target state and the standby state of the input synchronization buffer in the write target state as a copy destination and the input synchronization buffer in the standby state belonging to the same set as the input synchronization buffer. The control program start process further includes a second interchange process for interchanging, on condition that as regards the input synchronization buffers for the control program of which execution is to be started, the input synchronization buffer storing latest data is in the standby state, the standby state and the reference target state of the input synchronization buffer in the standby state and the input synchronization buffer in the reference target state.

More preferably, the system program further includes, as the execution preparation process for the control operation of the PLC, a process for producing (generating) a latest input data update flag in the storage means, for each control program. The input copy process further includes a process for turning on the latest input data update flag related to the input copy. The control program start process further includes, on condition that the latest input data update flag related to the input synchronization buffers for the control program of which execution is to be started is on, the second interchange process and a process for turning off the latest input data update flag, whereby the second interchange process executed on condition that the input synchronization buffer storing the latest data is in the standby state is realized.

Alternatively, more preferably, the system program further includes, as the execution preparation process for the control operation of the PLC, a process for producing (generating) a latest state recording area in the storage means. The input copy process further includes a process for recording that the input synchronization buffer as a copy destination is in the latest state in the latest state recording area. The control program start process further includes the second interchange process executed on condition that the input synchronization buffer in the latest state specified by contents in the latest state recording area is in the standby state.

Alternatively, preferably, the control program start process further includes a third interchange process for interchanging, on condition that as regards the input synchronization buffers for the control program of which execution is to be started, the input synchronization buffer storing latest data is in the write target state, the write target state and the reference target state of the input synchronization buffer in the write target state and the input synchronization buffer in the reference target state.

Preferably, the process for producing the input synchronization buffer is a process for producing (generating) a first input synchronization buffer and a second input synchronization buffer as a set of synchronization buffers, for each input data referred to by the control program. The system program further includes, as the execution preparation process for the control operation of the PLC, a process for producing (generating) a latest state recording area in the storage means. The input copy process further includes a process for recording that the input synchronization buffer as a copy destination is in the latest state in the latest state recording area. The control program start process further includes a process for setting the input synchronization buffer in the latest state specified by contents in the latest state recording area to the reference target state to be referred to in executing the control program.

Preferably, the control program start process further includes a process for setting the input synchronization buffer to be referred to by the control program of which execution is to be started to a write protected state. The system program further includes, as the execution control process for the control operation of the PLC, a process for cancelling, when execution of the control program ends, the write protected state of the synchronization buffer that has been in the write protected state. The input copy process is a process executed on condition that the input synchronization buffer as a copy destination is not in the write protected state.

Preferably, the process for producing the input synchronization buffer is a process for producing (generating) a first input synchronization buffer and a second input synchronization buffer as a set of synchronization buffers, for each input data referred to by the control program. The second input synchronization buffer is an input synchronization buffer used as a reference target by the control program referring to input data. The input copy process is a process for copying to the first input synchronization buffer. The control program start process further includes a process for copying data stored in the first input synchronization buffer to the second input synchronization buffer before starting execution of the control program.

Preferably, the system program further includes, as the execution preparation process for the control operation of the PLC, a process for producing a transmission buffer for storing output data to be transmitted in the storage means, and a process for producing (generating) an output synchronization buffer for storing the output data to be copied to the transmission buffer in the storage means, for each output data. The system program further includes, as the execution control process for the control operation of the PLC, an output copy process for copying the output data from the output synchronization buffer to the transmission buffer.

More preferably, the output copy process is a process for copying the output data when execution of the control program ends.

Alternatively, more preferably, the system program further includes, as the execution preparation process for the control operation of the PLC, a process for producing (generating) an operation buffer used by the control program for storing the output data, in the storage means. The process for producing the output synchronization buffer is a process for producing (generating) a first output synchronization buffer, a second output synchronization buffer, and a third output synchronization buffer as a set of output synchronization buffers for each of the output data. To the first output synchronization buffer, the second output synchronization buffer and the third output synchronization buffer, any (at least one of) of a write target state in which the output data can be copied from the operation buffer, a reference target state in which reference can be made for copying to the transmission buffer, and a standby state are allocated without overlapping. The system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer. The output copy process is for executing, on condition that the output synchronization buffer storing the latest data is in the standby state, a fifth interchange process for interchanging the standby state and the reference target state of the output synchronization buffer in the standby state and the output synchronization buffer in the reference target state, and copying the output data from the output synchronization buffer set to the reference target state to the transmission buffer.

Preferably, reception of the input data is executed at each control cycle. The input copy process is a process for copying the received input data from the reception buffer to the input synchronization buffer corresponding to the input data, on condition that the input data is received at a reception timing related to the control cycle in which an execution cycle of the control program started. The control program start process is a process for starting execution of the control program at every the execution cycle as an integral multiple of the control cycle.

Preferably, the process for producing the input synchronization buffer is a process for producing (generating) a first input synchronization buffer, a second input synchronization buffer, and a third input synchronization buffer as a set of input synchronization buffers, for each input data referred to by the control program. To the first input synchronization buffer, the second input synchronization buffer, and the third input synchronization buffer, any (at least one of) of a write target state in which the input data can be copied from the reception buffer, a reference target state in which reference can be made by the control program, and a standby state are allocated without overlapping. Reception of the input data is executed at each control cycle. The input copy process is a process for copying to the input synchronization buffer in the write target state and further executing a first interchange process for interchanging the write target state and the standby state of the input synchronization buffer in the write target state as a copy destination and the input synchronization buffer in the standby state belonging to the same set as the input synchronization buffer. The system program further includes, as an execution control process for the control operation of the PLC, an execution cycle input initial process for executing, on condition that it is the control cycle in which an execution cycle of the control program started, a second interchange process for interchanging the standby state and the reference target state of the input synchronization buffer in the standby state and the input synchronization buffer in the reference target state. The control program start process is a process for starting execution of the control program at every the execution cycle as an integer multiple of the control cycle.

Preferably, the system program further includes, as the execution preparation process for the control operation of the PLC, a process for producing (generating) a transmission buffer for storing output data to be transmitted in the storage means, and a process for producing (generating) an output synchronization buffer for storing the output data to be copied to the transmission buffer in the storage means, for each output data. The system program further includes, as the execution control process for the control operation of the PLC, an output copy process for copying the output data from the output synchronization buffer to the transmission buffer, at a timing when the output data is to be transmitted from the transmission buffer in a first control cycle of the execution cycle following the execution cycle in which the control program that produced the output data is executed.

Preferably, the system program further includes, as the execution preparation process for the control operation of the PLC, a process for producing (generating) an operation buffer used by the control program for storing the output data, in the storage means. The process for producing the output synchronization buffer is a process for producing (generating) a first output synchronization buffer, a second output synchronization buffer and a third output synchronization buffer as a set of output synchronization buffers for each of the output data. To the first output synchronization buffer, the second output synchronization buffer, and the third output synchronization buffer, any (at least one of) of a write target state in which the output data can be copied from the operation buffer, a reference target state in which reference can be made for copying to the transmission buffer, and a standby state are allocated without overlapping. The system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer. The output copy process is a process for copying the output data from the output synchronization buffer in the reference target state to the transmission buffer after the start of each control cycle before transmission of the output data from the transmission buffer, executing, on condition that it is the control cycle in which an execution cycle of the control program started, a fifth interchange process for interchanging the standby state and the reference target state of the output synchronization buffer in the standby state and the output synchronization buffer in the reference target state, before execution of the copy to the transmission buffer, and thereby copying the output data from the output synchronization buffer to the transmission buffer at a timing when the output data is to be transmitted from the transmission buffer in a first control cycle of the execution cycle following the execution cycle in which the control program that produced the output data is executed.

According to another aspect of the present disclosure, for a CPU unit of a PLC including a microprocessor, storage means (a storage), and a communication circuit, controlling an object of control by repeating transmission of output data, reception of input data and execution of a control program producing (generating) the output data using the input data, a PLC system program stored in the storage means to be executed by the microprocessor, is provided. The storage unit is used for storing the control program and the system program. The microprocessor executes the control program in addition to the system program. The communication circuit transmits the output data and receives the input data. The system program causes, as an execution preparation process for a control operation of the PLC, execution of a process for producing (generating) a reception buffer for storing the received input data in the storage means, and execution of a process for producing (generating), for each input data referred to by the control program, an input synchronization buffer used by the control program as a reference target for the input data. The system program causes, as an execution control process for the control operation of the PLC, execution of an input copy process for copying the received input data from the reception buffer to the input synchronization buffer corresponding to the input data, and execution of a control program start process for starting execution of the control program.

Preferably, the process for producing the input synchronization buffer is a process for producing (generating) a first input synchronization buffer and a second input synchronization buffer as a set of input synchronization buffers, for each input data referred to by the control program. T the first input synchronization buffer and the second input synchronization buffer, any (at least one of) of a write target state in which the input data can be copied from the reception buffer and a reference target state in which reference can be made by the control program, are allocated without overlapping. The input copy process is a process for copying to that input synchronization buffer which is in the write target state.

More preferably, the process for producing the input synchronization buffer is a process for producing (generating) the first input synchronization buffer, the second input synchronization buffer and a third input synchronization buffer as a set of input synchronization buffers for each of the input data referred to by the control program. To the first input synchronization buffer, the second input synchronization buffer, and the third input synchronization buffer, any (at least one of) of the write target state, the reference target state, and a standby state are allocated without overlapping. The input copy process further includes a first interchange process for interchanging the write target state and the standby state of the input synchronization buffer in the write target state as a copy destination and the input synchronization buffer in the standby state belonging to the same set as the input synchronization buffer. The control program start process further includes a second interchange process for interchanging, on condition that as regards the input synchronization buffers for the control program of which execution is to be started, the input synchronization buffer storing latest data is in the standby state, the standby state and the reference target state of the input synchronization buffer in the standby state and the input synchronization buffer in the reference target state.

Alternatively, more preferably, the control program start process further includes a third interchange process for interchanging, on condition that as regards the input synchronization buffers for the control program of which execution is to be started, the input synchronization buffer storing latest data is in the write target state, the write target state and the reference target state of the input synchronization buffer in the write target state and the input synchronization buffer in the reference target state.

Alternatively, preferably, the process for producing the input synchronization buffer is a process for producing (generating) a first input synchronization buffer and a second input synchronization buffer as a set of synchronization buffers, for each input data referred to by the control program. The system program further includes, as the execution preparation process for the control operation of the PLC, a process for producing (generating) a latest state recording area in the storage means. The input copy process further includes a process for recording that the input synchronization buffer as a copy destination is in the latest state in the latest state recording area. The control program start process further includes a process for setting the input synchronization buffer in the latest state specified by contents in the latest state recording area to the reference target state to be referred to execute the control program.

Alternatively, preferably, the control program start process further includes a process for setting the input synchronization buffer to be referred to by the control program of which execution is to be started to a write protected state. The system program further includes, as the execution control process for the control operation of the PLC, a process for cancelling, when execution of the control program ends, the write protected state of the synchronization buffer that has been in the write protected state. The input copy process is a process executed on condition that the input synchronization buffer as a copy destination is not in the write protected state.

Alternatively, preferably, the process for producing the input synchronization buffer is a process for producing (generating) a first input synchronization buffer and a second input synchronization buffer as a set of synchronization buffers, for each input data referred to by the control program. The second input synchronization buffer is an input synchronization buffer used as a reference target by the control program referring to input data. The input copy process is a process for copying to the first input synchronization buffer. The control program start process further includes a process for copying data stored in the first input synchronization buffer to the second input synchronization buffer before starting execution of the control program.

Preferably, the system program further includes, as the execution preparation process for the control operation of the PLC, a process for producing (generating) a transmission buffer for storing output data to be transmitted in the storage means, and a process for producing (generating) an output synchronization buffer for storing the output data to be copied to the transmission buffer in the storage means, for each output data. The system program further includes, as the execution control process for the control operation of the PLC, an output copy process for copying the output data from the output synchronization buffer to the transmission buffer.

More preferably, the output copy process is a process for copying the output data when execution of the control program ends.

Alternatively, more preferably, the system program further includes, as the execution preparation process for the control operation of the PLC, a process for producing (generating) an operation buffer used by the control program for storing the output data, in the storage means. The process for producing the output synchronization buffer is a process for producing (generating) a first output synchronization buffer, a second output synchronization buffer, and a third output synchronization buffer as a set of output synchronization buffers for each of the output data. To the first output synchronization buffer, the second output synchronization buffer, and the third output synchronization buffer, any (at least one of) of a write target state in which the output data can be copied from the operation buffer, a reference target state in which reference can be made for copying to the transmission buffer, and a standby state are allocated without overlapping. The system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer. The output copy process is for executing, on condition that the output synchronization buffer storing the latest data is in the standby state, a fifth interchange process for interchanging the standby state and the reference target state of the output synchronization buffer in the standby state and the output synchronization buffer in the reference target state, and copying the output data from the output synchronization buffer set to the reference target state to the transmission buffer.

Preferably, reception of the input data is executed at each control cycle. The input copy process is a process for copying the received input data from the reception buffer to the input synchronization buffer corresponding to the input data, on condition that the input data is received at a reception timing related to the control cycle in which an execution cycle of the control program started. The control program start process is a process for starting execution of the control program at every the execution cycle as an integer multiple of the control cycle.

Preferably, the process for producing the input synchronization buffer is a process for producing (generating) a first input synchronization buffer, a second input synchronization buffer, and a third input synchronization buffer as a set of input synchronization buffers, for each input data referred to by the control program. To the first input synchronization buffer, the second input synchronization buffer, and the third input synchronization buffer, any (at least one of) of a write target state in which the input data can be copied from the reception buffer, a reference target state in which reference can be made by the control program, and a standby state are allocated without overlapping. Reception of the input data is executed at each control cycle. The input copy process is a process for copying to the input synchronization buffer in the write target state and further executing a first interchange process for interchanging the write target state and the standby state of the input synchronization buffer in the write target state as a copy destination and the input synchronization buffer in the standby state belonging to the same set as the input synchronization buffer. The system program further includes, as an execution control process for the control operation of the PLC, an execution cycle input initial process for executing, on condition that it is the control cycle in which an execution cycle of the control program started, a second interchange process for interchanging the standby state and the reference target state of the input synchronization buffer in the standby state and the input synchronization buffer in the reference target state. The control program start process is a process for starting execution of the control program at every the execution cycle as an integer multiple of the control cycle.

Preferably, the system program further includes, as the execution preparation process for the control operation of the PLC, a process for producing a transmission buffer for storing output data to be transmitted in the storage means, and a process for producing (generating) an output synchronization buffer for storing the output data to be copied to the transmission buffer in the storage means, for each output data. The system program further includes, as the execution control process for the control operation of the PLC, an output copy process for copying the output data from the output synchronization buffer to the transmission buffer, at a timing when the output data is to be transmitted from the transmission buffer in a first control cycle of the execution cycle following the execution cycle in which the control program that produced the output data is executed.

Preferably, the system program further includes, as the execution preparation process for the control operation of the PLC, a process for producing an operation buffer used by the control program for storing the output data, in the storage means. The process for producing the output synchronization buffer is a process for producing (generating) a first output synchronization buffer, a second output synchronization buffer and a third output synchronization buffer as a set of output synchronization buffers for each of the output data. To the first output synchronization buffer, the second output synchronization buffer, and the third output synchronization buffer, any (at least one of) of a write target state in which the output data can be copied from the operation buffer, a reference target state in which reference can be made for copying to the transmission buffer, and a standby state are allocated without overlapping. The system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer. The output copy process is a process for copying the output data from the output synchronization buffer in the reference target state to the transmission buffer after the start of each control cycle before transmission of the output data from the transmission buffer, executing, on condition that it is the control cycle in which an execution cycle of the control program started, a fifth interchange process for interchanging the standby state and the reference target state of the output synchronization buffer in the standby state and the output synchronization buffer in the reference target state, before execution of the copy to the transmission buffer, and thereby copying the output data from the output synchronization buffer to the transmission buffer at a timing when the output data is to be transmitted from the transmission buffer in a first control cycle of the execution cycle following the execution cycle in which the control program that produced the output data is executed.

According to still another aspect of the present disclosure, for a CPU unit of a PLC including a microprocessor, storage means (a storage), and a communication circuit, controlling an object of control by repeating transmission of output data, reception of input data and execution of a control program producing (generating) the output data using the input data, a recording medium storing a PLC system program stored in the storage means to be executed by the microprocessor, is provided. The storage unit is used for storing the control program and the system program. The microprocessor executes the control program in addition to the system program. The communication circuit transmits the output data and receives the input data. The system program causes, as an execution preparation process for a control operation of the PLC, execution of a process for producing (generating) a reception buffer for storing the received input data in the storage means, and execution of a process for producing (generating), for each input data referred to by the control program, an input synchronization buffer used by the control program as a reference target for the input data. The system program causes, as an execution control process for the control operation of the PLC, execution of an input copy process for copying the received input data from the reception buffer to the input synchronization buffer corresponding to the input data, and execution of a control program start process for starting execution of the control program.

Preferably, the process for producing the input synchronization buffer is a process for producing (generating) a first input synchronization buffer and a second input synchronization buffer as a set of input synchronization buffers, for each input data referred to by the control program. To the first input synchronization buffer and the second input synchronization buffer, any (at least one of) of a write target state in which the input data can be copied from the reception buffer and a reference target state in which reference can be made by the control program, are allocated without overlapping. The input copy process is a process for copying to that input synchronization buffer which is in the write target state.

More preferably, the process for producing the input synchronization buffer is a process for producing (generating) the first input synchronization buffer, the second input synchronization buffer, and a third input synchronization buffer as a set of input synchronization buffers for each of the input data referred to by the control program. To the first input synchronization buffer, the second input synchronization buffer, and the third input synchronization buffer, any (at least one of) of the write target state, the reference target state, and a standby state are allocated without overlapping. The input copy process further includes a first interchange process for interchanging the write target state and the standby state of the input synchronization buffer in the write target state as a copy destination and the input synchronization buffer in the standby state belonging to the same set as the input synchronization buffer. The control program start process further includes a second interchange process for interchanging, on condition that as regards the input synchronization buffers for the control program of which execution is to be started, the input synchronization buffer storing latest data is in the standby state, the standby state and the reference target state of the input synchronization buffer in the standby state and the input synchronization buffer in the reference target state.

Alternatively, more preferably, the control program start process further includes a third interchange process for interchanging, on condition that as regards the input synchronization buffers for the control program of which execution is to be started, the input synchronization buffer storing latest data is in the write target state, the write target state and the reference target state of the input synchronization buffer in the write target state and the input synchronization buffer in the reference target state.

Alternatively, preferably, the process for producing the input synchronization buffer is a process for producing (generating) a first input synchronization buffer and a second input synchronization buffer as a set of synchronization buffers, for each input data referred to by the control program. The system program further includes, as the execution preparation process for the control operation of the PLC, a process for producing (generating) a latest state recording area in the storage means. The input copy process further includes a process for recording that the input synchronization buffer as a copy destination is in the latest state in the latest state recording area. The control program start process further includes a process for setting the input synchronization buffer in the latest state specified by contents in the latest state recording area to the reference target state to be referred to when executing the control program.

Alternatively, preferably, the control program start process further includes a process for setting the input synchronization buffer to be referred to by the control program of which execution is to be started to a write protected state. The system program further includes, as the execution control process for the control operation of the PLC, a process for cancelling, when execution of the control program ends, the write protected state of the synchronization buffer that has been in the write protected state. The input copy process is a process executed on condition that the input synchronization buffer as a copy destination is not in the write protected state.

Alternatively, preferably, the process for producing the input synchronization buffer is a process for producing (generating) a first input synchronization buffer and a second input synchronization buffer as a set of synchronization buffers, for each input data referred to by the control program. The second input synchronization buffer is an input synchronization buffer used as a reference target by the control program referring to input data. The input copy process is a process for copying to the first input synchronization buffer. The control program start process further includes a process for copying data stored in the first input synchronization buffer to the second input synchronization buffer before starting execution of the control program.

Preferably, the system program further includes, as the execution preparation process for the control operation of the PLC, a process for producing (generating) a transmission buffer for storing output data to be transmitted in the storage means, and a process for producing (generating) an output synchronization buffer storing the output data to be copied to the transmission buffer in the storage means, for each output data. The system program further includes, as the execution control process for the control operation of the PLC, an output copy process for copying the output data from the output synchronization buffer to the transmission buffer.

More preferably, the output copy process is a process for copying the output data when execution of the control program ends.

Alternatively, more preferably, the system program further includes, as the execution preparation process for the control operation of the PLC, a process for producing (generating) an operation buffer used by the control program for storing the output data, in the storage means. The process for producing the output synchronization buffer is a process for producing (generating) a first output synchronization buffer, a second output synchronization buffer, and a third output synchronization buffer as a set of output synchronization buffers for each of the output data. To the first output synchronization buffer, the second output synchronization buffer, and the third output synchronization buffer, any (at least one of) of a write target state in which the output data can be copied from the operation buffer, a reference target state in which reference can be made for copying to the transmission buffer, and a standby state are allocated without overlapping. The system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer. The output copy process is for executing, on condition that the output synchronization buffer storing the latest data is in the standby state, a fifth interchange process for interchanging the standby state and the reference target state of the output synchronization buffer in the standby state and the output synchronization buffer in the reference target state, and copying the output data from the output synchronization buffer set to the reference target state to the transmission buffer.

Preferably, reception of the input data is executed at each control cycle. The input copy process is a process for copying the received input data from the reception buffer to the input synchronization buffer corresponding to the input data, on condition that the input data is received at a reception timing related to the control cycle in which an execution cycle of the control program started. The control program start process is a process for starting execution of the control program at every the execution cycle as an integer multiple of the control cycle.

Preferably, the process for producing the input synchronization buffer is a process for producing (generating) a first input synchronization buffer, a second input synchronization buffer, and a third input synchronization buffer as a set of input synchronization buffers, for each input data referred to by the control program. To the first input synchronization buffer, the second input synchronization buffer, and the third input synchronization buffer, any (at least one of) of a write target state in which the input data can be copied from the reception buffer, a reference target state in which reference can be made by the control program, and a standby state are allocated without overlapping. Reception of the input data is executed at each control cycle. The input copy process is a process for copying to the input synchronization buffer in the write target state and further executing a first interchange process for interchanging the write target state and the standby state of the input synchronization buffer in the write target state as a copy destination and the input synchronization buffer in the standby state belonging to the same set as the input synchronization buffer. The system program further includes, as an execution control process for the control operation of the PLC, an execution cycle input initial process for executing, on condition that it is the control cycle in which an execution cycle of the control program started, a second interchange process for interchanging the standby state and the reference target state of the input synchronization buffer in the standby state and the input synchronization buffer in the reference target state. The control program start process is a process for starting execution of the control program at every the execution cycle as an integer multiple of the control cycle.

Preferably, the system program further includes, as the execution preparation process for the control operation of the PLC, a process for producing a transmission buffer for storing output data to be transmitted in the storage means, and a process for producing (generating) an output synchronization buffer storing the output data to be copied to the transmission buffer in the storage means, for each output data. The system program further includes, as the execution control process for the control operation of the PLC, an output copy process for copying the output data from the output synchronization buffer to the transmission buffer, at a timing when the output data is to be transmitted from the transmission buffer in a first control cycle of the execution cycle following the execution cycle in which the control program that produced the output data is executed.

Preferably, the system program further includes, as the execution preparation process for the control operation of the PLC, a process for producing an operation buffer used by the control program for storing the output data, in the storage means. This process for producing the output synchronization buffer is a process for producing (generating) a first output synchronization buffer, a second output synchronization buffer, and a third output synchronization buffer as a set of output synchronization buffers for each of the output data. To the first output synchronization buffer, the second output synchronization buffer, and the third output synchronization buffer, any (at least one of) of a write target state in which the output data can be copied from the operation buffer, a reference target state in which reference can be made for copying to the transmission buffer, and a standby state are allocated without overlapping. The system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer. The output copy process is a process for copying the output data from the output synchronization buffer in the reference target state to the transmission buffer after the start of each control cycle before transmission of the output data from the transmission buffer, executing, on condition that it is the control cycle in which an execution cycle of the control program started, a fifth interchange process for interchanging the standby state and the reference target state of the output synchronization buffer in the standby state and the output synchronization buffer in the reference target state, before execution of the copy to the transmission buffer, and thereby copying the output data from the output synchronization buffer to the transmission buffer at a timing when the output data is to be transmitted from the transmission buffer in a first control cycle of the execution cycle following the execution cycle in which the control program that produced the output data is executed.

According to another aspect of the disclosure, a method is provided for transferring data between an input/output process and a control program in a programmable logic circuit (PLC). The method includes storing a system program and a control program, executing the system program and the control program, transmitting output data and receiving input data, generating, with the system program as an execution preparation process, a reception buffer for storing the received input data in the storage, and generating, with the system program as an execution preparation process, for each input data referred to by the control program, an input synchronization buffer used by the control program as a reference target for the input data. The system program causes, as an execution control process for the control operation of the PLC, executing, with the system program as an execution control process, an input copy process for copying the received input data from the reception buffer to the input synchronization buffer corresponding to the input data, and executing, with the system program as an execution control process, a control program start process for starting execution of the control program.

According to another aspect of the disclosure, generating the input synchronization buffer includes generating a first input synchronization buffer and a second input synchronization buffer as a set of input synchronization buffers, for each input data referred to by the control program, in which to the first input synchronization buffer and the second input synchronization buffer, at least one of a write target state in which the input data can be copied from the reception buffer and a reference target state in which reference can be made by the control program, are allocated without overlapping, and in which the input copy process includes copying to the input synchronization buffer which is in the write target state.

According to another aspect of the disclosure, generating the input synchronization buffer includes generating the first input synchronization buffer, the second input synchronization buffer and a third input synchronization buffer as a set of input synchronization buffers for each of the input data referred to by the control program, in which the first input synchronization buffer, the second input synchronization buffer and the third input synchronization buffer, at least one of the write target state, the reference target state and a standby state are allocated without overlapping, in which the input copy process further includes a first interchange process for interchanging the write target state and the standby state of the input synchronization buffer in the write target state as a copy destination and the input synchronization buffer in the standby state belonging to the same set as the input synchronization buffer, in which the control program start process further includes a second interchange process for interchanging, when the input synchronization buffers for the control program of which execution is to be started, the input synchronization buffer storing latest data is in the standby state, the standby state and the reference target state of the input synchronization buffer in the standby state and the input synchronization buffer in the reference target state.

According to another aspect of the disclosure, the control program start process further includes a third interchange process for interchanging, when the input synchronization buffers for the control program of which execution is to be started, the input synchronization buffer storing latest data is in the write target state, the write target state and the reference target state of the input synchronization buffer in the write target state and the input synchronization buffer in the reference target state.

According to another aspect of the disclosure, generating the input synchronization buffer includes generating a first input synchronization buffer and a second input synchronization buffer as a set of synchronization buffers, for each input data referred to by the control program, in which the system program further includes, as the execution preparation process for the control operation of the PLC, a process for generating a latest state recording area in the storage, in which the input copy process further includes a process for recording that the input synchronization buffer as a copy destination is in the latest state in the latest state recording area, and in which the control program start process further includes a process for setting the input synchronization buffer in the latest state specified by contents in the latest state recording area to the reference target state to be referred to in executing the control program.

According to another aspect of the disclosure, the control program start process further includes setting the input synchronization buffer to be referred to by the control program of which execution is to be started to a write protected state, in which the system program further includes, as the execution control process for the control operation of the PLC, a process for cancelling, when execution of the control program ends, the write protected state of the synchronization buffer that has been in the write protected state, and in which the input copy process is executed when the input synchronization buffer as a copy destination is not in the write protected state.

According to another aspect of the disclosure, the process for generating the input synchronization buffer includes generating a first input synchronization buffer and a second input synchronization buffer as a set of synchronization buffers, for each input data referred to by the control program, in which the second input synchronization buffer is an input synchronization buffer used as a reference target by the control program referring to input data, and in which the input copy process includes copying to the first input synchronization buffer, and in which the control program start process further includes a process for copying data stored in the first input synchronization buffer to the second input synchronization buffer before starting execution of the control program.

According to another aspect of the disclosure, the system program further includes, as the execution preparation process for the control operation of the PLC, a process for generating a transmission buffer for storing output data to be transmitted in the storage, and a process for generating an output synchronization buffer for storing the output data to be copied to the transmission buffer in the storage, for each of the output data. The system program further includes, as the execution control process for the control operation of the PLC, an output copy process for copying the output data from the output synchronization buffer to the transmission buffer.

According to another aspect of the disclosure, the output copy process includes copying the output data when execution of the control program ends.

According to another aspect of the disclosure, the system program further includes, as the execution preparation process for the control operation of the PLC, a process for generating an operation buffer used by the control program for storing the output data, in the storage, in which the process for generating the output synchronization buffer includes generating a first output synchronization buffer, a second output synchronization buffer and a third output synchronization buffer as a set of output synchronization buffers for each of the output data, in which to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping, in which the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer, and in which the output copy process is for executing, when the output synchronization buffer storing the latest data is in the standby state, a fifth interchange process for interchanging the standby state and the reference target state of the output synchronization buffer in the standby state and the output synchronization buffer in the reference target state, and copying the output data from the output synchronization buffer set to the reference target state to the transmission buffer.

According to another aspect of the disclosure, reception of the input data is executed at each control cycle, in which the input copy process includes copying the received input data from the reception buffer to the input synchronization buffer corresponding to the input data, when the input data is received at a reception timing related to the control cycle in which an execution cycle of the control program started, and in which the control program start process includes starting execution of the control program at every the execution cycle as an integer multiple of the control cycle.

According to another aspect of the disclosure, the process for generating the input synchronization buffer includes generating a first input synchronization buffer, a second input synchronization buffer and a third input synchronization buffer as a set of input synchronization buffers, for each input data referred to by the control program, in which the first input synchronization buffer, the second input synchronization buffer and the third input synchronization buffer, at least one of a write target state in which the input data can be copied from the reception buffer, a reference target state in which reference can be made by the control program, and a standby state are allocated without overlapping, in which reception of the input data is executed at each control cycle, in which the input copy process includes for copying to the input synchronization buffer in the write target state and further executing a first interchange process for interchanging the write target state and the standby state of the input synchronization buffer in the write target state as a copy destination and the input synchronization buffer in the standby state belonging to the same set as the input synchronization buffer, in which the system program further includes, as an execution control process for the control operation of the PLC, an execution cycle input initial process for executing, when it is the control cycle in which an execution cycle of the control program started, a second interchange process for interchanging the standby state and the reference target state of the input synchronization buffer in the standby state and the input synchronization buffer in the reference target state, and in which the control program start process includes starting execution of the control program at every the execution cycle as an integer multiple of the control cycle.

According to another aspect of the disclosure, the system program further includes, as the execution preparation process for the control operation of the PLC, a process for generating a transmission buffer for storing output data to be transmitted in the storage, and a process for generating an output synchronization buffer for storing the output data to be copied to the transmission buffer in the storage, for each the output data and in which the system program further includes, as the execution control process for the control operation of the PLC, an output copy process for copying the output data from the output synchronization buffer to the transmission buffer, at a timing when the output data is to be transmitted from the transmission buffer in a first control cycle of the execution cycle following the execution cycle in which the control program that produced the output data is executed.

According to another aspect of the disclosure, the system program further includes, as the execution preparation process for the control operation of the PLC, a process for generating an operation buffer used by the control program for storing the output data, in the storage, in which the process for generating the output synchronization buffer includes generating a first output synchronization buffer, a second output synchronization buffer and a third output synchronization buffer as a set of output synchronization buffers for each of the output data, in which to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping, in which the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer, and in which the output copy process includes copying the output data from the output synchronization buffer in the reference target state to the transmission buffer after the start of each control cycle before transmission of the output data from the transmission buffer, executing, when it is the control cycle in which an execution cycle of the control program started, a fifth interchange process for interchanging the standby state and the reference target state of the output synchronization buffer in the standby state and the output synchronization buffer in the reference target state, before execution of the copy to the transmission buffer, and thereby copying the output data from the output synchronization buffer to the transmission buffer at a timing when the output data is to be transmitted from the transmission buffer in a first control cycle of the execution cycle following the execution cycle in which the control program that produced the output data is executed.

According to another aspect of the disclosure, a non-transitory computer readable medium storing a program that allows a computer apparatus to perform a process for transferring data between an input/output process and a control program in a programmable logic circuit (PLC). The program allows the computer apparatus to perform storing a system program and a control program, executing the system program and the control program, transmitting output data and receiving input data, generating, with the system program as an execution preparation process, a reception buffer for storing the received input data in the storage, and generating, with the system program as an execution preparation process, for each input data referred to by the control program, an input synchronization buffer used by the control program as a reference target for the input data. The system program causes, as an execution control process for the control operation of the PLC, executing, with the system program as an execution control process, an input copy process for copying the received input data from the reception buffer to the input synchronization buffer corresponding to the input data, and executing, with the system program as an execution control process, a control program start process for starting execution of the control program.

According to another aspect of the disclosure, generating the input synchronization buffer includes generating a first input synchronization buffer and a second input synchronization buffer as a set of input synchronization buffers, for each input data referred to by the control program, in which to the first input synchronization buffer and the second input synchronization buffer, at least one of a write target state in which the input data can be copied from the reception buffer and a reference target state in which reference can be made by the control program, are allocated without overlapping, and in which the input copy process includes copying to the input synchronization buffer which is in the write target state.

According to another aspect of the disclosure, generating the input synchronization buffer includes generating the first input synchronization buffer, the second input synchronization buffer and a third input synchronization buffer as a set of input synchronization buffers for each of the input data referred to by the control program, in which the first input synchronization buffer, the second input synchronization buffer and the third input synchronization buffer, at least one of the write target state, the reference target state and a standby state are allocated without overlapping, in which the input copy process further includes a first interchange process for interchanging the write target state and the standby state of the input synchronization buffer in the write target state as a copy destination and the input synchronization buffer in the standby state belonging to the same set as the input synchronization buffer, in which the control program start process further includes a second interchange process for interchanging, when the input synchronization buffers for the control program of which execution is to be started, the input synchronization buffer storing latest data is in the standby state, the standby state and the reference target state of the input synchronization buffer in the standby state and the input synchronization buffer in the reference target state.

According to another aspect of the disclosure, the control program start process further includes a third interchange process for interchanging, when the input synchronization buffers for the control program of which execution is to be started, the input synchronization buffer storing latest data is in the write target state, the write target state and the reference target state of the input synchronization buffer in the write target state and the input synchronization buffer in the reference target state.

According to another aspect of the disclosure, generating the input synchronization buffer includes generating a first input synchronization buffer and a second input synchronization buffer as a set of synchronization buffers, for each input data referred to by the control program, in which the system program further includes, as the execution preparation process for the control operation of the PLC, a process for generating a latest state recording area in the storage, in which the input copy process further includes a process for recording that the input synchronization buffer as a copy destination is in the latest state in the latest state recording area, and in which the control program start process further includes a process for setting the input synchronization buffer in the latest state specified by contents in the latest state recording area to the reference target state to be referred to in executing the control program.

According to another aspect of the disclosure, the control program start process further includes setting the input synchronization buffer to be referred to by the control program of which execution is to be started to a write protected state, in which the system program further includes, as the execution control process for the control operation of the PLC, a process for cancelling, when execution of the control program ends, the write protected state of the synchronization buffer that has been in the write protected state, and in which the input copy process is executed when the input synchronization buffer as a copy destination is not in the write protected state.

According to another aspect of the disclosure, the process for generating the input synchronization buffer includes generating a first input synchronization buffer and a second input synchronization buffer as a set of synchronization buffers, for each input data referred to by the control program, in which the second input synchronization buffer is an input synchronization buffer used as a reference target by the control program referring to input data, and in which the input copy process includes copying to the first input synchronization buffer, and in which the control program start process further includes a process for copying data stored in the first input synchronization buffer to the second input synchronization buffer before starting execution of the control program.

According to another aspect of the disclosure, the system program further includes, as the execution preparation process for the control operation of the PLC, a process for generating a transmission buffer for storing output data to be transmitted in the storage, and a process for generating an output synchronization buffer for storing the output data to be copied to the transmission buffer in the storage, for each of the output data. The system program further includes, as the execution control process for the control operation of the PLC, an output copy process for copying the output data from the output synchronization buffer to the transmission buffer.

According to another aspect of the disclosure, the output copy process includes copying the output data when execution of the control program ends.

According to another aspect of the disclosure, the system program further includes, as the execution preparation process for the control operation of the PLC, a process for generating an operation buffer used by the control program for storing the output data, in the storage, in which the process for generating the output synchronization buffer includes generating a first output synchronization buffer, a second output synchronization buffer and a third output synchronization buffer as a set of output synchronization buffers for each of the output data, in which to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping, in which the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer, and in which the output copy process is for executing, when the output synchronization buffer storing the latest data is in the standby state, a fifth interchange process for interchanging the standby state and the reference target state of the output synchronization buffer in the standby state and the output synchronization buffer in the reference target state, and copying the output data from the output synchronization buffer set to the reference target state to the transmission buffer.

According to another aspect of the disclosure, reception of the input data is executed at each control cycle, in which the input copy process includes copying the received input data from the reception buffer to the input synchronization buffer corresponding to the input data, when the input data is received at a reception timing related to the control cycle in which an execution cycle of the control program started, and in which the control program start process includes starting execution of the control program at every the execution cycle as an integer multiple of the control cycle.

According to another aspect of the disclosure, the process for generating the input synchronization buffer includes generating a first input synchronization buffer, a second input synchronization buffer and a third input synchronization buffer as a set of input synchronization buffers, for each input data referred to by the control program, in which the first input synchronization buffer, the second input synchronization buffer and the third input synchronization buffer, at least one of a write target state in which the input data can be copied from the reception buffer, a reference target state in which reference can be made by the control program, and a standby state are allocated without overlapping, in which reception of the input data is executed at each control cycle, in which the input copy process includes for copying to the input synchronization buffer in the write target state and further executing a first interchange process for interchanging the write target state and the standby state of the input synchronization buffer in the write target state as a copy destination and the input synchronization buffer in the standby state belonging to the same set as the input synchronization buffer, in which the system program further includes, as an execution control process for the control operation of the PLC, an execution cycle input initial process for executing, when it is the control cycle in which an execution cycle of the control program started, a second interchange process for interchanging the standby state and the reference target state of the input synchronization buffer in the standby state and the input synchronization buffer in the reference target state, and in which the control program start process includes starting execution of the control program at every the execution cycle as an integer multiple of the control cycle.

According to another aspect of the disclosure, the system program further includes, as the execution preparation process for the control operation of the PLC, a process for generating a transmission buffer for storing output data to be transmitted in the storage, and a process for generating an output synchronization buffer for storing the output data to be copied to the transmission buffer in the storage, for each the output data and in which the system program further includes, as the execution control process for the control operation of the PLC, an output copy process for copying the output data from the output synchronization buffer to the transmission buffer, at a timing when the output data is to be transmitted from the transmission buffer in a first control cycle of the execution cycle following the execution cycle in which the control program that produced the output data is executed.

According to another aspect of the disclosure, the system program further includes, as the execution preparation process for the control operation of the PLC, a process for generating an operation buffer used by the control program for storing the output data, in the storage, in which the process for generating the output synchronization buffer includes generating a first output synchronization buffer, a second output synchronization buffer and a third output synchronization buffer as a set of output synchronization buffers for each of the output data, in which to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping, in which the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer, and in which the output copy process includes copying the output data from the output synchronization buffer in the reference target state to the transmission buffer after the start of each control cycle before transmission of the output data from the transmission buffer, executing, when it is the control cycle in which an execution cycle of the control program started, a fifth interchange process for interchanging the standby state and the reference target state of the output synchronization buffer in the standby state and the output synchronization buffer in the reference target state, before execution of the copy to the transmission buffer, and thereby copying the output data from the output synchronization buffer to the transmission buffer at a timing when the output data is to be transmitted from the transmission buffer in a first control cycle of the execution cycle following the execution cycle in which the control program that produced the output data is executed.

As used herein, the term "instruction" or "instructions" means not only an individual instruction or instructions appearing in program source lists, but also a set of individual instructions, functions, etc.

Effects of the Disclosure

According to the present disclosure, in a PLC, even when there is not a one-to-one correspondence between input/output processes and control programs, it is possible to appropriately allow the control program to use received input data without the need of a process which is performed by the control program itself.

DETAILED DESCRIPTION

Figure 1:
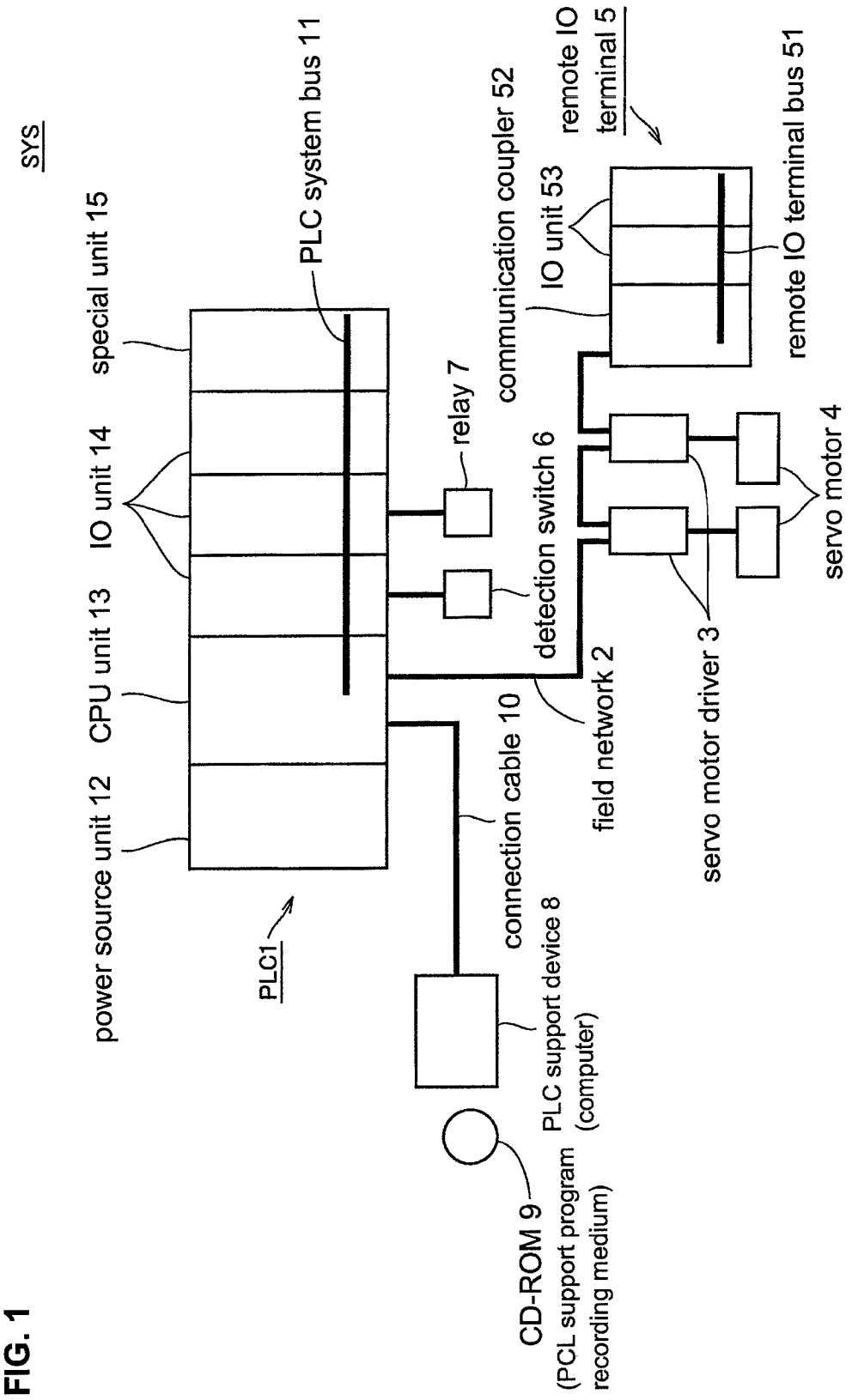
FIG. 1 is a schematic diagram showing a general configuration of a PLC system according to an embodiment of the present disclosure.

Embodiments of the present disclosure will be described in detail with reference to the accompanying drawings. Note that the same or equivalent parts are indicated by the same reference characters and will not be redundantly described.

A. System Configuration

A PLC according to this embodiment controls an object of control, such as a machine, equipment, etc. The PLC of this embodiment includes a CPU unit as a component thereof. The CPU unit (a central processor) includes a microprocessor, storage means (a storage), and a communication circuit. The storage means is used to store a control program and a system program for controlling a program. The microprocessor executes the system program and the control program stored in the storage means. The communication circuit transmits output data and receives input data. Firstly, a system configuration of the PLC 1 of this embodiment will be described with reference to FIG. 1.

FIG. 1 is a schematic diagram showing a general configuration of the PLC system of this embodiment of the present disclosure. Referring to FIG. 1, the PLC system SYS includes the PLC 1, servo motor drivers 3 and a remote IO terminal 5 which are connected to the PLC 1 via a field network 2, and a detection switch 6 and a relay 7 which are field devices. A PLC support device 8 is also connected to the PLC 1 via a connection cable 10 or the like.

The PLC 1 includes a CPU unit 13 which executes a main operation process, one or more IO units 14, and a special unit 15. These units are configured to exchange data via a PLC system bus 11. Power of an appropriate voltage is supplied to these units by a power supply unit 12. Note that the units constituting the PLC 1 are provided by a PLC manufacturer, and therefore, typically, the PLC system bus 11 is developed and used independently by each PLC manufacturer. In contrast to this, as described below, for the field network 2, a standard or the like are often published so that products available from different manufacturers can be connected via the field network 2.

Figure 2:
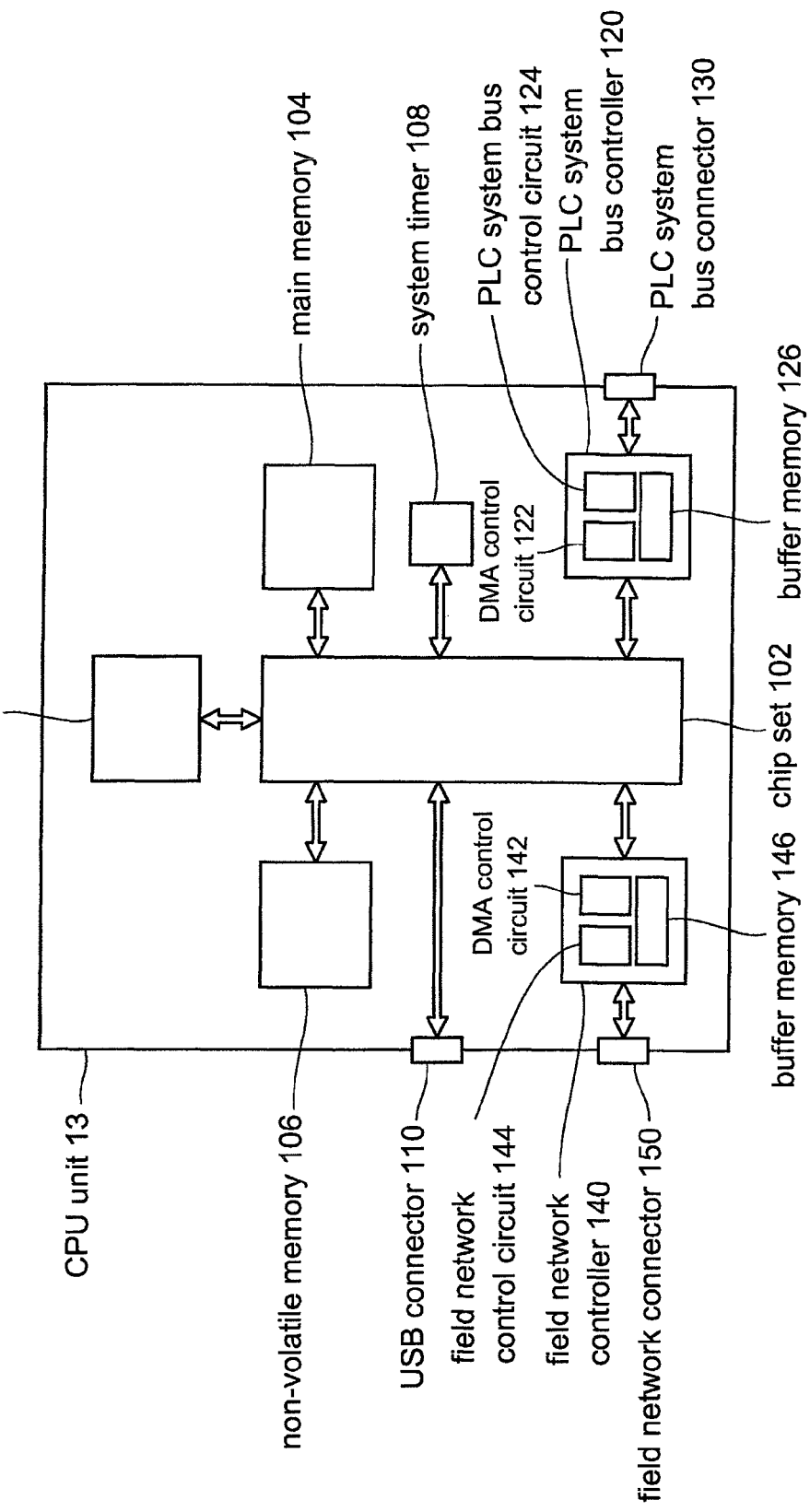
FIG. 2 is a schematic diagram showing a hardware configuration of a CPU unit according to the embodiment of the present disclosure.

Details of the CPU unit 13 will be described below with reference to FIG. 2.

The IO units 14 are units which are related to a general input/output process and is used to input and output binary data (on and off). Specifically, the IO units 14 collect information indicating whether a sensor, such as the detection switch 6 etc., is in a state (on) in which the sensor has detected any object or in a state (off) in which the sensor has detected no object. The IO units 14 also have a function of outputting a command (on) for activation and a command (off) for inactivation to an output destination, such as the relay 7 or an actuator.

The special unit 15 has functions which are not supported by the IO units 14, including inputting and outputting of analog data, control of temperature, and communication using a specific communication scheme.

The field network 2 transmits various kinds of data which are exchanged with the CPU unit 13. As the field network 2, typically, various kinds of industrial Ethernet (registered trademark) are available. Examples of industrial Ethernet (registered trademark) includes EtherCAT (registered trademark), Profinet IRT, MECHATROLINK (registered trademark)-III, Powerlink, SERCOS (registered trademark)-III, CIP Motion, etc. Any of these Ethernet technologies may be employed. Field networks other than industrial Ethernet (registered trademark) may be employed. For example, unless motion control is performed, DeviceNet, CompoNet/IP (registered trademark), etc., may be employed. In the PLC system SYS of this embodiment, typically, in this embodiment, a configuration will be illustrated in which EtherCAT (registered trademark), which is a type of industrial Ethernet (registered trademark), is employed as the field network 2.

Although FIG. 1 illustrates a PLC system SYS that has both a PLC system bus 11 and a field network 2, a system configuration which has only one of them may be employed. For example, all units may be connected together via the field network 2. Alternatively, the servo motor drivers 3 may be connected directly to the PLC system bus 11 without using the field network 2. Moreover, a communication unit of the field network 2 may be connected to the PLC system bus 11, and the CPU unit 13 may communicate with devices connected to the field network 2 via the communication unit.

Note that if the CPU unit 13 has the function of the IO units 14 and the function of the servo motor drivers 3, the PLC 1 may be configured so that the CPU unit 13 directly controls an object of control without using the IO units 14, the servo motor drivers 3, or the like.

The servo motor drivers 3 are connected via the field network 2 to the CPU unit 13, and drive the servo motors 4 based on a command value from the CPU unit 13. More specifically, the servo motor drivers 3 receive command values, such as a position command value, a speed command value, and a torque command value, from the PLC 1 at predetermined intervals. The servo motor drivers 3 also acquire measured values related to an operation of the servo motors 4, such as a position, a speed (typically, calculated from the difference between the current position and the previous position), and a torque, from detectors, such as a position sensor (rotary encoder) and a torque sensor, which are connected to the shafts of the servo motors 4. Thereafter, the servo motor drivers 3 perform a feedback control, where the target values are the command values from the CPU unit 13, and the feedback values are the measured values. In other words, the servo motor drivers 3 adjust a current for driving the servo motors 4 so that the measured values approach the target values. Note that the servo motor drivers 3 may also be called "servo motor amplifiers".

While FIG. 1 shows an example system in which servo motors 4 are combined with servo motor drivers 3, other configurations may be employed. For example, a system in which pulse motors are combined with pulse motor drivers may be employed.

A remote IO terminal 5 is also connected to the field network 2 of the PLC system SYS of FIG. 1. The remote IO terminal 5 normally performs a process which is related to a general input/output process, as with the IO units 14. More specifically, the remote IO terminal 5 includes a communication coupler 52 for performing a process which is related to data transmission on the field network 2, and one or more IO units 53. These units are configured to exchange data with each other via a remote IO terminal bus 51.

The PLC support device 8 will be described below.

B. Hardware Configuration of CPU Unit

Next, a hardware configuration of the CPU unit 13 will be described with reference to FIG. 2. FIG. 2 is a schematic diagram showing the hardware configuration of the CPU unit 13 of this embodiment of the present disclosure. Referring to FIG. 2, the CPU unit 13 includes a microprocessor 100, a chip set 102, a main memory 104, a non-volatile memory 106, a system timer 108, a PLC system bus controller 120, a field network controller 140, and a USB connector 110. The chip set 102 and other components are linked together via various buses.

The microprocessor 100 and the chip set 102 are typically configured under a general-purpose computer architecture. Specifically, the microprocessor 100 interprets and executes command codes which are successively supplied from the chip set 102 based on an internal clock. The chip set 102 exchanges internal data with various components connected thereto, and produces command codes which are required by the microprocessor 100. The chip set 102 also has a function of caching, for example, data obtained as a result of execution of an operation process in the microprocessor 100.

In first through seventh embodiments described below, the microprocessor 100 is assumed to be a single-core processor unless it is explicitly stated that the microprocessor 100 is a multi-core processor. The term "multi-core" means that the number of cores is two or more (including the case where the number of cores is two).

The CPU unit 13 has, as storage means (a storage), the main memory 104 and the non-volatile memory 106.

The main memory 104, which is a volatile storage area (RAM), holds various programs which are to be executed by the microprocessor 100 after the CPU unit 13 is powered on. The main memory 104 is also used as a working memory during execution of various programs by the microprocessor 100. Examples of the main memory 104 include DRAM (Dynamic Random Access Memory) devices and SRAM (Static Random Access Memory) devices.

On the other hand, the non-volatile memory 106 holds, in a non-volatile manner, data such as a real-time OS (Operating System), a system program of the PLC 1, a user program, a motion operation program, a system set parameter, etc. These programs and data are copied to the main memory 104 as required so that the microprocessor 100 can access them. As the non-volatile memory 106, a semiconductor memory such as a flash memory may be employed. Alternatively, for example, magnetic recording media (e.g., a hard disk drive etc.) and optical recording media (e.g., DVD-RAM (Digital Versatile Disk Random Access Memory) etc.) may be employed.

The system timer 108 produces and provides an interrupt signal to the microprocessor 100 at predetermined intervals. Typically, based on hardware specifications, the system timer 108 is configured to produce different interrupt signals at different intervals. Alternatively, the system timer 108 may be set by an OS (Operating System) or a BIOS (Basic Input Output System), etc., to produce interrupt signals at suitable intervals. By using the interrupt signal produced by the system timer 108, a control operation is achieved which is performed at each control cycle as described below.

The CPU unit 13 has, as the communication circuit, a PLC system bus controller 120 and a field network controller 140. These communication circuits transmit output data and receive input data.

Note that if the CPU unit 13 itself has the function of the IO units 14 and the servo motor drivers 3, the communication circuit transmits output data and receives input data to and from portions of the CPU unit 13 which carry out these functions, inside the CPU unit 13.

The PLC system bus controller 120 controls data exchange which is performed via the PLC system bus 11. More specifically, the PLC system bus controller 120 includes a DMA (Dynamic Memory Access) control circuit 122, a PLC system bus control circuit 124, and a buffer memory 126. Note that the PLC system bus controller 120 is internally connected via a PLC system bus connector 130 to the PLC system bus 11.

The buffer memory 126 functions as a transmission buffer for data (also hereinafter referred to as "output data") which is output via the PLC system bus 11 to other units, and as a reception buffer for data (also hereinafter referred to as "input data") which is input via the PLC system bus 11 from other units. Note that output data produced by an operation process of the microprocessor 100 is initially stored in the main memory 104. Thereafter, output data to be transferred to a specific unit is read out from the main memory 104 and temporarily held in the buffer memory 126. Input data transferred from other units is temporarily held in the buffer memory 126 before being transferred to the main memory 104.

The DMA control circuit 122 transfers output data from the main memory 104 to the buffer memory 126 and input data from the buffer memory 126 to the main memory 104.

The PLC system bus control circuit 124 performs a process for transmitting output data of the buffer memory 126 to other units connected to the PLC system bus 11, and a process of receiving input data from other units connected to the PLC system bus 11 and storing the input data into the buffer memory 126. Typically, the PLC system bus control circuit 124 provides the functions of a physical layer and a data link layer of the PLC system bus 11.

The field network controller 140 controls data exchange performed via the field network 2. Specifically, the field network controller 140 controls output data transmission and input data reception based on the standard for the field network 2. As described above, in this embodiment, the field network 2 conforming to the EtherCAT (registered trademark) standard is employed, and therefore, the field network controller 140 including hardware for performing typical Ethernet (registered trademark) communication is employed. In the EtherCAT (registered trademark) standard, a typical Ethernet (registered trademark) controller which employs a communication protocol for the typical Ethernet (registered trademark) standard is available. Note that for some types of industrial Ethernet (registered trademark) employed as a field network 2, an Ethernet (registered trademark) controller having special specifications which corresponds to a communication protocol having dedicated specifications different from those of a typical communication protocol is employed. If a field network other than industrial Ethernet (registered trademark) is employed, a dedicated field network controller corresponding to the standard is employed.

The buffer memory 146 functions as a transmission buffer for data (also hereinafter referred to as "output data") which is output via the field network 2 to other devices etc. and as a reception buffer for data (also hereinafter referred to as "input data") which is input via the field network 2 from other devices etc. As described above, output data produced by an operation process of the microprocessor 100 is initially stored in the main memory 104. Thereafter, output data which is to be transferred to a specific device is read out from the main memory 104 and temporarily held in the buffer memory 146. Input data transferred from other devices is temporarily held in the buffer memory 146 before being transferred to the main memory 104.

A DMA control circuit 142 transfers output data from the main memory 104 to the buffer memory 146, and input data from the buffer memory 146 to the main memory 104.

A field network control circuit 144 performs a process of transmitting output data of the buffer memory 146 to other devices connected to the field network 2, and a process of receiving from other devices connected to the field network 2 and storing input data into the buffer memory 146. Typically, the field network control circuit 144 provides the functions of a physical layer and a data link layer of the field network 2.

The USB connector 110 is an interface for connecting the PLC support device 8 and the CPU unit 13 together. Typically, for example, a program executable by the microprocessor 100 in the CPU unit 13, which is transferred from the PLC support device 8, is input via the USB connector 110 to the PLC 1.

C. Software Configuration of CPU Unit

Next, pieces of software for providing various functions according to this embodiment will be described with reference to FIG. 3. Command codes contained in these pieces of software are read out with appropriate timing and executed by the microprocessor 100 of the CPU unit 13.

Figure 3:
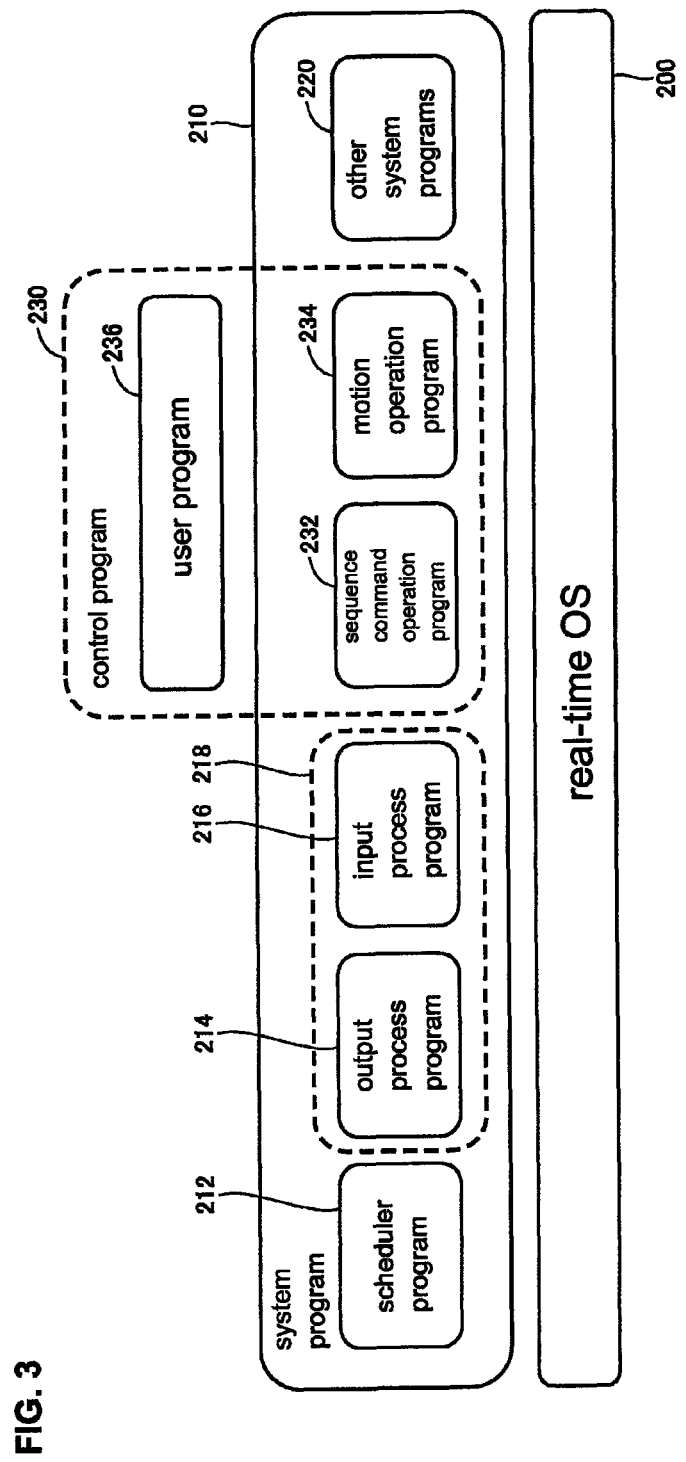
FIG. 3 is a schematic diagram showing a software configuration which is executed by the CPU unit according to the embodiment of the present disclosure.

FIG. 3 is a schematic diagram showing a software configuration which is executed by the CPU unit 13 according to this embodiment of the present disclosure. Referring to FIG. 3, software executable by the CPU unit 13 has a three-layer structure including a real-time OS 200, a system program 210, and a user program 236.

The real-time OS 200 is designed based on the computer architecture of the CPU unit 13. The microprocessor 100 provides a basic execution environment for executing the system program 210 and the user program 236. The real-time OS is typically available from a PLC manufacturer or a specialized software company, etc.

The system program 210 includes pieces of software for providing functions of the PLC 1. Specifically, the system program 210 includes a scheduler program 212, an output process program 214, an input process program 216, a sequence command operation program 232, a motion operation program 234, and other system programs 220. Note that typically, the output process program 214 and the input process program 216 are continuously (integrally) executed, and therefore, may also be collectively referred to as an IO process program 218.

The user program 236 is produced based on the user's purpose of control. In other words, the user program 236 is suitably designed based on a line (process) to be controlled using the PLC system SYS.

As described below, the user program 236 achieves the user's control purpose in cooperation with the sequence command operation program 232 and the motion operation program 234. Specifically, the user program 236 achieves a programmed operation by using a command, a function, a functional module, or the like. which are provided by the sequence command operation program 232 and the motion operation program 234. Therefore, the user program 236, the sequence command operation program 232, and the motion operation program 234 may also be collectively referred to as a control program 230.

Thus, the microprocessor 100 of the CPU unit 13 executes the system program 210 and the user program 236 which are stored in the storage means.

Each program will be described in greater detail hereinafter.

As described above, the user program 236 is produced based on the user's purpose of control (e.g., a line or process to be controlled). The user program 236 is typically in the form of an object program executable by the microprocessor 100 of the CPU unit 13. The user program 236 is produced by a source program written in ladder logic or the like and compiled by the PLC support device 8 or the like. Thereafter, the user program 236 thus produced in the form of an object program is transferred from the PLC support device 8 via the connection cable 10 to the CPU unit 13, and stored into the non-volatile memory 106, for example.

The scheduler program 212 controls the start of a process and the restart of the process after interruption, in each execution cycle, for the output process program 214, the input process program 216, and the control program 230. More specifically, the scheduler program 212 controls execution of the user program 236 and the motion operation program 234.

In the CPU unit 13 of this embodiment, an execution cycle (control cycle) having a fixed period which is suited to the motion operation program 234 is used as a common cycle for all processes. Therefore, it is difficult to complete all processes during one control cycle. Therefore, the processes are divided into processes which need to be completely executed during each control cycle and processes which are allowed to be executed over a plurality of control cycles, according to, for example, the priority level of the process to be executed. The scheduler program 212 manages, for example, the order of execution of the divided processes. More specifically, the scheduler program 212 executes a program to which a higher priority level is given, earlier during each control cycle period.

The output process program 214 and the input process program 216 will be described in detail below with reference to FIG. 4.

When a sequence command which is used in the user program 236 is executed, the sequence command operation program 232 is called and executed to accomplish a task requested by the command.

The motion operation program 234 is executed based on an instruction from the user program 236, and in each execution, calculates a command value which is output to the motor drivers, such as one of the servo motor driver 3 or a pulse motor driver.

The other system programs 220 collectively indicate programs for achieving functions of the PLC 1 other than the individual programs separately shown in FIG. 3.

The real-time OS 200 provides an environment for changing a plurality of programs over time. In the PLC 1 of this embodiment, an interrupt for starting a control cycle is initially set as an event (interrupt) for outputting (transmitting) output data produced by execution of a program performed by the CPU unit 13 to another unit or device. When an interrupt for starting a control cycle occurs, the real-time OS 200 switches a target executed in the microprocessor 100 from a program which is being executed upon the occurrence of the interrupt to the scheduler program 212. Note that when none of the scheduler program 212 and the programs of which execution is controlled by the scheduler program 212 is being executed, the real-time OS 200 executes a program included in the other system programs 210. Such a program may be, for example, a program which is related to a communication process performed between the CPU unit 13 and the PLC support device 8 via the connection cable 10 (USB) or the like.

Note that the control program 230 and the scheduler program 212 are stored in the main memory 104 and the nonvolatile memory 106, which are storage means.

D. Main Memory Configuration

Next, storage areas provided in the main memory 104 of the CPU unit 13 will be described with reference to FIG. 4.

Figure 4:
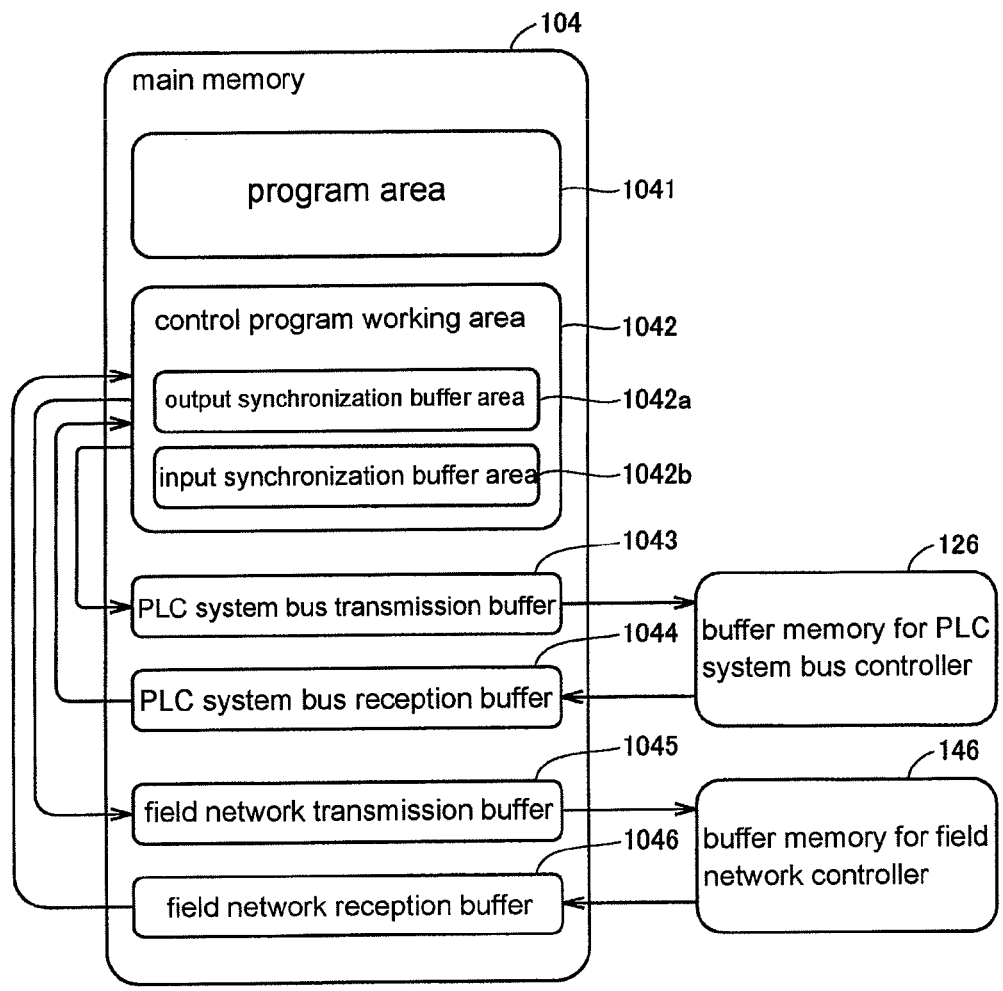
FIG. 4 is a schematic diagram showing an area configuration of a main memory of the CPU unit according to the embodiment of the present disclosure.

FIG. 4 is a schematic diagram showing an area configuration of the main memory 104 of the CPU unit 13 according to an embodiment of the present disclosure. Referring to FIG. 4, various program areas 1041, a working area 1042 for a control program, a PLC system bus transmission buffer 1043, a PLC system bus reception buffer 1044, a field network transmission buffer 1045, and a field network reception buffer 1046 are formed in the main memory 104.

In the control program working area 1042, the system program 210 produces an output synchronization buffer area 1042a in which an output synchronization buffer corresponding to each output data is produced, and an input synchronization buffer area 1042b in which an input synchronization buffer corresponding to each input data is produced.

The system program 210 also produces the PLC system bus transmission buffer 1043 and the field network transmission buffer 1045 (both of them are hereinafter collectively referred to as a "transmission buffer"), and the PLC system bus reception buffer 1044 and the field network reception buffer 1046 (both of them are hereinafter collectively referred to as a "reception buffer").

The output process program 214 (FIG. 3) copies output data produced by execution of the user program 236 from the output synchronization buffers to the transmission buffer. In other words, the output process program 214 includes an output copy command.

Specifically, the output process program 214 copies output data to be transmitted to the PLC system bus 11 from the output synchronization buffers to the PLC system bus transmission buffer. In this case, in the PLC system bus transmission buffer 1043, the output data is rearranged into groups corresponding to respective transmission destination units.

The output process program 214 also copies output data to be transmitted to the field network 2 from the output synchronization buffers to the field network transmission buffer 1045. In this case, in the field network transmission buffer 1045, the output data is rearranged into a format in which the output data can be transmitted as serial frames.

When the PLC system bus controller 120 and/or the field network controller 140 require a transmission execution instruction from the microprocessor 100, the output process program 214 issues the instruction. When these communication controllers autonomously execute transmission by, for example, using the system timer 108 or their own timers, the microprocessor 100 does not have to issue the transmission execution instruction.

The input process program 216 copies input data which has been received by the PLC system bus controller 120 and/or the field network controller 140 and stored in the reception buffer, to the input synchronization buffers. In other words, the input process program 216 includes an input copy command.

Specifically, the input process program 216 copies input data which has been received by the PLC system bus controller 120 and stored in the PLC system bus reception buffer 1044 and/or input data which has been received by the field network controller 140 and stored in the field network reception buffer 1046, to the input synchronization buffers. In this case, the input data is rearranged into a format which is suitable to be used by the control program 230.

When the PLC system bus controller 120 and/or the field network controller 140 require a reception execution instruction from the microprocessor 100, the input process program 216 issues the instruction. When these communication controllers autonomously execute reception by, for example, using the system timer 108 or their own timers, the microprocessor 100 does not have to issue the reception execution instruction.

If EtherCAT (registered trademark) is employed as the field network 2, a frame transmitted from the field network controller 140 goes through slave apparatuses while exchanging data with the slave apparatuses before returning. The field network controller 140 automatically receives the returning frame, and therefore, the microprocessor 100 does not have to issue the reception execution instruction.

The DMA control circuit 122 of the PLC system bus controller 120 transfers output data stored in the PLC system bus transmission buffer 1043 to the buffer memory 146 of the PLC system bus controller 120, and input data stored in the buffer memory 146 to the PLC system bus reception buffer 1044. The transferred input data is stored in the PLC system bus reception buffer 1044.

The DMA control circuit 142 of the field network controller 140 transfers output data stored in the field network transmission buffer 1045 to the buffer memory 146 of the field network controller 140, and input data stored in the buffer memory 146 to the field network reception buffer 1046. The transferred input data is stored in the field network reception buffer 1046.

The control program working area 1042, the PLC system bus transmission buffer 1043, the PLC system bus reception buffer 1044, the field network transmission buffer 1045, and the field network reception buffer 1046 are configured so that access thereto can be controlled independently of each other. Therefore, for example, a plurality of operations (1)-(3) described hereinafter can be executed in parallel.

(1) Access to the control program working area 1042 which is performed by the microprocessor 100 executing the user program 236.

(2) Access to the PLC system bus transmission buffer 1043 and/or the PLC system bus reception buffer 1044 in the main memory 104 which is performed by the DMA control circuit 122 of the PLC system bus controller 120, in order to transfer data between the PLC system bus transmission buffer 1043 and/or the PLC system bus reception buffer 1044 in the main memory 104, and the buffer memory 126 in the PLC system bus controller 120.

(3) Access to the field network transmission buffer 1045 and/or the field network reception buffer 1046 in the main memory 104 which is performed by the DMA control circuit 142 of the field network controller 140, in order to transfer data between the field network transmission buffer 1045 and/or the field network reception buffer 1046 in the main memory 104, and the buffer memory 146 in the field network controller 140.

E. Overall Process Operation of System Program

Next, an overall process operation of the system program 210 will be described.

The system program 210 includes the following basic processes (commands) which are related to inputting of input data. Specifically, when the system program 210 is executed, an execution preparation process for a control operation of the PLC 1 and an execution control process for the control operation of the PLC 1 will be successively executed. More specifically, the system program 210 includes, as the execution preparation process for the control operation of the PLC 1, the following processes (1) and (2).

(1) A process for producing a reception buffer for storing received input data, in the main memory 104 (storage means).

(2) A process for producing, for each input data referred to by the control program 230, an input synchronization buffer used by the control program 230 as a reference target for the input data, in the main memory 104 (storage means) (the input synchronization buffer area 1042b).

The system program 210 includes, as the execution control process for the control operation of the PLC 1, the following processes (3) and (4).

(3) An input copy process for copying the received input data from the reception buffer to the input synchronization buffer corresponding to that input data.

(4) A control program start process for starting execution of the control program 230.

If there is a plurality of the control programs 230, then for each control program an input synchronization buffer is produced for each input data referred to by the control program.

The system program 210 further includes the following basic processes (commands) which are related to outputting of output data. Specifically, when the system program 210 is executed, an execution preparation process for a control operation of the PLC 1 and an execution control process for the control operation of the PLC 1 are successively executed. More specifically, the system program 210 may further include, as the execution preparation process for the control operation of the PLC 1, the following processes (5) and (6).

(5) A process for producing a transmission buffer for storing output data to be transmitted, in the main memory 104 (storage means) (the output synchronization buffer area 1042a).

(6) A process for producing an output synchronization buffer for storing the output data to be copied to the transmission buffer, in the main memory 104 (storage means), for each output data.

The system program 210 may also further include, as the execution control process for the control operation of the PLC 1, the following process (7).

(7) An output copy process for copying the output data from the output synchronization buffer to the transmission buffer.

Moreover, the execution preparation process of the control program 230 may include other execution preparation processes corresponding to specific implementations. The order of execution of processes included in the execution preparation process for the control operation is appropriately designed.

The execution control process of the control program 230 may include other execution control processes corresponding to specific implementations. Each process included in the execution control process for the control operation is repeatedly executed as the control program 230 is repeatedly executed. The order of execution of the processes depends on the specific embodiment.

Figure 5:
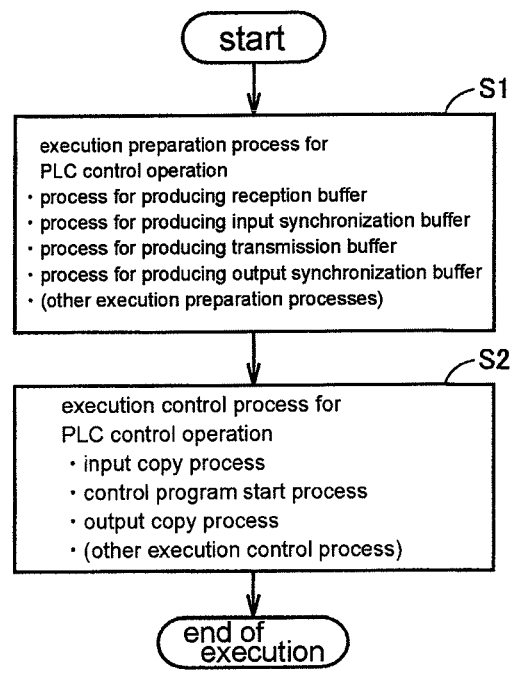
FIG. 5 is a flowchart showing an overall process of a system program of the CPU unit according to the embodiment of the present disclosure.

FIG. 5 is a flowchart showing an overall process of the system program of the CPU unit according to this embodiment of the present disclosure. As shown in FIG. 5, at first, the execution preparation process for the control operation of the PLC 1 is executed (step S1), and following this, the execution control process for the control operation of the PLC 1 is executed (step S2). The order of execution of the processes included in the execution preparation process (step S1) of the control program 230 is appropriately designed. Similarly, each process included in the execution control process (step S2) of the control program 230 is repeatedly executed as the control program 230 is repeatedly executed. The order of execution of the processes depends on the specific implementation.

As typical examples of specific implementations, first through thirteenth embodiments will be described hereinafter.

F. Single-Buffer Scheme

First Embodiment f1: Overview

In the first embodiment, a plurality of control programs are assumed to be executed in a time-division manner. In particular, a configuration will be described in which an input synchronization buffer is provided for each input data which is referred to by each control program, and an output synchronization buffer is provided for each control program. The control programs store output data in the respective corresponding output synchronization buffers.

f2: Sequence Diagram

Figure 6:
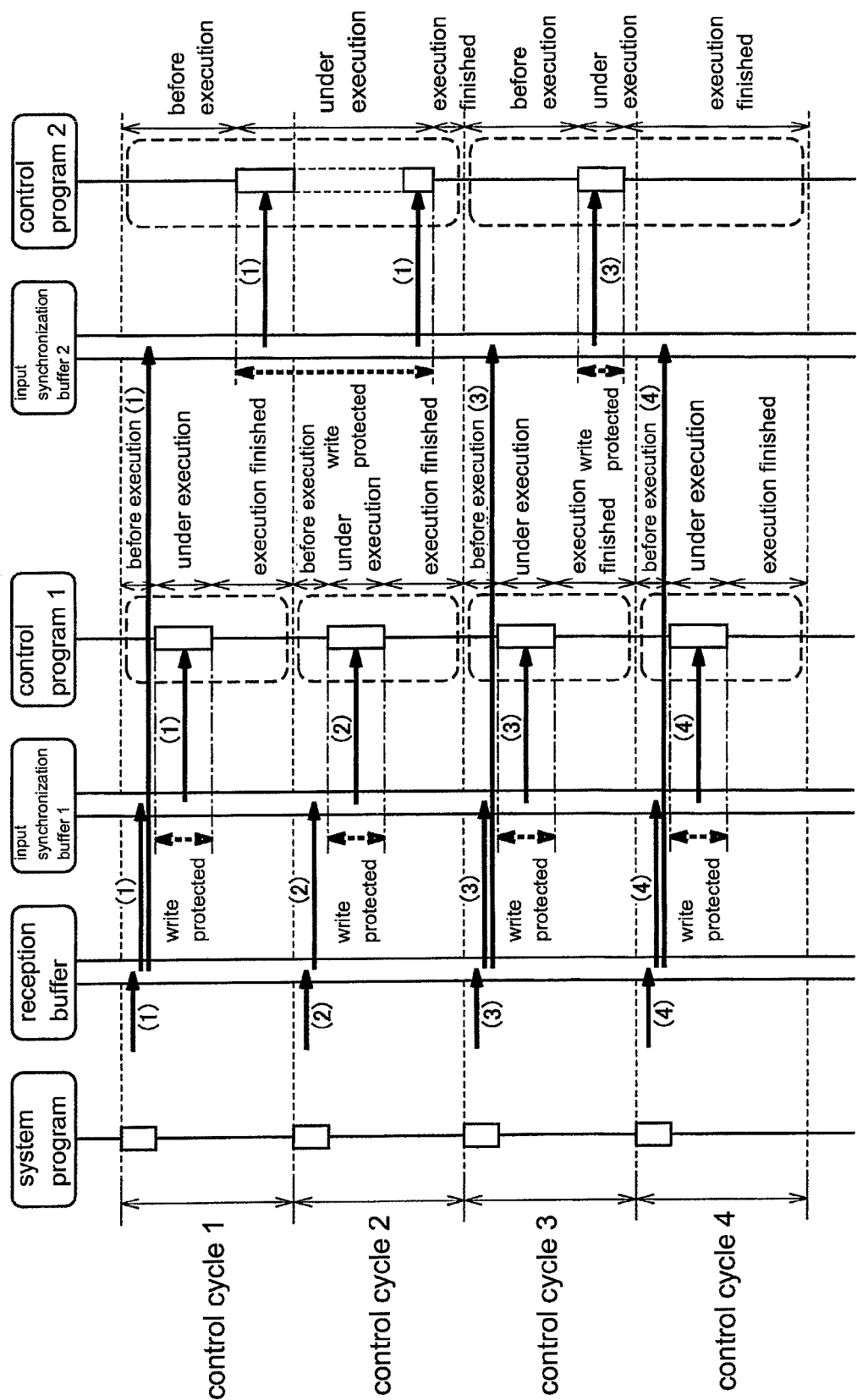
FIG. 6 is a sequence diagram showing an operation in an input direction according to a first embodiment.
Figure 7:
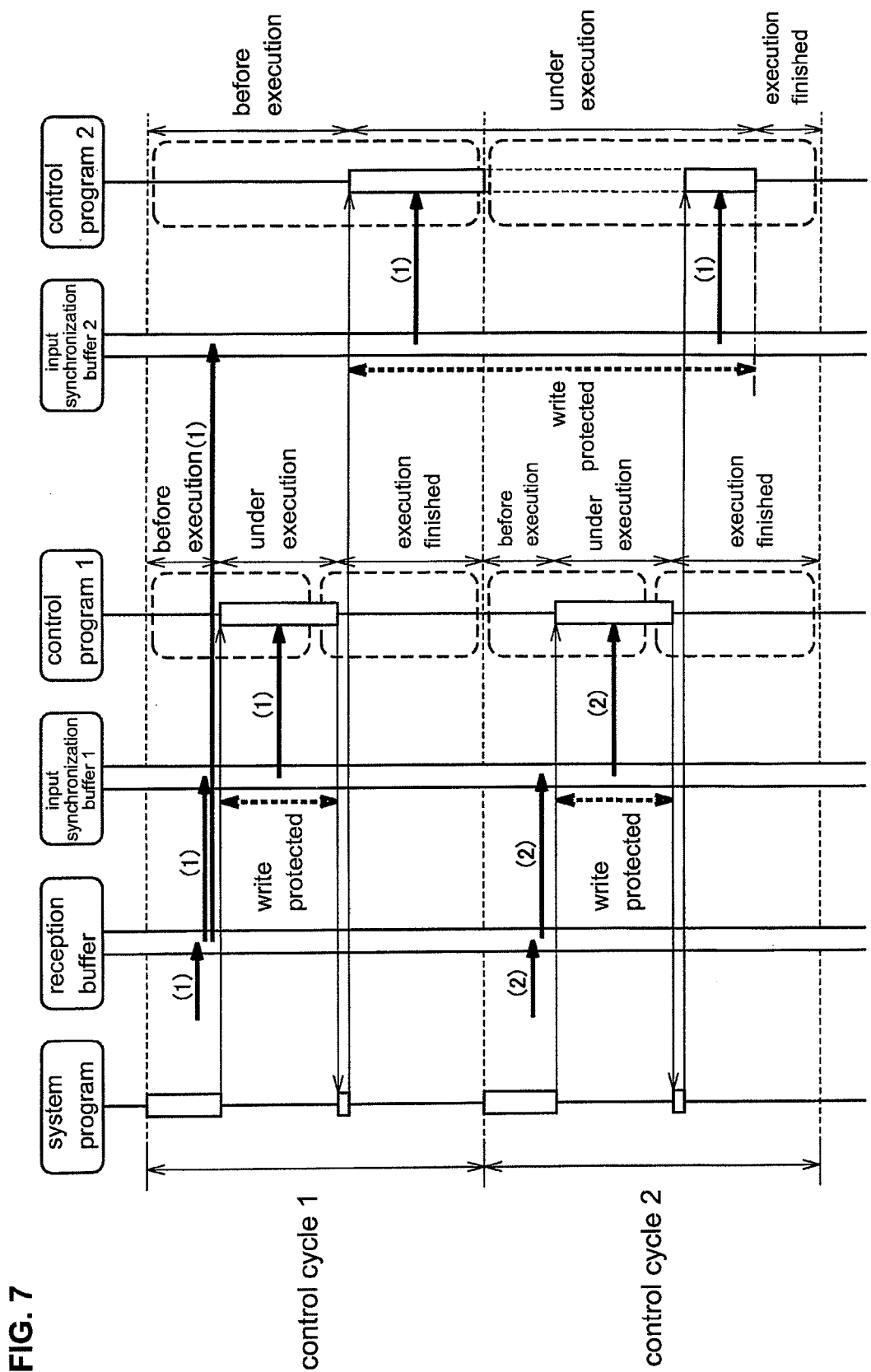
FIG. 7 is a sequence diagram showing an enlarged view of control cycles 1 and 2 of FIG. 6.
Figure 8:
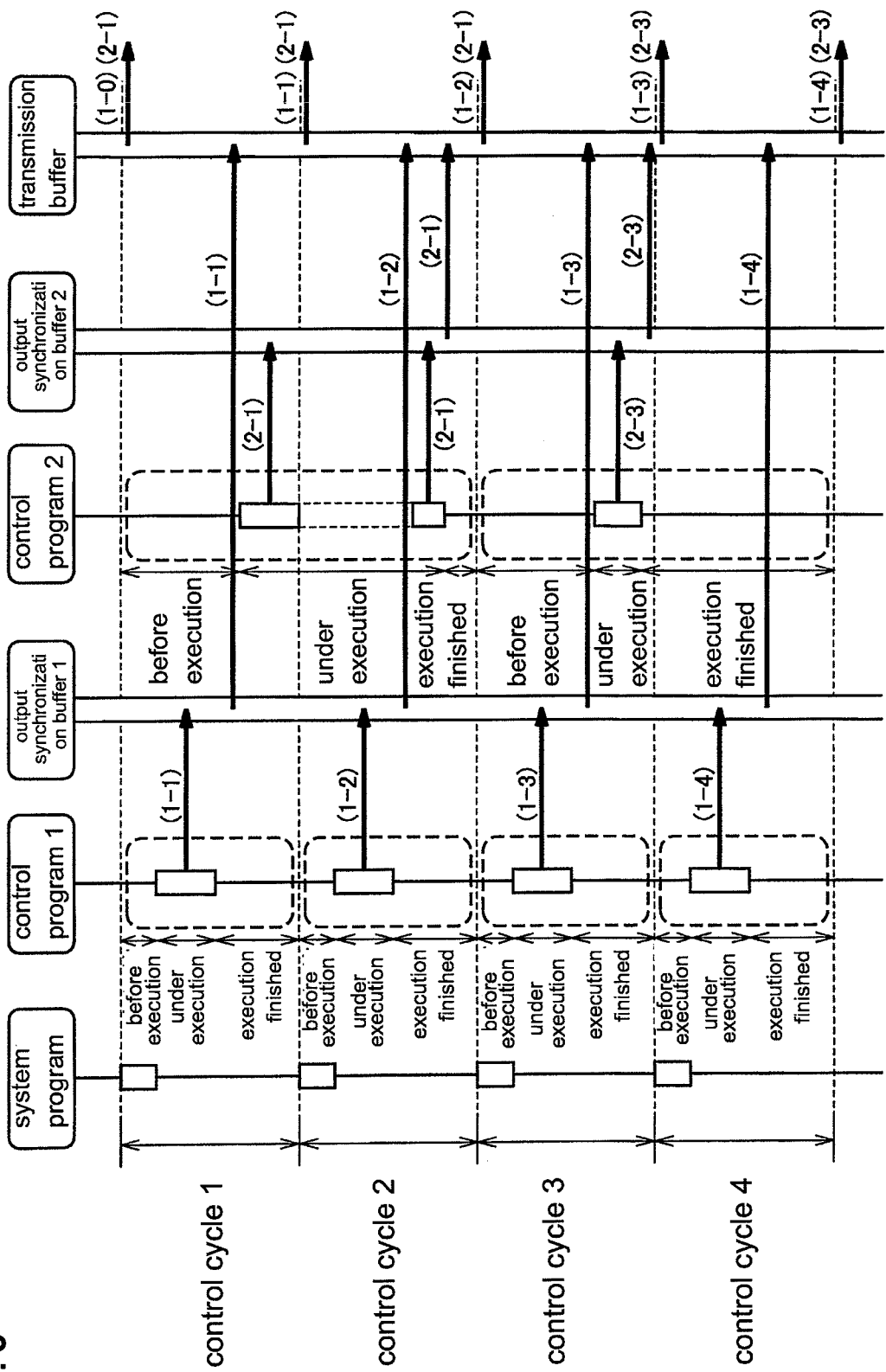
FIG. 8 is a sequence diagram showing an operation in an output direction according to the first embodiment.
Figure 9:
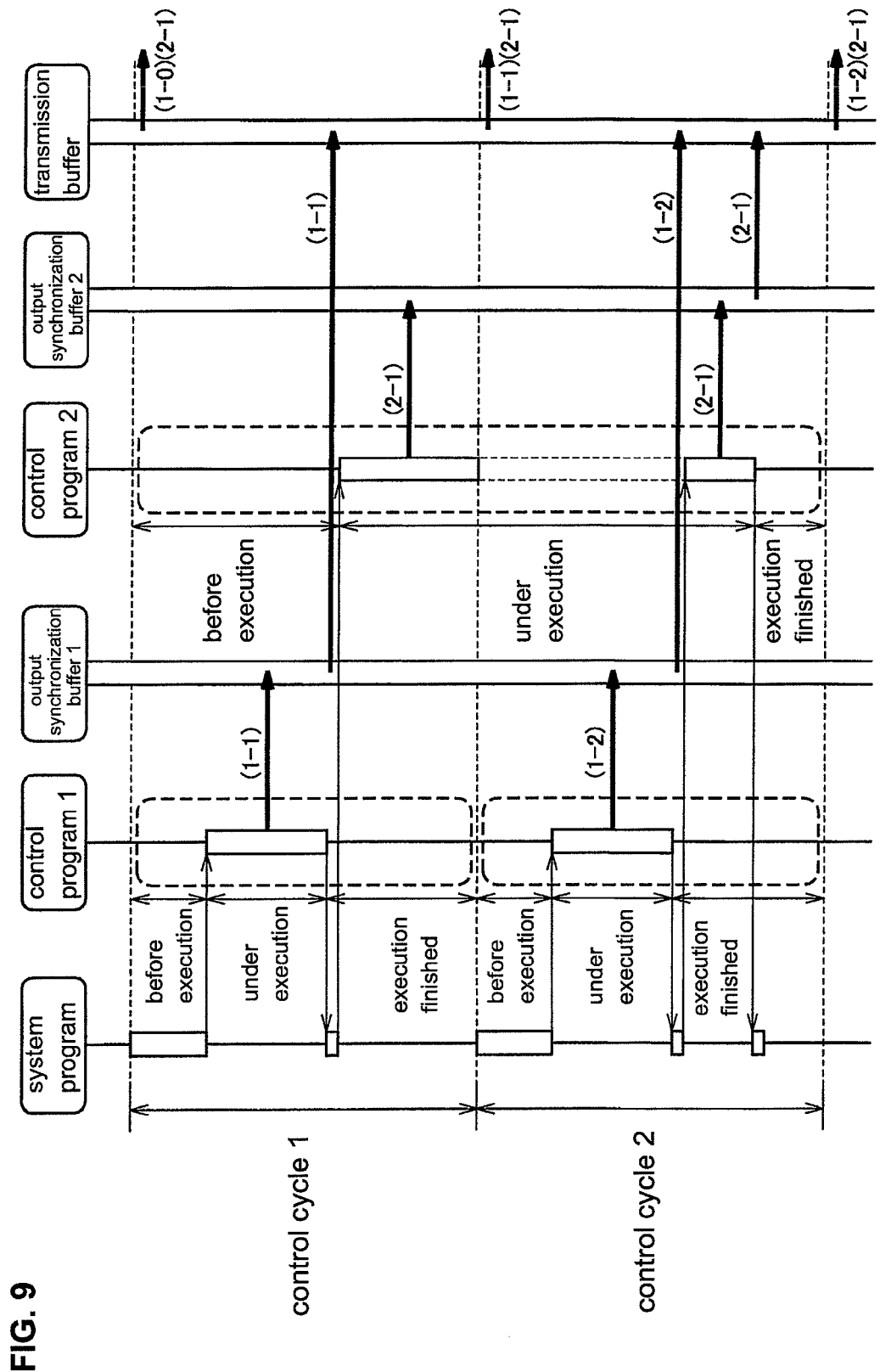
FIG. 9 is a sequence diagram showing an enlarged view of control cycles 1 and 2 of FIG. 8.

FIG. 6 is a sequence diagram showing an operation in an input direction according to the first embodiment. FIG. 7 is a sequence diagram showing an enlarged view of control cycles 1 and 2 of FIG. 6. On the other hand, FIG. 8 is a sequence diagram showing an operation in an output direction according to the first embodiment. FIG. 9 is a sequence diagram showing an enlarged view of control cycles 1 and 2 of FIG. 8.

FIGS. 6-9 show an example in which two control programs (control programs 1 and 2) are executed in a time-division manner. In this example, an input synchronization buffer 1, 2 is provided for each input data which is referred to by the control programs 1, 2, respectively, and an output synchronization buffer 1, 2 is provided for the control programs 1, 2, respectively. The control programs 1 and 2 store output data in the output synchronization buffers 1 and 2, respectively. Note that input data is transferred via the reception buffer to the input synchronization buffers 1 and 2, and output data is transferred from the output synchronization buffers 1 and 2 to the transmission buffer.

While FIGS. 6-9 shows, for the sake of simplicity, an example in which two control programs are executed in a time-division manner, any number of control programs can be executed in a time-division manner. This point is not limited to this embodiment and holds true for other embodiments described below. Therefore, even if an embodiment shows only one control program that is executed for the sake of convenience, an operation in which a plurality of control programs are executed in a time-division manner will be easily understood based on the description of this embodiment (particularly, FIGS. 6-9).

Rectangles with rounded corners indicated by dashed lines along the time axes of the control programs 1 and 2 of FIGS. 6-9 indicate corresponding control program execution cycles. For example, one execution cycle of the control program 1 corresponds to one control cycle, and similarly, one execution cycle of the control program 2 corresponds to two control cycles. Note that execution cycles are indicated in a similar manner in sequence diagrams for the description that follows.

An execution time of the system program of FIGS. 6 and 8 corresponds to a period of time from the start of a control cycle to the start of execution of a control program which is first executed in the control cycle. During this period of time, the system program performs an execution control of transmission of output data, copying of input data from the reception buffer to the input synchronization buffers (reception of input data is performed by the communication controller), and starting of execution of a control program. The processes executed during this period of time may vary from embodiment to embodiment.

The enlarged views of FIGS. 7 and 9 show that execution time of the system program is left after the end of execution of the control program. During this period of time, the system program controls copying of output data from the output synchronization buffers to the transmission buffer, and if there is a control program whose execution is next to be started, starting of execution of the control program. This short period of time during which the system program is executed is not shown in FIGS. 6 and 8 and sequence diagrams of other embodiments, for the sake of convenience.

If an interrupt for starting a control cycle occurs, the real-time OS interrupts the execution of a control program, and executes the system program.

In all the embodiments, it is desirable, but not essential, that the period of the control cycle be fixed, because the reception period of input data and the transmission period of output data are easily fixed. For example, if a control program does not end during the set execution cycle, the execution cycle time may be extended by extending the last control cycle time in the execution cycle.

FIGS. 6-9 show execution states of the control programs 1 and 2 along the time axes thereof. More specifically, the control programs 1 and 2 are in any of the following execution states during an execution cycle in which a predetermined process needs to be executed; a "before execution" state in which the process has not yet been started; an "under execution" state in which the process is being executed in the execution cycle; and an "execution finished" state in which the process has already been completed in the execution cycle.

These execution states are represented by recording the execution states of each control program in an execution state recording area. The execution state recording area is produced in the control program working area 1042 of the main memory 104 by the system program 210 in "the execution preparation process for the control operation of the PLC 1" (step S1 of FIG. 5). The recorded form of the execution states can be appropriately determined. For example, the following forms may be employed: for each execution state, information (a title, an identification number, etc. of a control program) which specifies a control program in the execution state is recorded; a flag or a state variable which represents an execution state is provided for each control program, and the execution state is recorded using a value of the flag or the state variable; etc. The execution state flag may, for example, be used as follows: a "before-execution flag" indicates the "before-execution state" if it is on; an "under-execution flag" indicates the "under execution" state if it is on; etc. The execution state variable may, for example, be set as follows: the execution state variable indicates "before execution" if the value of the state variable is "1"; and "under execution" if the value is "2"; etc. The execution states of a control program in other embodiments described below are similarly managed.

After the communication circuits (the PLC system bus controller 120 and/or the field network controller 140) has received input data, when one control program requests use of a plurality of portions of input data, these portions of input data are copied batchwise from the reception buffer to the corresponding input synchronization buffers. Input synchronization buffers are grouped into units in each of which a plurality of portions of input data are copied batchwise. The input synchronization buffers of the same group are set to have the same write protected state. The input synchronization buffers of the same group are similarly set to have the same "reference target" state, "write target" state, "standby" state, and "latest" state in other embodiments described below. When input data is copied to a set of two or three input synchronization buffers, only one input synchronization buffer of the set is allowed to be a copy destination in a single simultaneous copy operation, so that the two or three input synchronization buffers belonging to the same set belong to different groups.

In the first embodiment, the states of the output synchronization buffers are not defined. If the states of the output synchronization buffers are defined in other embodiments described below, the output synchronization buffers are grouped into units in each of which output data is simultaneously copied to the transmission buffer, similar to when the states of the input synchronization buffers are defined. The output synchronization buffers belonging to the same group are set to the same state.

The write protected state of an input synchronization buffer is represented by recording that the input synchronization buffer is in the "write protected" state, in a write protected state recording area. The write protected state recording area is produced in the control program working area 1042 of the main memory 104 by the system program 210 in "the execution preparation process for the control operation of the PLC 1" (step S1 of FIG. 5). The form in which it is recorded that an input synchronization buffer is in the "write protected" state can be appropriately determined. For example, information (an identification number of a group of input synchronization buffers, etc.) may be recorded which specifies one input synchronization buffer group which is in the "write protected"

state of the input synchronization buffer groups in each of which portions of input data are copied in a batch to input synchronization buffers belonging thereto. Alternatively, a flag or a state variable which indicates whether or not an input synchronization buffer group is in the "write protected" state, may be provided for each input synchronization buffer group, and the presence or absence of the "write protected" state may be recorded using the value of the flag or the state variable.

In the first embodiment, one output synchronization buffer is produced for each output data, and is not set to the "write protected" state. Therefore, a normal variable area in which the control program 230 stores output data may be employed as output synchronization buffers.

Additional reception and/or transmission may be performed with timing different from the reception timing of FIG. 6 and/or the transmission timing of FIG. 8. In such a case, an additional input synchronization buffer and/or output synchronization buffer may be provided which are related to input data handled in the additional reception and/or output data handled in the additional transmission, and may be used to execute an additional control program during a free time of the microprocessor 100.

In the sequence diagram of FIG. 6, the input synchronization buffer 2 is in the "write protected" state immediately after reception of input data in the control cycle 2, and therefore, the input data is not copied to the input synchronization buffer 2. As a result, the control program 2 of which execution has started in the control cycle 1 reads out input data which has not been updated from the input synchronization buffer 2 even after the execution is restarted in the control cycle 2. Therefore, the process can be executed using consistent input data during a period of time from the start to end of the execution.

For example, when execution of the control program 2 quickly ends in a control cycle 3, the write protected state of the input synchronization buffer 2 is already cancelled in a control cycle 4, and therefore, coping to the input synchronization buffer 2 is performed in the control cycle 4.

f3: Flowchart

Figure 10:
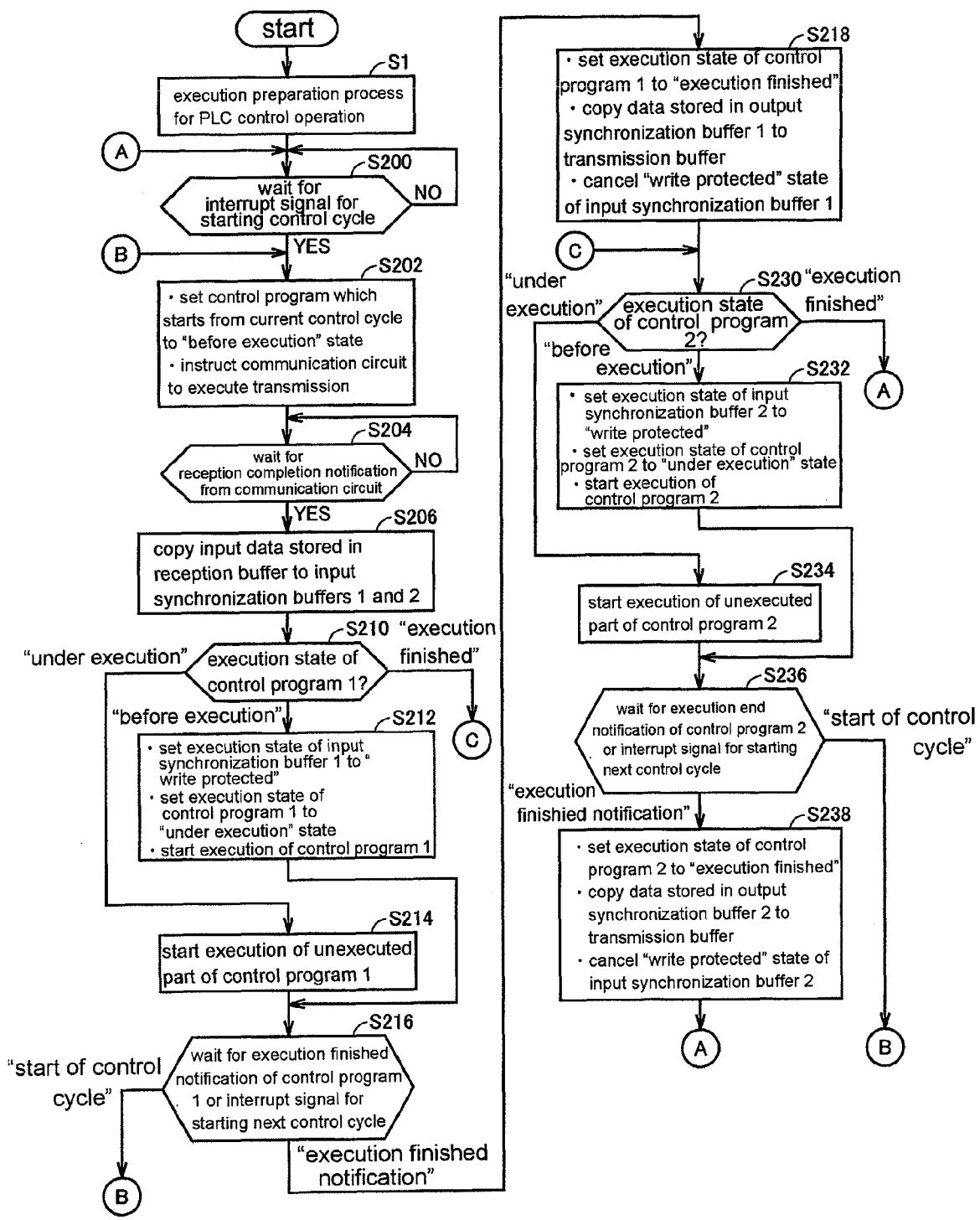
FIG. 10 is a flowchart showing an execution operation according to the first embodiment.

FIG. 10 is a flowchart showing an execution operation according to the first embodiment. Referring to FIG. 10, the microprocessor 100 executes the execution preparation process for the control operation of the PLC 1 in the system program 210 (step S1). Following this, the microprocessor 100 executes the execution control process for the control operation of the PLC 1 in the system program 210 (step S2 of FIG. 5). Steps S200-S238 correspond to a detailed example of the execution control process for the control operation of the PLC 1.

Initially, the microprocessor 100 waits for an interrupt signal for starting a control cycle (step S200). When receiving an interrupt signal for starting a control cycle (YES in step S200), the microprocessor 100 sets a control program which is to be started from the current control cycle to the "before execution" state, and instructs the communication circuits (the PLC system bus controller 120 and/or the field network controller 140) to execute transmission (step S202). Specifically, when an execution cycle of the control program 1 starts from the current control cycle, the control program 1 is set to the "before execution" state. Similarly, when an execution cycle of the control program 2 starts from the current control cycle, the control program 2 is set to the "before execution" state.

Also, in response to the transmission execution instruction, data stored in the transmission buffer (the PLC system bus transmission buffer 1043 and/or the field network transmission buffer 1045) is transmitted to other units etc.

Thereafter, the microprocessor 100 waits for a reception completion notification from the communication circuits (the PLC system bus controller 120 and/or the field network controller 140) (step S204).

The communication circuit issues a reception completion notification after storing input data into the reception buffers (the PLC system bus reception buffer 1044 and/or the field network reception buffer 1046) of the main memory 104. When receiving the reception completion notification from the communication circuit (YES in step S204), the microprocessor 100 copies the input data stored in the reception buffer to the input synchronization buffers 1 and 2 (step S206). Note that the input data is not copied to any of the input synchronization buffers 1 and 2 that is in the "write protected" state.

Thereafter, the microprocessor 100 determines the execution state of the control program 1 (step S210). If the control program 1 in the "before execution" state ("before execution" in step S210), the microprocessor 100 sets the execution state of the input synchronization buffer 1 to the "write protected" state, and the execution state of the control program 1 to the "under execution" state, and starts execution of the control program 1 (step S212).

If the control program 1 is in the "under execution" state ("under execution" in step S210), the microprocessor 100 starts execution of the unexecuted part of the control program 1 (step S214). Note that the execution state "write protected" of the input synchronization buffer 1 is not changed, and is maintained.

If the control program 1 is in the "execution finished" state ("execution finished" in step S210), the process proceeds to step S230.

In step S212 or S214, when the control program 1 starts (or restarts) execution, the microprocessor 100 waits for an execution finished notification of the control program 1 or an interrupt signal for starting the next control cycle (step S216). Note that in step S212 or S214, the start (or restart) of execution of the control program 1 switches a process executed by the microprocessor 100 from a process of the system program to a process of the control program 1. In other words, the microprocessor 100 does not execute the system program during a period of time from the start to end of execution of the control program 1. If an interrupt for starting the next control cycle occurs before the end of execution of the control program 1, the real-time OS 200 interrupts the execution of the control program 1 in the microprocessor 100, and causes the microprocessor 100 to restart execution of the system program. Alternatively, if there is a notification indicating the end of execution of the control program 1 (an execution finished notification of the control program 1), a target to be executed by the microprocessor 100 is changed from the control program 1 back to the system program.

When receiving an execution finished notification of the control program 1 ("execution finished notification" in step S216), the microprocessor 100 sets the execution state of the control program 1 to the "execution finished" state, and copies output data stored in the output synchronization buffer 1 to the transmission buffer (the PLC system bus transmission buffer 1043 and/or the field network transmission buffer 1045), and cancels the "write protected" state of the input synchronization buffer 1 (step S218). Thereafter, the process proceeds to step S230.

On the other hand, when receiving an interrupt signal for starting the next control cycle before an execution finished notification of the control program 1 ("start of control cycle" in step S216), the control program 1 which is being executed in the microprocessor 100 is interrupted, and the microprocessor 100 executes step S202 and the following steps again. Note that FIGS. 6-9 shows an example in which the execution cycle of the control program 1 is equal to the control cycle, and the control program 1 contains an amount of process which can be ended within the control cycle. Unless the execution of the control program 1 is ended within the control cycle, the execution cycle of the control program 1 is extended. Specifically, the execution of the control program 1 is interrupted, and the unexecuted part of the control program 1 is executed in the next control cycle. Alternatively, when the execution of the control program 1 is not ended within the control cycle (execution cycle), it may be determined that an error occurs, and an error process may be performed. For the control program 2 of FIG. 6-9 and other embodiments, when a control program is not ended within the execution cycle, similarly the execution cycle may be extended or an error process may be performed.

In step S230, the microprocessor 100 determines the execution state of the control program 2 (step S230). If the control program 2 is in the "before execution" state ("before execution" in step S220), the microprocessor 100 sets the execution state of the input synchronization buffer 2 to the "write protected" state, and the execution state of the control program 2 to the "under execution" state, and starts execution of the control program 2 (step S232).

If the control program 2 is in the "under execution" state ("under execution" in step S230), the microprocessor 100 starts execution of the unexecuted part of the control program 2 (step S234). Note that the execution state "write protected" of the input synchronization buffer 2 is not changed and is maintained.

If the control program 2 is in the "execution finished" state ("execution finished" in step S230), the process proceeds to step S200. Specifically, the control program 2 waits for an interrupt signal for starting the next control cycle.

When starting (or restarting) execution of the control program 2 in step S232 or S234, the microprocessor 100 waits for an execution finished notification of the control program 2 or an interrupt signal for starting the next control cycle (step S236). Note that in step S232 or S234, the start (or restart) of the control program 2 switches a process executed by the microprocessor 100 from a process of the system program to a process of the control program 2. In other words, the microprocessor 100 does not execute the system program during a period of time from the start to end of execution of the control program 2. If an interrupt for starting the next control cycle occurs before the execution of the control program 2 ends, the real-time OS 200 interrupts the execution of the control program 2 in the microprocessor 100, and causes the microprocessor 100 to restart execution of the system program. Alternatively, if there is a notification indicating the end of execution of the control program 2 (an execution finished notification of the control program 2), a target to be executed by the microprocessor 100 is changed from the control program 2 back to the system program.

When receiving an execution finished notification of the control program 2 ("execution finished notification" in step S236), the microprocessor 100 sets the execution state of the control program 2 to the "execution finished" state, and copies output data stored in the output synchronization buffer 2 to the transmission buffer (the PLC system bus transmission buffer 1043 and/or the field network transmission buffer 1045), and cancels the "write protected" state of the input synchronization buffer 2 (step S238). Thereafter, the process proceeds to step S200. Specifically, the microprocessor 100 waits for an interrupt signal for starting the next control cycle.

On the other hand, when receiving an interrupt signal for starting the next control cycle before an execution finished notification of the control program 2 ("start of control cycle" in step S236), the control program 2 which is being executed in the microprocessor 100 is interrupted, and the microprocessor 100 executes step S202 and the following steps again.

f4: Summary

As described above, in the first embodiment, the system program 210 includes, as the execution preparation process for the control operation of the PLC 1 which is related to inputting of input data, the following processes (a) and (b).

(a) A process for producing reception buffers (the PLC system bus reception buffer 1044 and the field network reception buffer 1046 of FIG. 4) for storing received input data, in the main memory 104 (storage means) (step S1 of FIG. 10).

(b) A process for producing, for each input data referred to by a control program, an input synchronization buffer (the input synchronization buffers 1 and 2 of FIGS. 6 and 7) used by the control program as a reference target for the input data, in the main memory 104 (storage means) (the input synchronization buffer area 1042b of FIG. 4) (step S1 of FIG. 10).

In the first embodiment, the system program 210 also includes, as the execution control process for the control operation of the PLC 1, the following processes (c)-(e).

(c) An input copy process for copying received input data from the reception buffers (the PLC system bus reception buffer 1044 and the field network reception buffer 1046 of FIG. 4) to the input synchronization buffer corresponding to that input data, on the condition that the input synchronization buffer as a copy destination is not in the "write protected" state (step S206 of FIG. 10).

(d) A control program start process for starting execution of the control program after setting an input synchronization buffer to be referred to by the control program whose execution is to be started to the "write protected" state (steps S212 and S232 of FIG. 10).

(e) A write protected cancelling process for cancelling, when execution of the control program ends, the write protected state of the synchronization buffer that has been in the write protected state (steps S218 and S238 of FIG. 10).

According to the above processing scheme related to input data of the first embodiment, even if there is a period of time in which an input synchronization buffer is in the "write protected" state, then when, for example, the priority level of execution is controlled in a control cycle shared by an input/output process and each control program, the control program can refer to latest input data that exists at the start of the execution. In other words, in such a case, input data to be referred to by the control program can be obtained by an input copy process which is performed during a period of time other than the "write protected" state time period.

According to the processing scheme related to input data of the first embodiment, for each control program a single input synchronization buffer is provided for each input data referred to by the control program. Therefore, even if the number of portions of input data and/or the number of control programs are large, the memory size of the input synchronization buffers is small. Also, because the single input synchronization buffer is employed, the algorithm is simple, and therefore, the design of the system program can be facilitated.

On the other hand, in the first embodiment, the system program 210 includes, as the execution preparation process for the control operation of the PLC 1, the following processes ($\alpha$)-($\gamma$) including processes related to outputting of output data.

(α) A process for producing reception buffers (the PLC system bus reception buffer 1044 and the field network reception buffer 1046 of FIG. 4) for storing received input data and a transmission buffer (the PLC system bus transmission buffer 1043 and the field network transmission buffer 1045 of FIG. 4) for storing output data to be transmitted, in the main memory 104 (storage means) (step S1 of FIG. 10).

(β) A process for producing, for each input data referred to by a control program, an input synchronization buffer (the input synchronization buffers 1 and 2 of FIGS. 6 and 7) used by the control program as a reference target for the input data, in the main memory 104 (storage means) (the input synchronization buffer area 1042b of FIG. 4) (step S1 of FIG. 10).

(γ) A process for producing output synchronization buffers (the output synchronization buffers 1 and 2 of FIGS. 8 and 9) for storing output data to be copied to the transmission buffer, in the main memory 104 (storage means) (the output synchronization buffer area 1042a of FIG. 4) (step S1 of FIG. 10).

In the first embodiment, the system program 210 also includes, as the execution control process for the control operation of the PLC 1, the following processes (δ)-(ζ).

(δ) An input copy process for copying received input data from the reception buffers (the PLC system bus reception buffer 1044 and the field network reception buffer 1046 of FIG. 4) to the input synchronization buffer corresponding to that input data (step S206 of FIG. 1).

(ε) A control program start process for starting execution of the control program (steps S212 and S232 of FIG. 10).

(ζ) An output copy process for copying output data produced by the control program from the output synchronization buffer to the transmission buffer when execution of the control program ends (steps S218 and S238 of FIG. 10).

According to the above processing scheme related to output data of the first embodiment, a single output synchronization buffer is sufficient for each output data.

Also, according to the processing scheme related to output data of the first embodiment, when execution of a control program ends, output data is copied from the output synchronization buffer to the transmission buffer. Therefore, it is possible to avoid transmission of output data which has not yet been completely prepared when the control program is being executed. Output data is transmitted at the first transmission timing after being copied to the transmission buffer irrespective of whether or not it is an execution cycle of a control program, the prepared output data can be quickly transmitted.

G. Scheme for Successively Copying to Two Input Synchronization Buffers

Second Embodiment g1: Overview

In the first embodiment, an example configuration has been described in which an input synchronization buffer is caused to be in the "write protected" state when a control program is being executed, and input data is not copied to the input synchronization buffer in the "write protected" state. In contrast to this, a configuration will be described in which input data stored in the reception buffer can be copied to an input synchronization buffer irrespective of the execution state of a control program.

More specifically, in the second embodiment, two input synchronization buffers are produced as a set of input synchronization buffers for each input data referred to by the control program.

g2: Sequence Diagram

Figure 11:
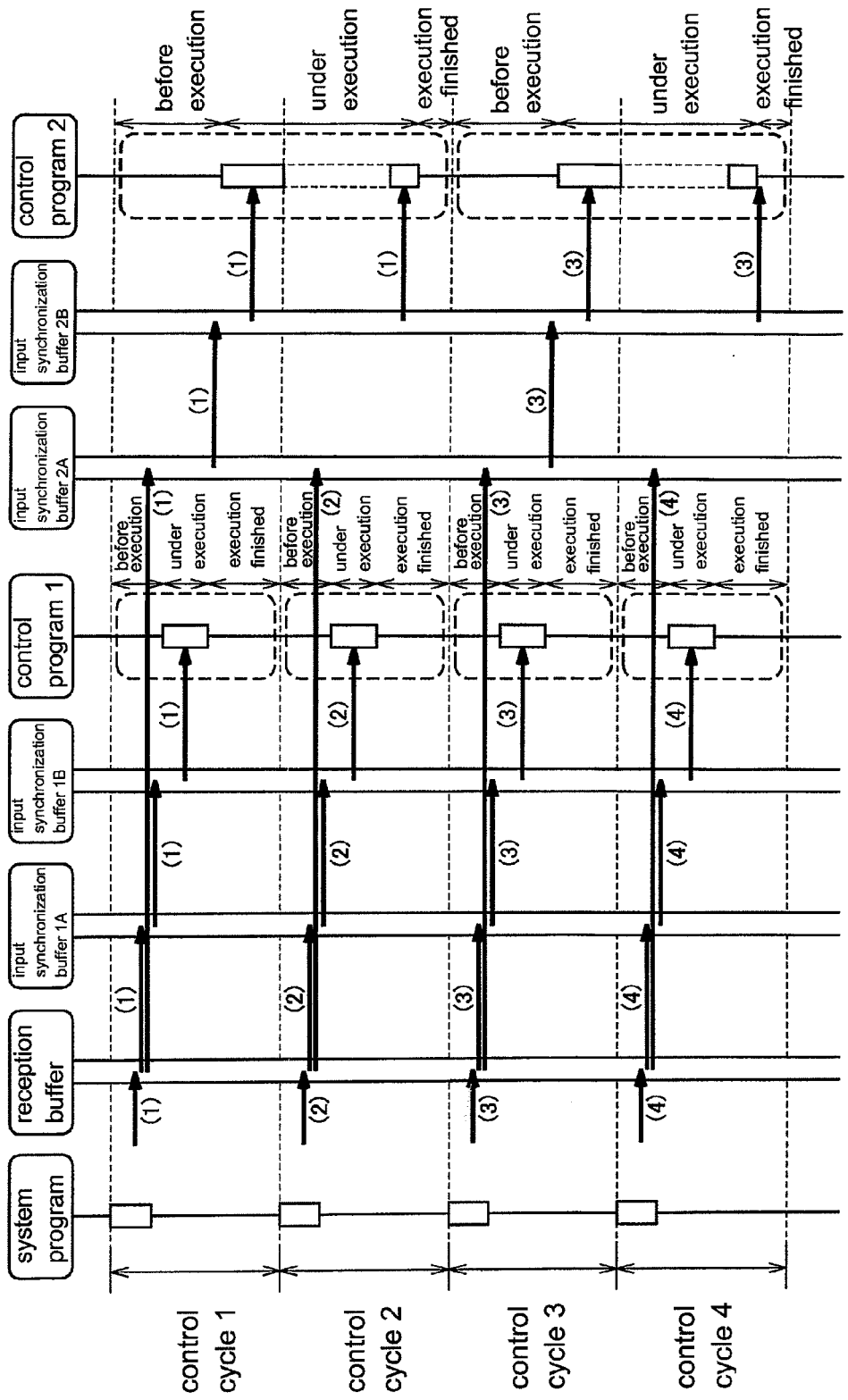
FIG. 11 is a sequence diagram showing an operation in an input direction according to a second embodiment.

FIG. 11 is a sequence diagram showing an operation in an input direction according to the second embodiment. FIG. 11 shows an example in which two control programs (control programs 1 and 2) are executed in a time-division manner. In this example, a set of input synchronization buffers (input synchronization buffers 1A and 1B) are provided for input data referred to by the control program 1, and similarly, a set of input synchronization buffers (input synchronization buffers 2A and 2B) are provided for input data referred to by the control program 2.

Note that an operation in an output direction according to the second embodiment (a process related to output data) is similar to the operation of the first embodiment (the process described in the sequence diagram of FIG. 8) and will not be described in detail.

In the second embodiment, input data from the reception buffer is always copied to a specific one (the input synchronization buffer 1A or 2A) of the set of input synchronization buffers. Input data is copied from one (the input synchronization buffer 1A or 2A) of the input synchronization buffers to the other (the input synchronization buffer 1B or 2B) before the start of execution of a control program. Input data stored in the other input synchronization buffer (the input synchronization buffer 1B or 2B) is referred to by the control program.

In other words, input data can be always copied from the reception buffer to one of the set of input synchronization buffers irrespective of the execution state of the control program. Input data stored in the other input synchronization buffer can be referred to by the control program irrespective of the copying operation of input data from the reception buffer.

g3: Flowchart

Figure 12:
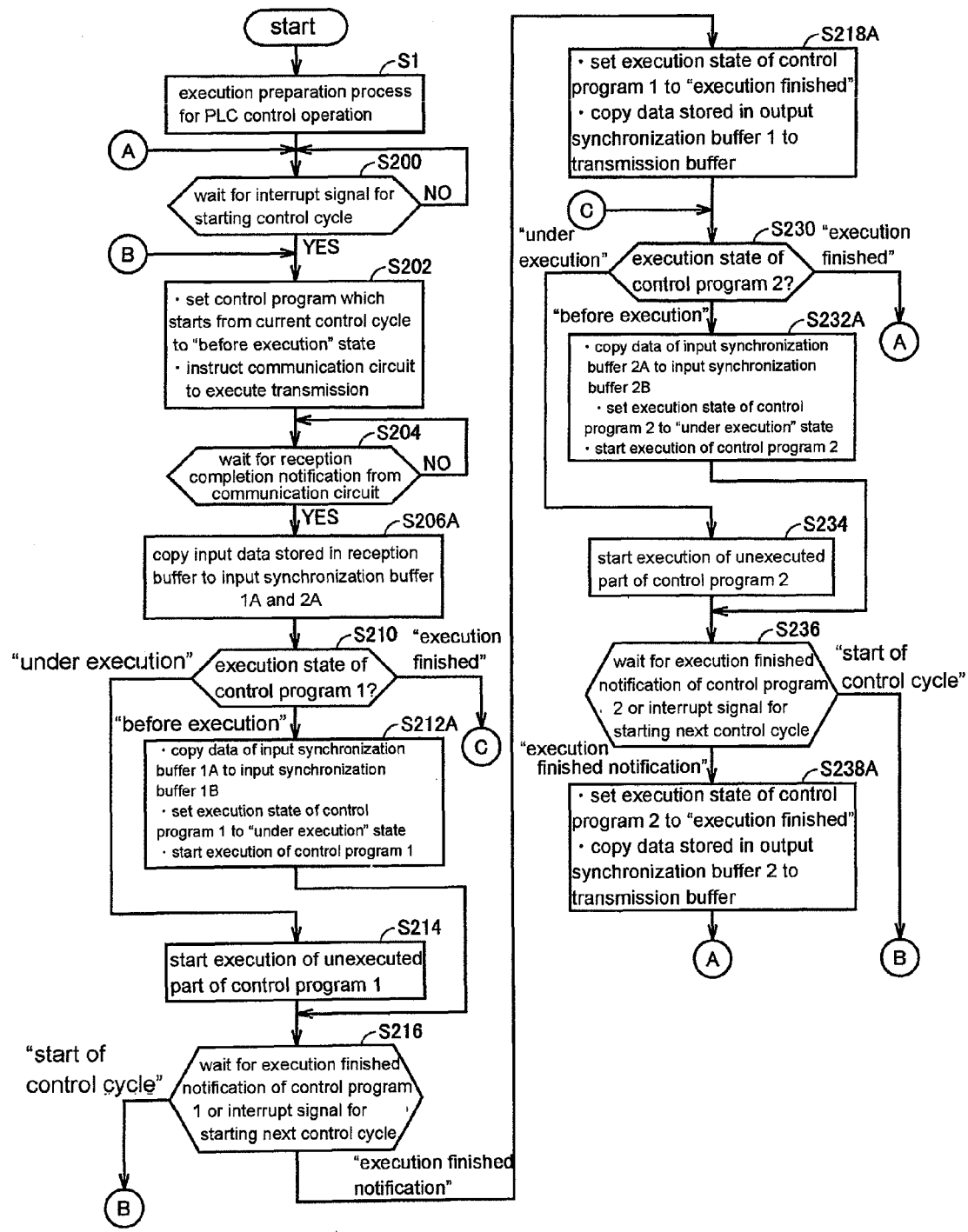
FIG. 12 is a flowchart showing an execution operation according to the second embodiment.

FIG. 12 is a flowchart showing an execution operation according to the second embodiment. In the flowchart of FIG. 12, steps which execute the same processes as those of the flowchart of FIG. 10 are indicated by the same step numbers as those of FIG. 10.

The flowchart of FIG. 12 is different from the flowchart of FIG. 10 in that processes of steps S206A, S212A, S218A, S232A, and S238A are executed instead of steps S206, S212, S218, S232, and S238. This difference will be mainly described hereinafter, and the other processes will not be described again in detail.

When receiving a reception completion notification from the communication circuit (YES in step S204), the microprocessor 100 copies input data stored in the reception buffers (the PLC system bus reception buffer 1044 and/or the field network reception buffer 1046) to the input synchronization buffers 1A and 2A (step S206A). The input synchronization buffers 1A and 2A are not set to the "write protected" state, and therefore, copying of input data is not limited.

In step S212A which is executed when the control program 1 is in the "before execution" state ("before execution" in step S210), the microprocessor 100 copies input data stored in the input synchronization buffer 1A to the input synchronization buffer 1B, sets the execution state of the control program 1 to the "under execution" state, and starts execution of the control program 1 (step S212A).

Note that in step S214 which is executed when the control program 1 is in the "under execution" state ("under execution" in step S210), input data stored in the input synchronization buffer 1A is not copied to the input synchronization buffer 1B.

In step S218A which is executed when receiving an execution finished notification of the control program 1 ("execution finished notification" in step S216), the microprocessor 100 sets the execution state of the control program 1 to the "execution finished" state, and copies output data stored in the output synchronization buffer 1 to the transmission buffer (the PLC system bus transmission buffer 1043 and/or the field network transmission buffer 1045) (step S218A).

In step S232A which is executed when the control program 2 is in the "before execution" state ("before execution" in step S230), the microprocessor 100 copies input data stored in the input synchronization buffer 2A to the input synchronization buffer 2B, sets the execution state of the control program 2 to the "under execution" state, and starts execution of the control program 2 (step S232A).

Note that in step S234 which is executed when a control program is in the "under execution" state ("under execution" in step S230), input data stored in the input synchronization buffer 2A is not copied to the input synchronization buffer 2B.

In step S238A which is executed when receiving an execution finished notification of the control program 2 ("execution finished notification" in step S236), the microprocessor 100 sets the execution state of the control program 2 to the "execution finished" state, and copies output data stored in the output synchronization buffer 2 to the transmission buffer (the PLC system bus transmission buffer 1043 and/or the field network transmission buffer 1045) (step S238A).

g4: Summary

As described above, in the second embodiment, the system program 210 includes, as the execution preparation process for the control operation of the PLC 1 which is related to inputting of input data, the following processes (a) and (b).

(a) A process for producing reception buffers (the PLC system bus reception buffer 1044 and the field network reception buffer 1046 of FIG. 4) for storing received input data, in the main memory 104 (storage means) (step S1 of FIG. 10).

(b) A process for producing, for each input data referred to by a control program, a first input synchronization buffer (the input synchronization buffers 1A and 2A of FIG. 11) and a second input synchronization buffer (the input synchronization buffers 1B and 2B of FIG. 11), in the main memory 104 (storage means) (step S1 of FIG. 10). Here, the second input synchronization buffer is used by the control program as a reference target for the input data.

In the second embodiment, the system program 210 also includes, as the execution control process for the control operation of the PLC 1, the following processes (c) and (d).

(c) An input copy process for copying received input data from the reception buffers (the PLC system bus reception buffer 1044 and the field network reception buffer 1046 of FIG. 4) to the first input synchronization buffer (the input synchronization buffers 1A and 2A of FIG. 11) corresponding to the input data (step S206A of FIG. 12).

(d) A control program start process for starting execution of the control program after copying data stored in the first input synchronization buffers (the input synchronization buffers 1A and 2A of FIG. 11) to the second input synchronization buffers (the input synchronization buffers 1B and 2B of FIG. 11) (steps S212A and S232A of FIG. 12).

According to the above processing scheme of the second embodiment, input data can be always copied from the reception buffer to the first input synchronization buffer, and copying from the input synchronization buffer to the second input synchronization buffer is performed at the start of execution of the control program, and therefore, the control program can refer to the latest input data present at the start of the execution.

Also, according to the processing scheme of the second embodiment, when input data is copied to the first input synchronization buffer, it is not necessary to determine the state of the input synchronization buffer as the copy destination. Therefore, the algorithm is simple, and therefore, the design of the system program can be facilitated.

H. Scheme for Selecting Two Input Synchronization Buffers

Third Embodiment h1: Overview

In the second embodiment, an example has been illustrated in which two input synchronization buffers are used to successively send out data. In contrast to this, in the third embodiment, a configuration will be described in which a plurality of (typically, two) input synchronization buffers are selectively used, whereby at least one input synchronization buffer to which input data can be written is always available.

h2: Sequence Diagram

Figure 13:
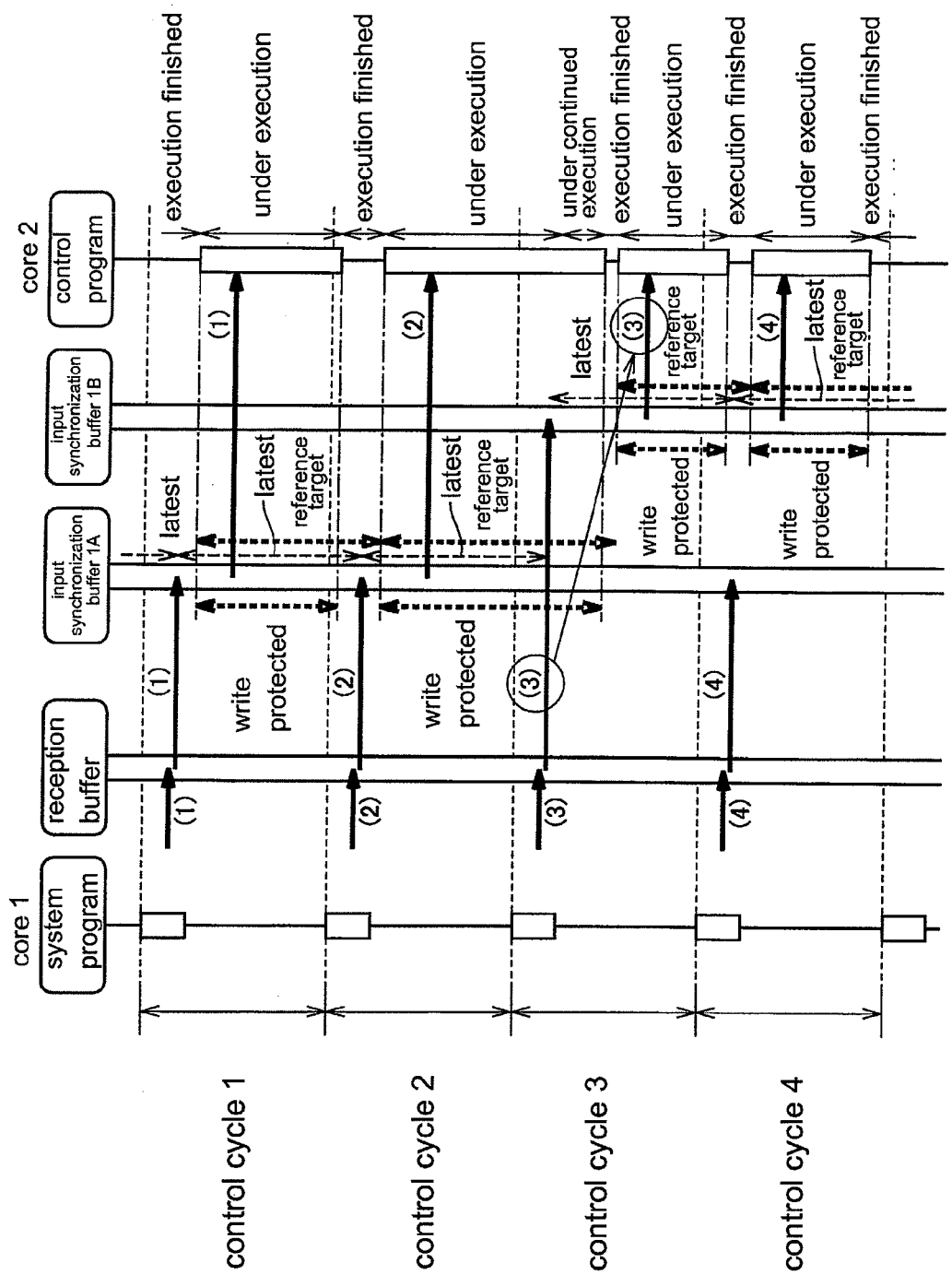
FIG. 13 is a sequence diagram showing an operation in an input direction according to a third embodiment.

FIG. 13 is a sequence diagram showing an operation in an input direction according to the third embodiment. FIG. 13 shows a process where a multi-core (specifically, dual-core) microprocessor, having a plurality of cores, is typically used. Specifically, it is assumed that a core 1 executes the system program, and a core 2 executes a control program 1. Note that the scheme of the third embodiment is executable even when a single-core microprocessor, having only a single core, is used.

More specifically, in the scheme of the third embodiment shown in FIG. 13, the system program and the control program 1 may be executed in parallel. Although the control program 1 can be executed at any time in terms of the resources of the core, it is here assumed that the control program 1 also uses the output and input processes of the system program, and therefore, execution of the control program 1 is normally started after the end of an output process and an input process at the beginning of each control cycle.

As shown in FIG. 13, a set of input synchronization buffers (input synchronization buffers 1A and 1B) are provided for input data referred to by the control program 1. The states of the input synchronization buffers include a write protected state, a reference target state, and a latest state (state in which latest data is stored). The states of the input synchronization buffers are represented by recording that the input synchronization buffers are in the write protected state, the reference target state, and the latest state, in a write protected state recording area, a reference target state recording area, and a latest state recording area, respectively. These recording areas are produced in the control program working area 1042 of the main memory 104 by the system program 210 in "an execution preparation process of a control program for a control operation of the PLC 1" (step S1 of FIG. 5). The form in which it is recorded that an input synchronization buffer is in the write protected state, the reference target state, and the latest state can be appropriately determined. For example, information (an identification number of a group of input synchronization buffers, etc.) may be recorded which specifies one input synchronization buffer group which is in the write protected state, the reference target state, or the latest state of the input synchronization buffer groups in each of which portions of input data are copied batchwise to input synchronization buffers belonging thereto. Alternatively, a flag or a state variable which indicates whether or not an input synchronization buffer group is in the write protected state, the reference target state, or the latest state, may be provided for each input synchronization buffer group, and the recording may be performed using the value of the flag or the state variable.

Note that an operation in an output direction according to the third embodiment (a process related to output data) is similar to the operation of the first embodiment (the process described in the sequence diagram of FIG. 8). Specifically, when execution of a control program ends, output data produced by the execution of the control program is copied from the output synchronization buffer to the transmission buffer. When a control cycle starts, output data is transmitted from the transmission buffer. Here, a more detailed description will not be repeated.

h3: Flowchart

Figure 14:
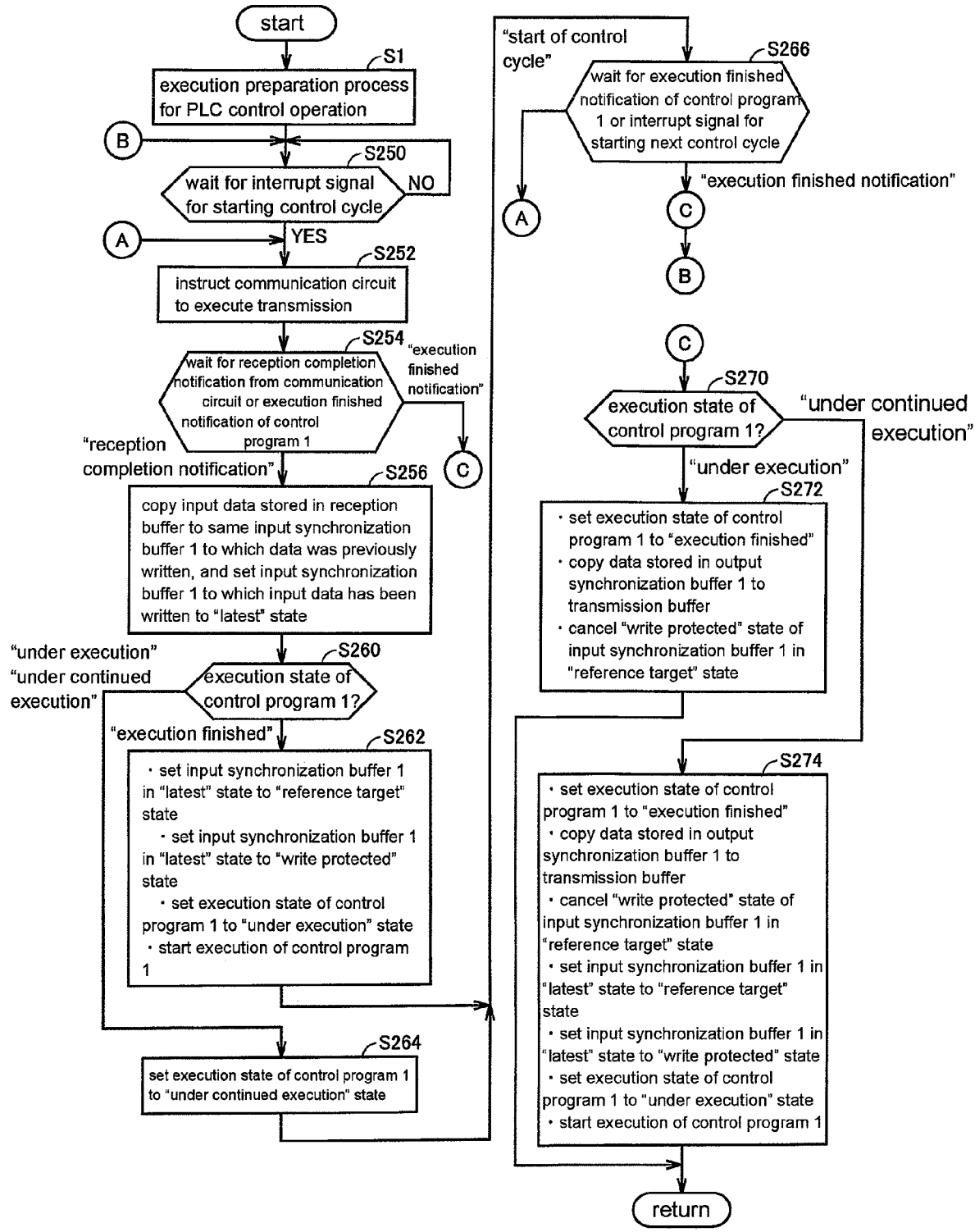
FIG. 14 is a flowchart showing an execution operation according to the third embodiment.

FIG. 14 is a flowchart showing an execution operation according to the third embodiment. Referring to FIG. 14, the microprocessor 100 (the core 1) executes the execution preparation process for the control operation of the PLC 1 in the system program (step S1). Following this, the microprocessor 100 (the core 1) executes the execution control process for the control operation of the PLC 1 in the system program 210 (step S2 of FIG. 5). Steps S250-S274 correspond to a detailed example of the execution control process for the control operation of the PLC 1.

Initially, the microprocessor 100 (the core 1) waits for an interrupt signal for starting a control cycle (step S250). When receiving an interrupt signal for starting a control cycle (YES in step S250), the microprocessor 100 (the core 1) instructs the communication circuits (the PLC system bus controller 120 and/or the field network controller 140) to execute transmission (step S252). In response to the transmission execution instruction, data stored in the transmission buffer (the PLC system bus transmission buffer 1043 and/or the field network transmission buffer 1045) is transmitted to other units etc.

Following this, the microprocessor 100 waits for a reception completion notification from the communication circuits (the PLC system bus controller 120 and/or the field network controller 140) or a execution finished notification of the control program 1 (step S254).

When an execution finished notification of the control program 1 is received ("execution finished notification" in step S254), the process proceeds to step S270.

On the other hand, when receiving a reception completion notification from the communication circuit ("reception completion notification" in step S254), the microprocessor 100 (the core 1) copies input data stored in the reception buffers (the PLC system bus reception buffer 1044 and/or the field network reception buffer 1046) to the same input synchronization buffer 1 (the input synchronization buffer 1A or 1B) to which input data was previously written, and sets the input synchronization buffer 1 to which input data has been written, to the "latest" state (step S256). Note that when the same input synchronization buffer 1 to which input data was previously written is in the "write protected" state, input data is copied to the other input synchronization buffer 1.

Thereafter, the microprocessor 100 (the core 1) determines the execution state of the control program 1 (step S260). If the control program 1 is in the "execution finished" state ("execution finished" in step S260), the microprocessor 100 (core 1) sets the input synchronization buffer 1 (the input synchronization buffer 1A or 1B) in the "latest" state to the "reference target" state and the "write protected" state, and sets the execution state of the control program 1 to the "under execution" state, and causes the core 2 to start execution of the control program 1 (step S262). Thereafter, the process proceeds to step S266.

If the control program 1 is in the "under execution" state or an "under continued execution" state ("under execution"/ "under continued execution" in step S260), the microprocessor 100 (the core 1) sets the execution state of the control program 1 to the "under continued execution" state (step S264). In this case, the "reference target" state and the "write protected" state of the corresponding input synchronization buffers 1 (the input synchronization buffer 1A or 1B) are both maintained, and the execution of the control program 1 is continued. Thereafter, the process proceeds to step S266.

When starting (or restarting) execution of the control program 1 in step S262 or S264, the microprocessor 100 (the core 1) waits for an execution finished notification of the control program 1 or an interrupt signal for starting the next control cycle (step S266).

When receiving an interrupt for starting the next control cycle before an execution finished notification of the control program 1 ("start of control cycle" in step S266), the microprocessor 100 (the core 1) executes step S252 and the following steps again.

On the other hand, when receiving an execution finished notification of the control program 1 ("execution finished notification" in step S266), the microprocessor 100 (the core 1) determines the execution state of the control program 1 (step S270).

If the control program 1 is in the "under execution" state ("under execution" in step S270), the microprocessor 100 (the core 1) sets the execution state of the control program 1 to the "execution finished" state, and copies output data stored in the output synchronization buffer 1 to the transmission buffer (the PLC system bus transmission buffer 1043 and/or the field network transmission buffer 1045), and cancels the "write protected" state of the input synchronization buffer 1 in the "reference target" state (step S272). Thereafter, the process returns to the remainder of the process (step S254 or S266) which was executed before step S270. When returning the remainder of step S266, the process proceeds to step S250.

On the other hand, when the control program 1 is in the "under continued execution" state ("under continued execution" in step S270), the microprocessor 100 (the core 1) sets the execution state of the control program 1 to the "execution finished" state, copies output data stored in the output synchronization buffer 1 to the transmission buffer (the PLC system bus transmission buffer 1043 and/or the field network transmission buffer 1045), cancels the "write protected" state of the input synchronization buffer 1 in the "reference target" state, sets the input synchronization buffer 1 (the input synchronization buffer 1A or 1B) in the "latest" state to the "reference target" state and the "write protected" state, and thereafter, sets the execution state of the control program 1 to the "under execution" state, and causes the core 2 to start execution of the control program 1 (step S274). Thereafter, the process returns to the remainder of the process (step S254 or S266) which was executed before step S270. When returning the remainder of step S266, the process proceeds to step S250.

h4: Summary

As described above, in the third embodiment, the system program 210 includes, as the execution preparation process for the control operation of the PLC 1 which is related to inputting of input data, the following processes (a)-(c).

(a) A process for producing reception buffers (the PLC system bus reception buffer 1044 and the field network reception buffer 1046 of FIG. 4) for storing received input data, in the main memory 104 (storage means) (step S1 of FIG. 14).

(b) A process for producing, for each input data referred to by a control program, a first input synchronization buffer (the input synchronization buffer 1A of FIG. 13) and a second input synchronization buffer (the input synchronization buffer 1B of FIG. 13), as a set of synchronization buffers, which are used by the control program as a reference target for the input data, in the main memory 104 (storage means) (step S1 of FIG. 14).

(c) A process for producing a latest state recording area in the main memory 104 (storage means) (step S1 of FIG. 14).

Also, in the third embodiment, the system program 210 includes, as the execution control process for the control operation of the PLC 1, the following processes (d)-(f).

(d) An input copy process for copying received input data from the reception buffers (the PLC system bus reception buffer 1044 and the field network reception buffer 1046 of FIG. 4) to any input synchronization buffer which is not in the "write protected" state, as a copy destination, of the first input synchronization buffer (the input synchronization buffer 1A of FIG. 13) and the second input synchronization buffer (the input synchronization buffer 1B of FIG. 13) corresponding to the input data, and recording that the input synchronization buffer serving as the copy destination is in the "latest" state, in the latest state recording area (step S256 of FIG. 14).

(e) A control program start process for starting execution of the control program, and setting the input synchronization buffer in the "latest" state which is specified by contents in the latest state recording area, to the "reference target" state in which the input synchronization buffer is referred to when executing the control program, and setting the input synchronization buffer to the "write protected" state (step S262 of FIG. 14).

(f) A write protected cancelling process for cancelling the "write protected" state of the input synchronization buffer when execution of the control program ends (step S274 of FIG. 14).

According to the above processing scheme related to input data of the third embodiment, for each control program two input synchronization buffers are provided for each input data referred to by the control program, and input data can be always written to at least one input synchronization buffer. Therefore, input data can be copied at any time. Moreover, by setting the input synchronization buffer storing the copied latest data to be a reference target based on contents in the latest state recording area at the start of execution of the control program, the control program can refer to the latest input data present at the start of the execution.

Note that compared to the first embodiment in which the "write protected" state is employed as in the third embodiment, the third embodiment has the following specific feature. For example, as indicated by a circle in FIG. 13, even when it becomes necessary to copy input data while one of the input synchronization buffers is in the "write protected" state, the input data can be copied to the other input synchronization buffer, and thereafter, the copied input data can be referred to by a control program. Therefore, it is possible to avoid a situation that when it becomes necessary to copy input data during a period of time of the "write protected" state, the input data therefore cannot be referred to by a control program. In particular, if a multi-core microprocessor executes the system program and a control program in parallel, input data copied to one of the input synchronization buffers can be referred to by the control program during a period of time in which the other input synchronization buffer is in the "write protected" state. Therefore, the third embodiment is more advantageous.

I. Update Flag Type Two-Input Synchronization Buffer Interchange Scheme

Fourth Embodiment i1: Overview

In the third embodiment, there is at least one input synchronization buffer which is not in the "write protected" state, whereby input data can be copied at any time. In contrast to this, in the fourth and fifth embodiments, input synchronization buffers are exclusively set to the "write target" state or the "reference target" state, and these states are interchanged, whereby input data can be copied at any time. In particular, the fourth embodiment illustrates a configuration in which a latest input data update flag is used to control the interchanging of the states of an input synchronization buffer.

i2: Sequence Diagram

Figure 15:
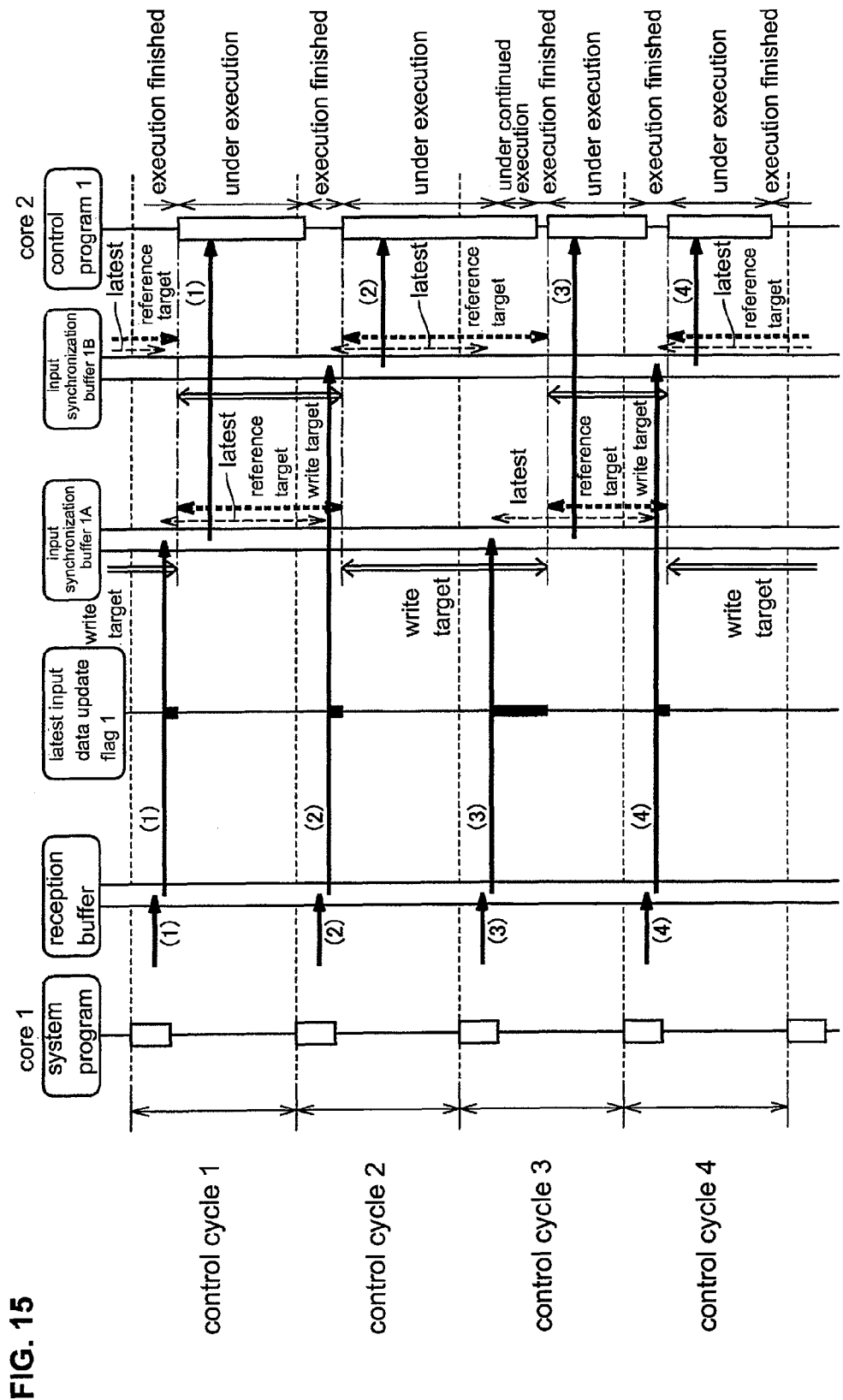
FIG. 15 is a sequence diagram showing operations in an input direction according to fourth and fifth embodiments.

FIG. 15 is a sequence diagram showing an operation in an input direction according to the fourth and fifth embodiments. Both in the fourth embodiment and in the fifth embodiment described below, the sequence diagram of FIG. 15 is referred to for a detailed description thereof. More specifically, in the fifth embodiment described below, a configuration will be described in which information for identifying a synchronization buffer storing copied latest data as a reference target is handled.

Therefore, when the fourth embodiment is described with reference to FIG. 15, the focus is only on a "latest input data update flag 1," and it is not necessary to identify "latest" states indicated along the time axes of input synchronization buffers 1A and 1B. On the other hand, when the fifth embodiment is described with reference to FIG. 15, the focus is only on identification of "latest" states indicated along the time axes of the input synchronization buffers 1A and 1B, and the "latest input data update flag 1" is not required.

In the sequence diagram of FIG. 15, the "write target" state and the "reference target" state are simply described as "write target" and "reference target."

FIG. 15 shows a process where a multi-core (specifically, dual-core) microprocessor, having a plurality of cores, is typically used. Specifically, it is assumed that a core 1 executes the system program, and a core 2 executes a control program 1. Note that the schemes of the fourth and fifth embodiments are also executable even when a single-core microprocessor, having only a single core, is employed.

More specifically, in the schemes of the fourth and fifth embodiments of FIG. 15, the system program and the control program 1 may be executed in parallel. Although the control program 1 can be executed at any time in terms of the resources of the core, it is here assumed that the control program 1 also uses the output and input processes of the system program, and therefore, execution of the control program 1 is normally started after the end of an output process and an input process at the beginning of each control cycle.

Note that an operation in an output direction according to the fourth and fifth embodiments (a process related to output data) is similar to the operation of the first embodiment (the process described in the sequence diagram of FIG. 7). Specifically, when execution of a control program ends, output data produced by the execution of the control program is copied from the output synchronization buffer to the transmission buffer. When a control cycle starts, output data is transmitted from the transmission buffer. Here, a more detailed description will not be repeated.

The "write target" state and the "reference target" state of an input synchronization buffer are represented by recording that the input synchronization buffer is in the "write target" state and the "reference target" state, in the write target state recording area and the reference target state recording area, respectively. These state recording areas are produced in the control program working area 1042 of the main memory 104 by the system program 210 in "the execution preparation process for the control operation of the PLC 1" (step S1 of FIG. 5). The form in which it is recorded that an input synchronization buffer is in the "write target" state/the "reference target" state can be appropriately determined. For example, information (an identification number of a group of input synchronization buffers, etc.) may be recorded which specifies the input synchronization buffer groups that are in the "write target" state/the "reference target" state of the input synchronization buffer groups in each of which portions of input data are copied batchwise to input synchronization buffers belonging thereto. Alternatively, a flag or a state variable which indicates whether or not an input synchronization buffer group is in the "write target" state/the "reference target" state, may be provided for each input synchronization buffer group, and the recording may be performed using the value of the flag or the state variable. In particular, in this embodiment, the "write target" state or the "reference target" state is allocated to one input synchronization buffer without overlapping. Therefore, a common state recording area may be produced without separating the write target state recording area and the reference target state recording area, and one flag or state variable may be used to indicate whether the input synchronization buffer group is in the "write target" state or in the "reference target" state.

Note that a thick line portion of a vertical line (a line along the time axis) of the latest input data update flag 1 shown in the sequence diagram (FIG. 15) of the fourth embodiment indicates that the latest input data update flag 1 is on. The latest input data update flag 1 is produced in the control program working area 1042 of the main memory 104 by the system program in "the execution preparation process for the control operation of the PLC 1." Here, the latest input data update flag 1 is provided for each set of input synchronization buffers which is used as a copy destination when a batch of input data is copied.

i3: Flowchart

Figure 16:
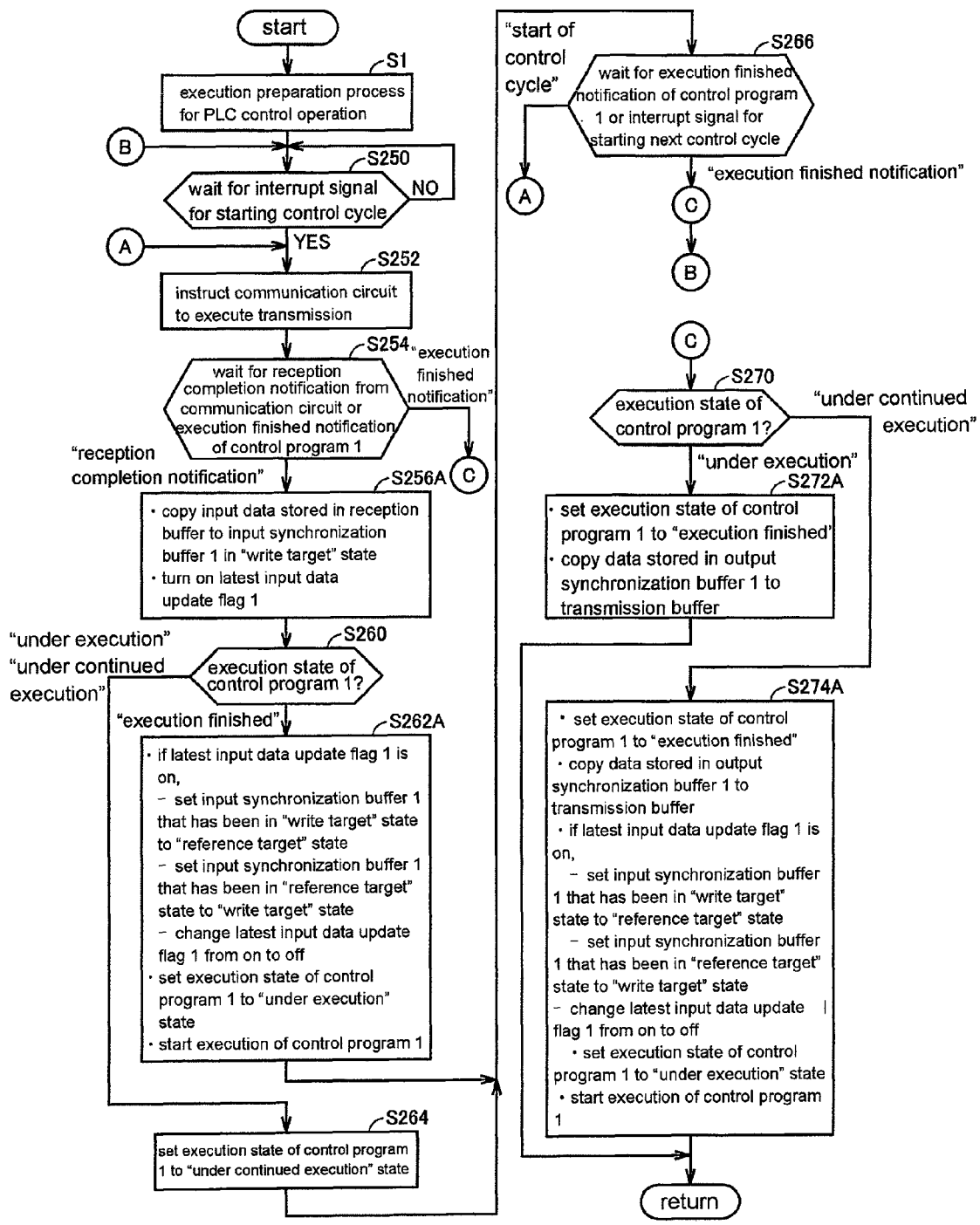
FIG. 16 is a flowchart showing an execution operation according to the fourth embodiment.

FIG. 16 is a flowchart showing an execution operation according to the fourth embodiment. In the flowchart of FIG. 16, steps which execute the same processes as those of the flowchart of FIG. 14 are indicated by the same step numbers as those of FIG. 14.

The flowchart of FIG. 16 is different from the flowchart of FIG. 14 in that processes of steps S256A, S262A, S272A, and S274A are executed instead of steps S256, S262, S272, and S274. This difference will be mainly described hereinafter, and the other processes will not be described in detail again.

In step S256A which is executed when receiving a reception completion notification from the communication circuit ("reception completion notification" in step S254), the microprocessor 100 (the core 1) copies input data stored in the reception buffers (the PLC system bus reception buffer 1044 and/or the field network reception buffer 1046) to the input synchronization buffer 1 (the input synchronization buffer 1A or 1B) in the "write target" state, and turns on the latest input data update flag 1 (step S256A).

In step S262A which is executed when the control program 1 is in the "execution finished" state ("execution finished" in step S260), if the latest input data update flag 1 is on, the input synchronization buffer 1 (the input synchronization buffer 1A or 1B) that has been in the "write target" state is set to the "reference target" state, and the input synchronization buffer 1 (the input synchronization buffer 1A or 1B) that has been in the "reference target" state is set to the "write target" state, and thereafter, the latest input data update flag 1 is changed from on to off (step S262A). Moreover, in step S262A, the microprocessor 100 (the core 1) sets the execution state of the control program 1 to the "under execution" state, and causes the core 2 to start execution of the control program 1 (step S262A).

Note that if the control program 1 is in the "under execution" state or the "under continued execution" state ("under execution"/"under continued execution" in step S260), the microprocessor 100 (the core 1) sets the execution state of the control program 1 to the "under continued execution" state (step S264). In this case, the "reference target" state and the "write target" state of the corresponding input synchronization buffers 1 (the input synchronization buffer 1A or 1B) are both maintained, and the execution of the control program 1 is continued.

If the control program 1 is in the "under execution" state ("under execution" in step S270), the microprocessor 100 (the core 1) sets the execution state of the control program 1 to the "execution finished" state, and copies output data stored in the output synchronization buffer 1 to the transmission buffer (the PLC system bus transmission buffer 1043 and/or the field network transmission buffer 1045) (step S272A).

In step S274A which is executed when the control program 1 is in the "under continued execution" state ("under continued execution" in step S270), the microprocessor 100 (the core 1) sets the execution state of the control program 1 to the "execution finished" state, and copies output data stored in the output synchronization buffer 1 to the transmission buffer (the PLC system bus transmission buffer 1043 and/or the field network transmission buffer 1045) (step S274A). Moreover, in step S274A, when the latest input data update flag 1 is on, the microprocessor 100 (the core 1) sets the input synchronization buffer 1 (the input synchronization buffer 1A or 1B) that has been in the "write target" state to the "reference target" state, and the input synchronization buffer 1 (the input synchronization buffer 1A or 1B) that has been in the "reference target" state to the "write target" state, and thereafter, changes the latest input data update flag 1 from on to off. In this case, if the latest input data update flag 1 is off, the "write target" state and the "reference target" state of the input synchronization buffers 1 are not changed, and the latest input data update flag 1 is maintained off. Thereafter, the microprocessor 100 (the core 1) sets the execution state of the control program 1 to the "under execution" state, and causes the core 2 to start execution of the control program 1.

i4: Summary

As described above, in the fourth embodiment, the system program 210 includes, as the execution preparation process for the control operation of the PLC 1 which is related to inputting of input data, the following processes (a)-(c).

(a) A process for producing reception buffers (the PLC system bus reception buffer 1044 and the field network reception buffer 1046 of FIG. 4) for storing received input data, in the main memory 104 (storage means) (step S1 of FIG. 16).

(b) A process for producing, for each input data referred to by a control program, a first input synchronization buffer (the input synchronization buffer 1A of FIG. 15) and a second input synchronization buffer (the input synchronization buffer 1B of FIG. 15), as a set of synchronization buffers, which are used by the control program as a reference target for the input data, in the main memory 104 (storage means) (step S1 of FIG. 16).

(c) A process for producing, for each control program, a latest input data update flag in the main memory 104 (storage means) (step S1 of FIG. 16). To the first input synchronization buffer and the second input synchronization buffer, any of a "write target" state in which input data can be copied from the reception buffers (the PLC system bus reception buffer 1044 and/or the field network reception buffer 1046 of FIG. 4) and a "reference target" state in which input data can be referred to by the control program, are allocated without overlapping.

In the fourth embodiment, the system program 210 also includes, as the execution control process for the control operation of the PLC 1, the following processes (d) and (e).

(d) An input copy process for copying received input data from the reception buffers (the PLC system bus reception buffer 1044 and the field network reception buffer 1046 of FIG. 4) to the input synchronization buffer in the "write target" state corresponding to the input data, and turning on the latest input data update flag related to the input copy (step S256A of FIG. 16).

(e) A control program start process for starting execution of the control program, and executing a third interchange process for interchanging, on the condition that as regards the input synchronization buffers for the control program whose execution is to be started, the input synchronization buffer storing latest data is in the "write target" state (i.e., the latest input data update flag related to the input synchronization buffers for the control program whose execution is to be started is on), the "write target" state and the "reference target" state of the input synchronization buffer in the "write target" state and the input synchronization buffer in the "reference target" state, and turning off the latest input data update flag that has been in the on state (step S274A of FIG. 16).

According to the above processing scheme of the fourth embodiment, for each control program two input synchronization buffers are provided for each input data referred to by the control program, and any one of the input synchronization buffers is always in the "write target" state, except for a short period of time in which the write target state and the reference target state of the input synchronization buffers are interchanged (third interchange process) in the control program start process. Therefore, input data can be copied at any time. Moreover, by setting the input synchronization buffer storing the copied latest data to the "reference target" state based on the state of the latest input data update flag at the start of execution of the control program, the control program can refer to the latest input data at the start of the execution.

J. Latest Data Type Two-Input Synchronization Buffer Interchange Scheme

Fifth Embodiment j1: Overview

As described above, in the fifth embodiment, information for identifying a synchronization buffer storing copied latest data as a reference target is handled.

j2: Sequence Diagram

An operation in an input direction according to the fifth embodiment is shown in the sequence diagram of FIG. 15. Note that FIG. 15 has also been used to describe the fourth embodiment. In the fifth embodiment, the focus is only on identification of "latest" states shown along the time axes of the input synchronization buffers 1A and 2B, and the "latest input data update flag" is not required.

The "write target" state, the "reference target" state, and the "latest" state of an input synchronization buffer are represented by recording that the input synchronization buffer is in the "write target" state, the "reference target" state, and the "latest" state in the write target state recording area, the reference target state recording area, and the latest state recording area, respectively. These state recording areas are produced in the control program working area 1042 of the main memory 104 by the system program 210 in "the execution preparation process for the control operation of the PLC 1" (step S1 of FIG. 5). The form in which it is recorded that an input synchronization buffer is in the "write target" state/the "reference target" state/the "latest" state can be appropriately determined. For example, information (an identification number of a group of input synchronization buffers, etc.) may be recorded which specifies input synchronization buffer groups that are in the "write target" state, the "reference target" state, and/or the "latest" state of the input synchronization buffer groups in each of which portions of input data are copied batchwise to input synchronization buffers belonging thereto. Alternatively, a flag or a state variable which indicates whether or not an input synchronization buffer group is in the "write target" state/the "reference target" state/ the "latest" state, may be provided for each input synchronization buffer group, and the recording may be performed using the value of the flag or the state variable. In particular, in this embodiment, the "write target" state or the "reference target" state is allocated to one input synchronization buffer without overlapping. Therefore, a common state recording area may be produced without separating the write target state recording area and the reference target state recording area, and one flag or state variable may be used to indicate whether the input synchronization buffer group is in the "write target" state or in the "reference target" state.

j3: Flowchart

Figure 17:
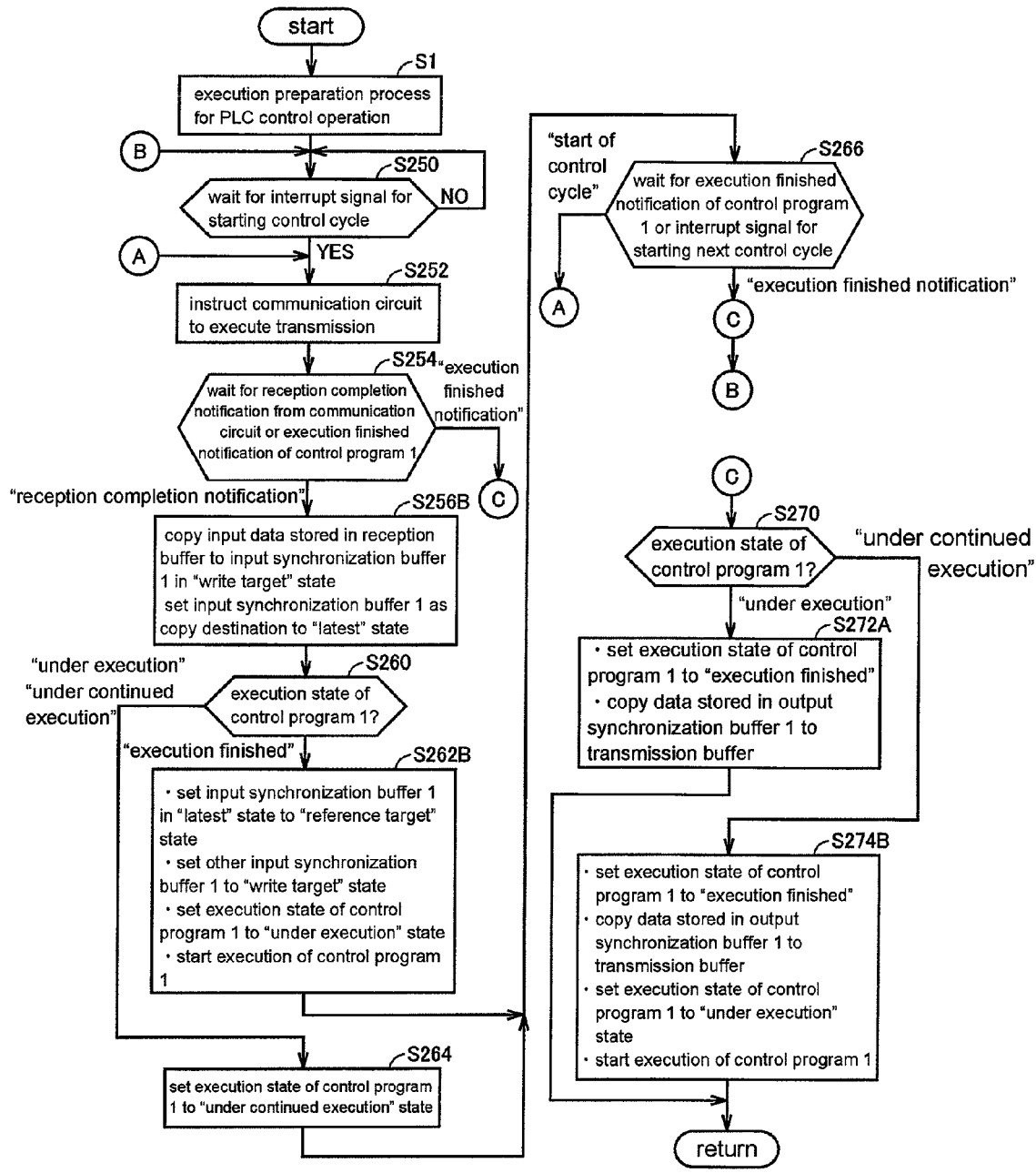
FIG. 17 is a flowchart showing an execution operation according to the fifth embodiment.

FIG. 17 is a flowchart showing an execution operation according to the fifth embodiment. In the flowchart of FIG. 17, steps which execute the same processes as those of the flowchart of FIG. 16 are indicated by the same step numbers as those of FIG. 16.

The flowchart of FIG. 17 is different from the flowchart of FIG. 16 in that processes of steps S256B, S262B, and S274B are executed instead of steps S256A, S262A, and S274A. This difference will be mainly described hereinafter, and the other processes will not be described in detail again.

In step S256B which is executed when receiving a reception completion notification from the communication circuit ("reception completion notification" in step S254), the microprocessor 100 (the core 1) copies input data stored in the reception buffers (the PLC system bus reception buffer 1044 and/or the field network reception buffer 1046) to the input synchronization buffer 1 (the input synchronization buffer 1A or 1B) in the "write target" state, and sets the input synchronization buffer 1 to which the input data has been written, to the "latest" state (step S256B).

In step S262B which is executed when the control program 1 is in the "execution finished" state ("execution finished" in step S260), the input synchronization buffer 1 (the input synchronization buffer 1A or 1B) in the "latest" state is set to the "reference target" state, and the other input synchronization buffer 1 is set to the "write target" state, and thereafter, the execution state of the control program 1 is set to the "under execution" state, and the core 2 is caused to start execution of the control program 1 (step S262B).

Note that if the control program 1 is in the "under execution" state or the "under continued execution" state ("under execution"/"under continued execution" in step S260), the microprocessor 100 (the core 1) sets the execution state of the control program 1 to the "under continued execution" state (step S264). In this case, the "reference target" state and the "write target" state of the corresponding input synchronization buffers 1 (the input synchronization buffer 1A or 1B) are both maintained, and the execution of the control program 1 is continued.

In step S274B which is executed when the control program 1 is in the "under execution" state ("under execution" in step S270), the microprocessor 100 (the core 1) sets the execution state of the control program 1 to the "execution finished" state, and copies output data stored in the output synchronization buffer 1 to the transmission buffer (the PLC system bus transmission buffer 1043 and/or the field network transmission buffer 1045). Thereafter, the microprocessor 100 (the core 1) sets the execution state of the control program 1 to the "under execution" state, and causes the core 2 to start execution of the control program 1 (step S272B).

j4: Summary

As described above, in the fifth embodiment, the system program 210 includes, as the execution preparation process for the control operation of the PLC 1 which is related to inputting of input data, the following processes (a)-(c).

(a) A process for producing reception buffers (the PLC system bus reception buffer 1044 and the field network reception buffer 1046 of FIG. 4) for storing received input data, in the main memory 104 (storage means) (step S1 of FIG. 17).

(b) A process for producing, for each input data referred to by a control program, a first input synchronization buffer (the input synchronization buffer 1A of FIG. 15) and a second input synchronization buffer (the input synchronization buffer 1B of FIG. 15), as a set of synchronization buffers, which are used by the control program as a reference target for the input data, in the main memory 104 (storage means) (step S1 of FIG. 17).

(c) A process for producing a latest state recording area in the main memory 104 (storage means) (step S1 of FIG. 17). To the first input synchronization buffer and the second input synchronization buffer, any of a "write target" state in which input data can be copied from the reception buffers (the PLC system bus reception buffer 1044 and/or the field network reception buffer 1046 of FIG. 4) and a "reference target" state in which input data can be referred to by the control program, are allocated without overlapping.

In the fifth embodiment, the system program 210 also includes, as the execution control process for the control operation of the PLC 1, the following processes (d) and (e).

(d) An input copy process for copying received input data from the reception buffers (the PLC system bus reception buffer 1044 and the field network reception buffer 1046 of FIG. 4) to the input synchronization buffer in the "write target" state corresponding to the input data, and recording that the input synchronization buffer as the copy destination is in the "latest" state, in the latest state recording area (step S256B of FIG. 17).

(e) A control program start process for starting execution of the control program, and further including a third interchange process for interchanging, on the condition that as regards the input synchronization buffers for the control program whose execution is to be started, the input synchronization buffer in the "latest" state specified by contents in the latest state recording area is in the "write target" state, the "write target" state and the "reference target" state of the input synchronization buffer in the "write target" state and the input synchronization buffer in the "reference target" state (step S262B of FIG. 17).

Note that the control program start process may be represented as follows.

(e') A control program start process for starting execution of the control program, and further including a process for setting the input synchronization buffer in the "latest" state specified by contents in the latest state recording area to the "reference target" state, and setting the other input synchronization buffer belonging to the same set as the input synchronization buffer set to the "reference target" state, to the "write target" state (step S262B of FIG. 17).

According to the above processing scheme of the fifth embodiment, for each control program two input synchronization buffers are provided for each input data referred to by the control program, and any one of the input synchronization buffers is always in the "write target" state, except for a short period of time in which the "write target" state and the "reference target" state of the input synchronization buffers are interchanged (third interchange process) in the control program start process. Therefore, input data can be copied at any time. Moreover, by setting the input synchronization buffer storing the copied latest data to the "reference target" state based on contents in the latest state recording area at the start of execution of the control program, the control program can refer to the latest input data at the start of the execution.

K. Update Flag Type Three-Input Synchronization Buffer Interchange Scheme

Sixth Embodiment k1: Overview

While, in the fourth and fifth embodiments, a configuration in which two input synchronization buffers are used has been illustrated, in the sixth and seventh embodiments described below a configuration in which three synchronization buffers are used will be illustrated. Specifically, the sixth embodiment has an expanded version of the configuration of the fourth embodiment in which three input synchronization buffers are used. The seventh embodiment described below has an expanded version of the configuration of the fifth embodiment in which three input synchronization buffers are used.

k2: Sequence Diagram

Figure 18:
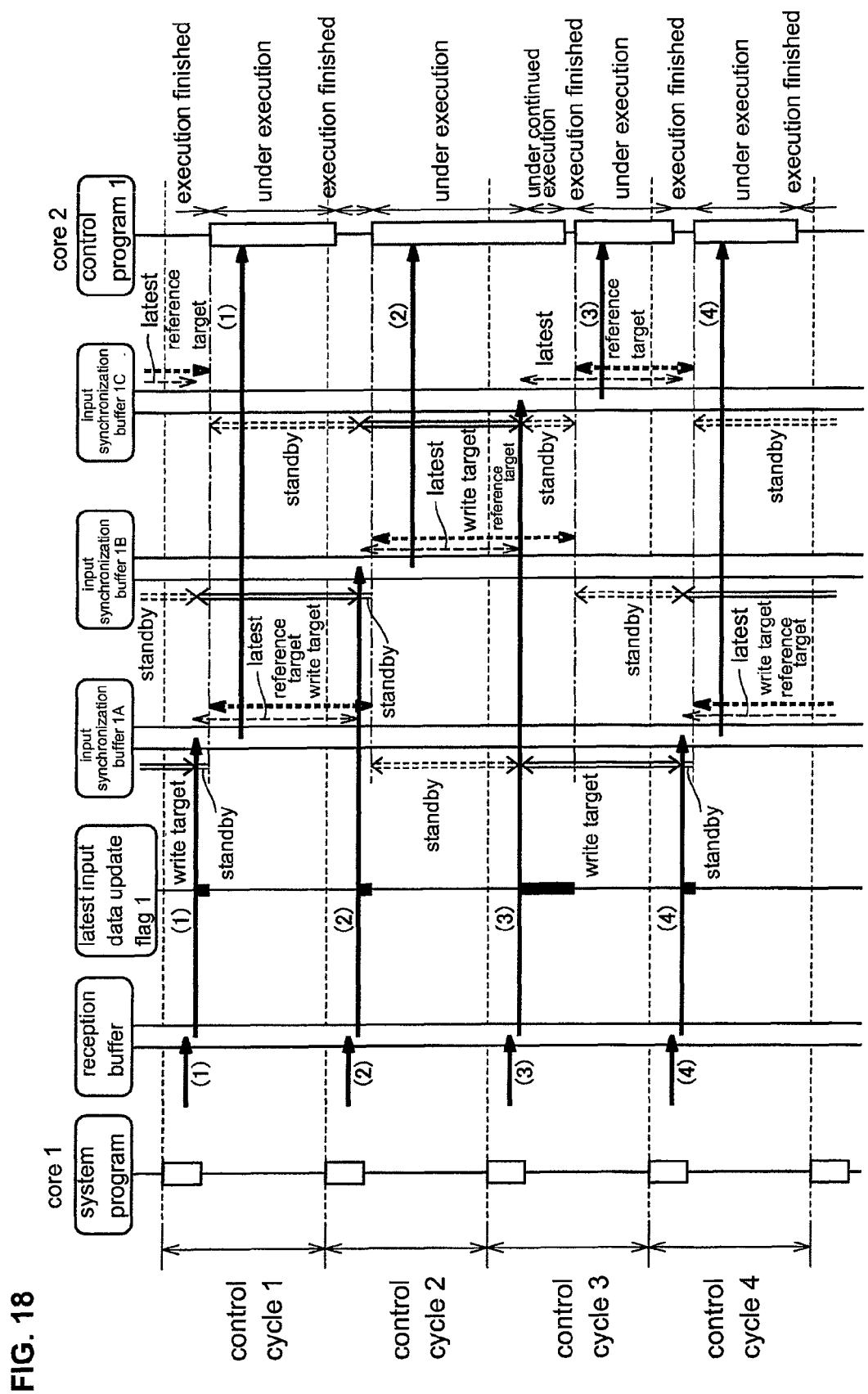
FIG. 18 is a sequence diagram showing operations in an input direction according to sixth and seventh embodiments.

FIG. 18 is a sequence diagram showing an operation in an input direction according to the sixth and seventh embodiments. Both in the sixth embodiment and in the seventh embodiment described below, the sequence diagram of FIG. 18 is referred to for a detailed description thereof. More specifically, in the seventh embodiment described below, a configuration will be described in which information for identifying a synchronization buffer storing copied latest data as a reference target is handled.

Therefore, when the sixth embodiment is described with reference to FIG. 18, the focus is only on a "latest input data update flag 1," and it is not necessary to identify "latest" states indicated along the time axes of input synchronization buffers 1A, 1B, and 1C. On the other hand, when the seventh embodiment is described with reference to FIG. 18, the focus is only on identification of "latest" states indicated along the time axes of the input synchronization buffers 1A, 1B, and 1C, and the "latest input data update flag 1" is not required.

In the sequence diagram of FIG. 18, the "write target" state and the "reference target" state are simply described as "write target" and "reference target."

FIG. 18 shows a process where a multi-core (specifically, dual-core) microprocessor, having a plurality of cores, is typically used. Specifically, it is assumed that a core 1 executes the system program, and a core 2 executes a control program 1. Note that the schemes of the sixth and seventh embodiments are executable even when a single-core microprocessor, having only a single core, is used.

More specifically, in the schemes of the sixth and seventh embodiments of FIG. 18, the system program and the control program 1 are executed in parallel. Although the control program 1 can be executed at any time in terms of the resources of the core, it is here assumed that the control program 1 also uses the output and input processes of the system program, and therefore, execution of the control program 1 is normally started after the end of an output process and an input process at the beginning of each control cycle.

Note that an operation in an output direction according to the sixth and seventh embodiments (a process related to output data) is similar to the operation of the first embodiment (the process described in the sequence diagram of FIG. 7). Specifically, when execution of a control program ends, output data produced by the execution of the control program is copied from the output synchronization buffer to the transmission buffer. When a control cycle starts, output data is transmitted from the transmission buffer. Here, a more detailed description will not be repeated.

The "write target" state, the "reference target" state, and the "standby" state of an input synchronization buffer are represented by recording that the input synchronization buffer is in the "write target" state, the "reference target" state, and the "standby" state, in the write target state recording area, the reference target state recording area, and the standby state recording area, respectively. These state recording areas are produced in the control program working area 1042 of the main memory 104 by the system program 210 in "the execution preparation process for the control operation of the PLC 1" (step S1 of FIG. 5). The form in which it is recorded that an input synchronization buffer is in the "write target" state/the "reference target" state/the "standby" state can be appropriately determined. For example, information (an identification number of a group of input synchronization buffers, etc.) may be recorded which specifies one input synchronization buffer group which is in the "write target" state, the "reference target" state, and/or the "standby" state of the input synchronization buffer groups in each of which portions of input data are copied batchwise to input synchronization buffers belonging thereto. Alternatively, a flag or a state variable which indicates whether or not an input synchronization buffer group is in the "write target" state/the "reference target" state/the "standby" state, may be provided for each input synchronization buffer group, and the recording may be performed using the value of the flag or the state variable. In particular, in this embodiment, the "write target" state, the "reference target" state, or the "standby" state is allocated to one input synchronization buffer without overlapping. Therefore, a common state recording area may be produced without separating these recording areas, and one set of flags or one state variable may be used to indicate in which of the states the input synchronization buffer group is.

Note that a thick line portion of a vertical line (a line along the time axis) of the latest input data update flag 1 shown in the sequence diagram (FIG. 18) of the sixth embodiment represents that the latest input data update flag 1 is on. The latest input data update flag 1 is produced in the control program working area 1042 of the main memory 104 by the system program in "the execution preparation process for the control operation of the PLC 1." Here, the latest input data update flag 1 is provided for each set of input synchronization buffers which is used as a copy destination when a batch of input data is copied.

k3: Flowchart

Figure 19:
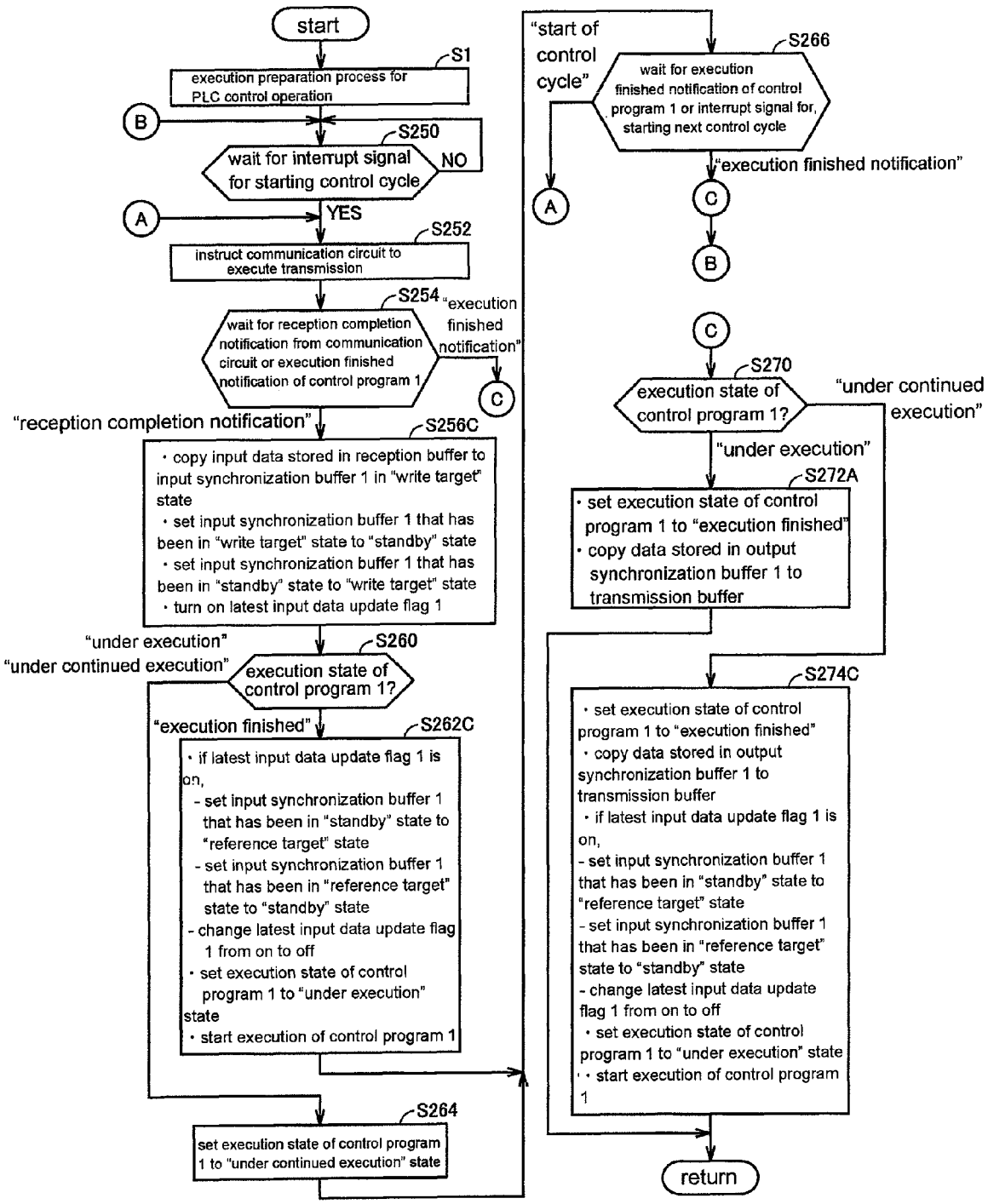
FIG. 19 is a flowchart showing an execution operation according to the sixth embodiment.

FIG. 19 is a flowchart showing an execution operation according to the sixth embodiment. In the flowchart of FIG. 19, steps which execute the same processes as those of the flowchart of FIG. 16 are indicated by the same step numbers as those of FIG. 16.

The flowchart of FIG. 19 is different from the flowchart of FIG. 16 in that processes of steps S256C, S262C, and S274C are executed instead of steps S256A, S262A, and S274A. This difference will be mainly described hereinafter, and the other processes will not be described in detail again.

In step S256C which is executed when receiving a reception completion notification from the communication circuit ("reception completion notification" in step S254), the microprocessor 100 (the core 1) copies input data stored in the reception buffers (the PLC system bus reception buffer 1044 and/or the field network reception buffer 1046) to the input synchronization buffer 1 (one of the input synchronization buffers 1A, 1B, and 1C) in the "write target" state, and sets the input synchronization buffer 1 (one of the input synchronization buffers 1A, 1B, and 1C) that has been in the "write target" state to the "standby state" state, and sets the input synchronization buffer 1 (one of the input synchronization buffers 1A, 1B, and 1C) that has been in the "standby" state to the "write target" state, and thereafter, changes the latest input data update flag 1 from off to on (step S256C).

In step S262C which is executed when the control program 1 is in the "execution finished" state ("execution finished" in step S260), if the latest input data update flag 1 is on, the input synchronization buffer 1 (one of the input synchronization buffers 1A, 1B, and 1C) that has been in the "standby" state is set to the "reference target" state, and the input synchronization buffer 1 (one of the input synchronization buffers 1A, 1B, and 1C) that has been in the "reference target" state is set to the "standby" state, and thereafter, the latest input data update flag 1 is changed from on to off (step S262C). Moreover, in step S262C, the microprocessor 100 (the core 1) sets the execution state of the control program 1 to the "under execution" state, and causes the core 2 to start execution of the control program 1 (step S262C).

Note that if the control program 1 is in the "under execution" state or the "under continued execution" state ("under execution"/"under continued execution" in step S260), the microprocessor 100 (the core 1) sets the execution state of the control program 1 to the "under continued execution" state (step S264). In this case, the "reference target" state and the "standby" state of the corresponding input synchronization buffers 1 (two of the input synchronization buffers 1A, 1B, and 1C) are both maintained, and the execution of the control program 1 is continued.

In step S274C which is executed when the control program 1 is in the "under continued execution" state ("under continued execution" in step S270), the microprocessor 100 (the core 1) sets the execution state of the control program 1 to the "execution finished" state, and copies output data stored in the output synchronization buffer 1 to the transmission buffer (the PLC system bus transmission buffer 1043 and/or the field network transmission buffer 1045) (step S274C). Moreover, in step S274C, the microprocessor 100 (the core 1), when the latest input data update flag 1 is on, sets the input synchronization buffer 1 (one of the input synchronization buffers 1A, 1B, and 1C) that has been in the "standby" state to the "reference target" state, and the input synchronization buffer 1 (one of the input synchronization buffers 1A, 1B, and 1C) that has been in the "reference target" state to the "standby" state, and thereafter, changes the latest input data update flag 1 from on to off. In this case, if the latest input data update flag 1 is off, the "standby" state and the "reference target" state of the input synchronization buffers 1 are not changed, and the latest input data update flag 1 is maintained off. Thereafter, the microprocessor 100 (the core 1) sets the execution state of the control program 1 to the "under execution" state, and causes the core 2 to start execution of the control program 1.

k4: Summary

As described above, in the sixth embodiment, the system program 210 includes, as the execution preparation process for the control operation of the PLC 1 which is related to inputting of input data, the following processes (a)-(c).

(a) A process for producing reception buffers (the PLC system bus reception buffer 1044 and the field network reception buffer 1046 of FIG. 4) for storing received input data, in the main memory 104 (storage means) (step S1 of FIG. 19).

(b) A process for producing, for each input data referred to by a control program, a first input synchronization buffer, a second input synchronization buffer, and a third input synchronization buffer (the input synchronization buffers 1A, 1B, and 1C of FIG. 18), as a set of input synchronization buffers, which are used by the control program as a reference target for the input data, in the main memory 104 (storage means) (step S1 of FIG. 19).

(c) A process for producing, for each control program, a latest input data update flag in the main memory 104 (storage means) (step S1 of FIG. 19). To the first input synchronization buffer, the second input synchronization buffer, and the third input synchronization buffer, any of a "write target" state in which input data can be copied from the reception buffers (the PLC system bus reception buffer 1044 and/or the field network reception buffer 1046 of FIG. 4), a "reference target" state in which input data can be referred to by the control program, and a "standby" state are allocated without overlapping.

In the sixth embodiment, the system program 210 also includes, as the execution control process for the control operation of the PLC 1, the following processes (d) and (e).

(d) An input copy process for copying received input data from the reception buffers (the PLC system bus reception buffer 1044 and the field network reception buffer 1046 of FIG. 4) to the input synchronization buffer in the "write target" state corresponding to the input data, and executing a first interchange process for interchanging the "write target" state and the "standby" state of the input synchronization buffer in the "write target" state as the copy destination and the input synchronization buffer in the standby state belonging to the same set as that input synchronization buffer, and turning on the latest input data update flag related to the input copy (step S256C of FIG. 19).

(e) A control program start process for starting execution of the control program, and executing a second interchange process for interchanging, on the condition that as regards the input synchronization buffers for the control program whose execution is to be started, the input synchronization buffer storing latest data is in the "standby" state (i.e., the latest input data update flag related to the input synchronization buffers for the control program whose execution is to be started is on), the "standby" state and the "reference target" state of the input synchronization buffer in the "standby" state and the input synchronization buffer in the "reference target" state, and turning off the latest input data update flag that has been in the on state (step S274C of FIG. 16).

According to the above processing scheme of the sixth embodiment, for each control program three input synchronization buffers are provided for each input data referred to by the control program, and any one of the input synchronization buffers is always in the "write target" state. Therefore, input data can be copied at any time. Moreover, by setting the input synchronization buffer storing the copied latest data to the "reference target" state at the start of execution of the control program, the control program can refer to the latest input data at the start of the execution.

According to the sixth embodiment, as means for using the input synchronization buffer storing copied latest data as a reference target at the start of execution of a control program, the "write target" state and the "standby" state of the input synchronization buffers are interchanged in the input copy process, and the "standby" state and the "reference target" state of the input synchronization buffers are interchanged based on the state of the latest input data update flag in the control program start process. For example, the input synchronization buffer that has been in the "write target" state when data is copied from the reception buffer transitions through the "standby" state to the "reference target" state.

If the number of portions of input data is large, it takes time to copy the input data from the reception buffer to the input synchronization buffers. In the above fourth embodiment, the interchange process (third interchange process) between the "write target" state and the "reference target" state of input synchronization buffers in the control program start process and the copying from the reception buffer to input synchronization buffers cannot be simultaneously executed, and one of the processes needs to be executed after the other process is ended. In the sixth embodiment, the interchange process (second interchange process) between the "standby" state and the "reference target" state of input synchronization buffers in the control program start process and the copying from the reception buffer to input synchronization buffers in the "write target" state, can be designed to be executed in parallel. Therefore, the sixth embodiment is more advantageous.

L. Latest Data Type Input Synchronization Buffer Interchange Scheme

Seventh Embodiment l1: Overview

As described above, in the seventh embodiment, information for identifying a synchronization buffer storing copied latest data as a reference target is handled. Note that three input synchronization buffers are provided.

l2: Sequence Diagram

An operation in an input direction according to the seventh embodiment is shown in the sequence diagram of FIG. 18. Note that FIG. 18 has also been used to describe the sixth embodiment. In the seventh embodiment, the focus is only on identification of "latest" states shown along the time axes of the input synchronization buffers 1A, 1B, and 1C, and the "latest input data update flag 1" is not required.

The "write target" state, the "reference target" state, the "standby" state, and the "latest" state of an input synchronization buffer are represented by recording that the input synchronization buffer is in the "write target" state, the "reference target" state, the "standby" state, and the "latest" state, in the write target state recording area, the reference target state recording area, the standby state recording area, and the latest state recording area, respectively. These state recording areas are produced in the control program working area 1042 of the main memory 104 by the system program 210 in "the execution preparation process for the control operation of the PLC 1" (step S1 of FIG. 5). The form in which it is recorded that an input synchronization buffer is in the "write target" state/the "reference target" state/the "standby" state/the "latest" state can be appropriately determined. For example, information (an identification number of a group of input synchronization buffers, etc.) may be recorded which specifies one input synchronization buffer group which is in the "write target" state, the "reference target" state, the "standby" state, and/or the "latest" state of the input synchronization buffer groups in each of which a batch of input data is copied to input synchronization buffers belonging thereto. Alternatively, a flag or a state variable which indicates whether or not an input synchronization buffer group is in the "write target" state/the "reference target" state/the "standby" state/the "latest" state, may be provided for each input synchronization buffer group, and the recording may be performed using the value of the flag or the state variable. In particular, in this embodiment, the "write target" state, the "reference target" state, or the "standby" state is allocated to one input synchronization buffer without overlapping. Therefore, a common state recording area may be produced without separating the write target state recording area, the reference target state recording area, and the standby state recording area, and one set of flags or one state variable may be used to indicate whether an input synchronization buffer group is in the "write target" state, in the "reference target" state, or in the "standby" state.

l3: Flowchart

Figure 20:
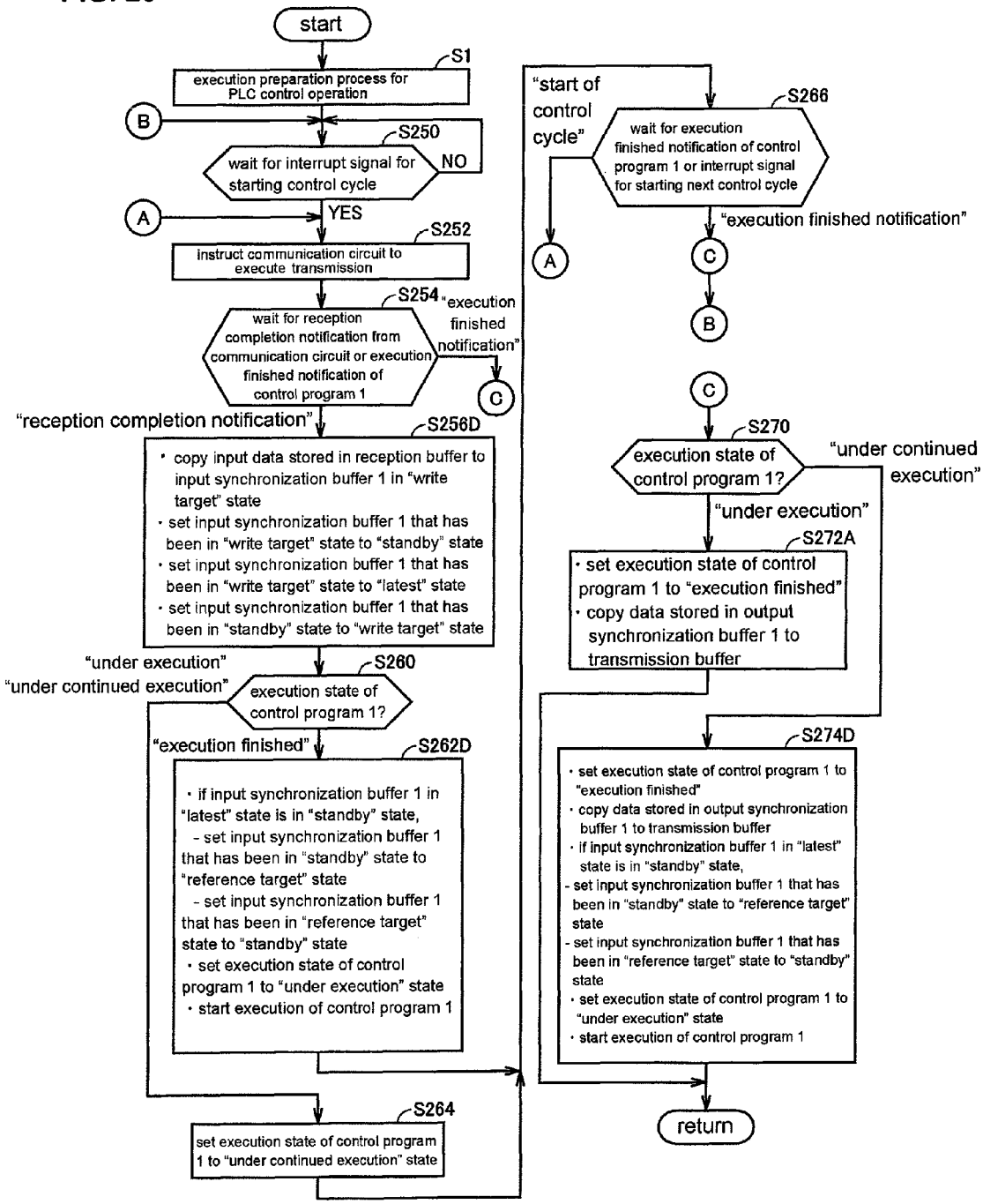
FIG. 20 is a flowchart showing an execution operation according to the seventh embodiment.

FIG. 20 is a flowchart showing an execution operation according to the seventh embodiment. In the flowchart of FIG. 20, steps which execute the same processes as those of the flowchart of FIG. 17 are indicated by the same step numbers as those of FIG. 17.

The flowchart of FIG. 20 is different from the flowchart of FIG. 17 in that processes of steps S256D, S262D, and S274D are executed instead of steps S256B, S262B, and S274B. This difference will be mainly described hereinafter, and the other processes will not be described in detail again.

In step S256D which is executed when receiving a reception completion notification from the communication circuit ("reception completion notification" in step S254), the microprocessor 100 (the core 1) copies input data stored in the reception buffers (the PLC system bus reception buffer 1044 and/or the field network reception buffer 1046) to the input synchronization buffer 1 (one of the input synchronization buffers 1A, 1B, and 1C) in the "write target" state, and sets the input synchronization buffer 1 (one of the input synchronization buffers 1A, 1B, and 10 that has been in the "write target" state to the "standby" state and the "latest" state, and the input synchronization buffer 1 (one of the input synchronization buffers 1A, 1B, and 1C) that has been in the "standby" state to the "write target" state (step S256D).

In step S262D which is executed when the control program 1 is in the "execution finished" state ("execution finished" in step S260), if the input synchronization buffer 1 in the "latest" state is in the "standby" state, the input synchronization buffer 1 (one of the input synchronization buffers 1A, 1B, and 1C) in the "standby" state is set to the "reference target" state, and the input synchronization buffer 1 (one of the input synchronization buffers 1A, 1B, and 1C) in the "reference target" state is set to the "standby" state, and thereafter, the execution state of the control program 1 is set to the "under execution" state, and the core 2 is caused to start execution of the control program 1 (step S262D).

Note that if the control program 1 is in the "under execution" state or the "under continued execution" state ("under execution"/"under continued execution" in step S260), the microprocessor 100 (the core 1) sets the execution state of the control program 1 to the "under continued execution" state (step S264). In this case, the "reference target" state and the "standby" state of the corresponding input synchronization buffers 1 (two of the input synchronization buffers 1A, 1B, and 1C) are both maintained, and the execution of the control program 1 is continued.

In step S274D, which is executed when the control program 1 is in the "under continued execution" state ("under continued execution" in step S270), the microprocessor 100 (the core 1) sets the execution state of the control program 1 to the "execution finished" state, and copies output data stored in the output synchronization buffer 1 to the transmission buffer (the PLC system bus transmission buffer 1043 and/or the field network transmission buffer 1045) (step S274D). Moreover, in step S274D, if the input synchronization buffer 1 in the "latest" state is in the "standby" state, the microprocessor 100 (the core 1) sets the input synchronization buffer 1 (one of the input synchronization buffers 1A, 1B, and 1C) that has been in the "standby" state to the "reference target" state, and the input synchronization buffer 1 (one of the input synchronization buffers 1A, 1B, and 1C) that has been in the "reference target" state to the "standby" state. In this case, if the input synchronization buffer 1 in the "latest" state is in the "reference target" state, the "standby" state and the "reference target" state of the input synchronization buffers 1 are not changed. Thereafter, the microprocessor 100 (the core 1) sets the execution state of the control program 1 to the "under execution" state, and causes the core 2 to start execution of the control program 1.

l4: Summary

As described above, in the seventh embodiment, the system program 210 includes, as the execution preparation process for the control operation of the PLC 1 which is related to inputting of input data, the following processes (a)-(c).

(a) A process for producing reception buffers (the PLC system bus reception buffer 1044 and the field network reception buffer 1046 of FIG. 4) for storing received input data, in the main memory 104 (storage means) (step S1 of FIG. 20).

(b) A process for producing, for each input data referred to by a control program, a first input synchronization buffer, a second input synchronization buffer, and a third input synchronization buffer (the input synchronization buffers 1A, 1B, and 1C of FIG. 18), as a set of input synchronization buffers, which are used by the control program as a reference target for the input data, in the main memory 104 (storage means) (step S1 of FIG. 20).

(c) A process for producing a latest state recording area in the main memory 104 (storage means) (step S1 of FIG. 20). To the first input synchronization buffer, the second input synchronization buffer, and the third input synchronization buffer, any of the "write target" state in which input data can be copied from the reception buffers (the PLC system bus reception buffer 1044 and/or the field network reception buffer 1046 of FIG. 4), the "reference target" state in which input data can be referred to by the control program, and the "standby" state are allocated without overlapping.

In the seventh embodiment, the system program 210 also includes, as the execution control process for the control operation of the PLC 1, the following processes (d) and (e).

(d) An input copy process for copying received input data from the reception buffers (the PLC system bus reception buffer 1044 and the field network reception buffer 1046 of FIG. 4) to the input synchronization buffer in the "write target" state corresponding to the input data, executing a first interchange process for interchanging the "write target" state and the "standby" state of the input synchronization buffer in the "write target" state as the copy destination and the input synchronization buffer in the standby state belonging to the same set as that input synchronization buffer, and recording that the input synchronization buffer as the copy destination is in the "latest" state, in the latest state recording area (step S256D of FIG. 20).

(e) A control program start process for starting execution of the control program, and further including a second interchange process for interchanging, on the condition that as regards the input synchronization buffers for the control program whose execution is to be started, the input synchronization buffer in the "latest" state specified by contents in the latest state recording area is in the "standby" state, the "standby" state and the "reference target" state of the input synchronization buffer in the "standby" state and the input synchronization buffer in the "reference target" state (step S262D of FIG. 20).

Note that the control program start process may be represented as follows.

(e') A control program start process for starting execution of the control program, and further including a process for setting the input synchronization buffer in the "latest" state specified by contents in the latest state recording area to the "reference target" state, and setting the input synchronization buffer which belongs to the same set as the input synchronization buffer set to the "reference target" state and is not in the "write target" state, to the "standby" state (step S262D of FIG. 20).

According to the above processing scheme of the seventh embodiment, for each control program, three input synchronization buffers are provided for each input data referred to by the control program, and any one of the input synchronization buffers is always in the "write target" state. Therefore, input data can be copied at any time. Moreover, by setting the input synchronization buffer storing the copied latest data to the "reference target" state at the start of execution of the control program, the control program can refer to the latest input data at the start of the execution.

According to the seventh embodiment, as means for using the input synchronization buffer storing copied latest data as a reference target at the start of execution of a control program, the "write target" state and the "standby" state of the input synchronization buffers are interchanged in the input copy process, and the "standby" state and the "reference target" state of the input synchronization buffers are interchanged based on contents in the latest state recording area in the control program start process. For example, the input synchronization buffer that has been in the "write target" state when data is copied from the reception buffer transitions through the "standby" state to the "reference target" state.

If the number of portions of input data is large, it takes time to copy input data from the reception buffer to the input synchronization buffers. In the above fifth embodiment, the interchange process (third interchange process) between the "write target" state and the "reference target" state of input synchronization buffers in the control program start process and the copying from the reception buffer to input synchronization buffers cannot be simultaneously executed, and one of the processes needs to be executed after the other process is ended. In the seventh embodiment, the interchange process (second interchange process) between the "standby" state and the "reference target" state of input synchronization buffers in the control program start process and the copying from the reception buffer to input synchronization buffers in the "write target" state, can be designed to be executed in parallel. Therefore, the seventh embodiment is more advantageous.

M. Update Flag Type Three-Output Synchronization Buffer Interchange Scheme

Eighth Embodiment m1: Overview

While, in the sixth and seventh embodiments, a configuration has been illustrated in which three input synchronization buffers are used, the three-buffer interchange scheme of these embodiments is applied to output synchronization buffers in the eighth embodiment and in the ninth embodiment described below.

In particular, in the eighth and ninth embodiments, an operation buffer is produced for each output data, in addition to an output synchronization buffer. A control program stores output data in the operation buffer. The reason is that, in the eighth and ninth embodiments, three output synchronization buffers are provided, and the output synchronization buffers are successively changed to a write target, and therefore, when a control program stores output data in an output synchronization buffer, it becomes difficult for the control program to refer to output data previously stored. Therefore, the operation buffer is provided, and the control program stores output data in the operation buffer, whereby the control program can obtain previously stored output data from the operation buffer.

Note that the output data outputting scheme of the eighth and ninth embodiments may be suitably combined with any of the input data inputting schemes of the first through seventh embodiments.

m2: Sequence Diagram

Figure 21:
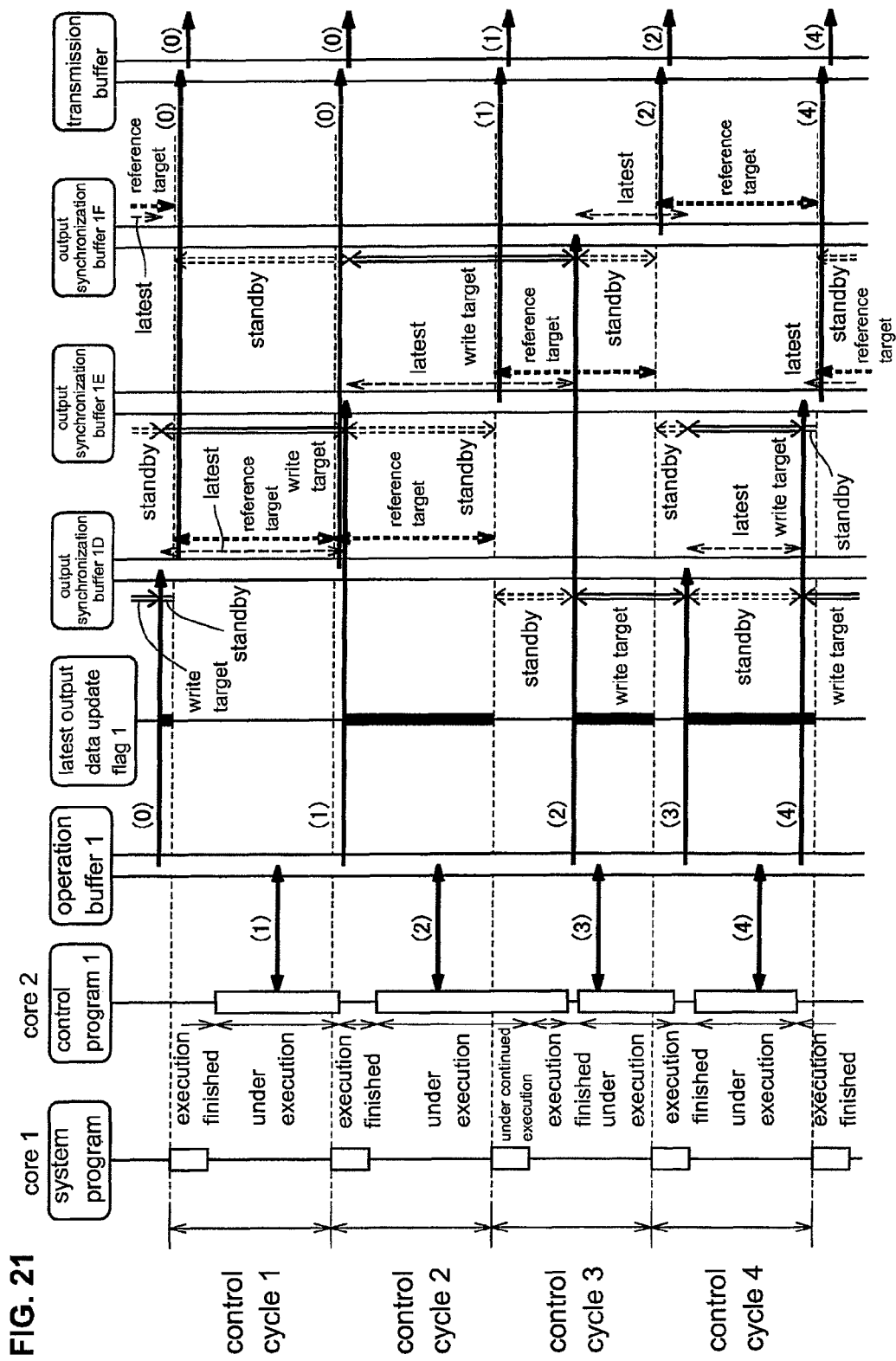
FIG. 21 is a sequence diagram showing operations in an output direction according to eighth and ninth embodiments.

FIG. 21 is a sequence diagram showing an operation in an output direction according to the eighth and ninth embodiments. Both in the eighth embodiment and in the ninth embodiment described below, the sequence diagram of FIG. 21 is referred to for a detailed description thereof. More specifically, when the eighth embodiment is described with reference to FIG. 21, the focus is only on a "latest output data update flag 1," and it is not necessary to identify "latest" states indicated along the time axes of output synchronization buffers 1D, 1E, and 1F. On the other hand, when the ninth embodiment is described with reference to FIG. 21, the focus is only on identification of "latest" states indicated along the time axes of the output synchronization buffers 1D, 1E, and 1F, and the "latest output data update flag 1" is not required.

In this embodiment, each output synchronization buffer is set to one of the "write target" state, the "reference target" state, and the "standby" state. A method for recording these states is similar to that which is used for input synchronization buffers described in the sixth embodiment. A method for recording the state of the latest output data update flag is similar to that which is used for the latest input data update flag described in the sixth embodiment.

m3: Flowchart

Figure 22:
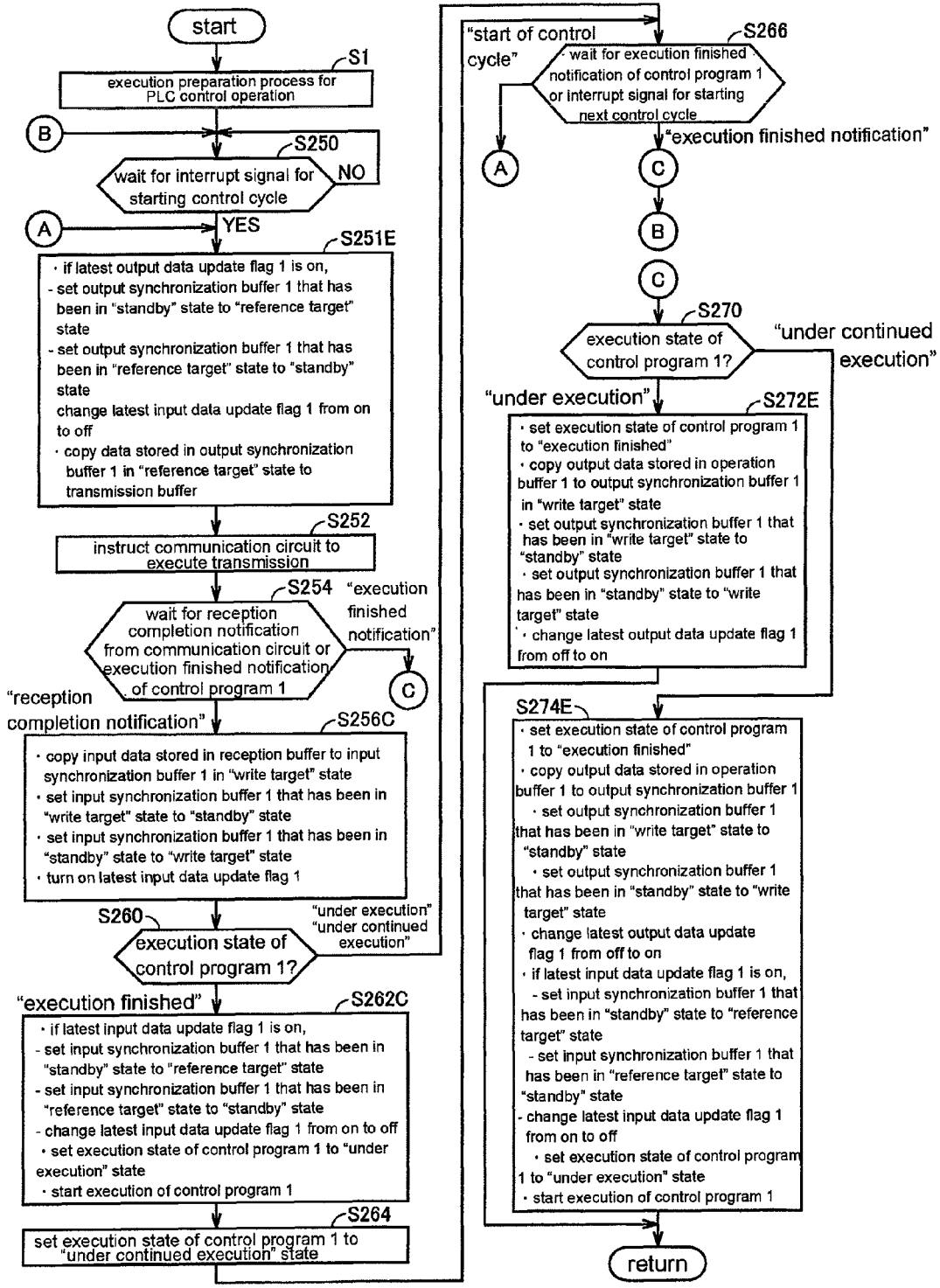
FIG. 22 is a flowchart showing an execution operation according to the eighth embodiment.

FIG. 22 is a flowchart showing an execution operation according to the eighth embodiment. In the flowchart of FIG. 22, steps which execute the same processes as those of the flowchart of FIG. 19 are indicated by the same step numbers as those of FIG. 19.

The flowchart of FIG. 22 is different from the flowchart of FIG. 19 in that step S251E is added, and processes of steps S272E and S274E are executed instead of steps S272 and S274C. This difference will be mainly described hereinafter, and the other processes will not be described in detail again.

In step S251E which is executed when receiving an interrupt signal for starting a control cycle (YES in step S250), if the latest output data update flag 1 is on, the microprocessor 100 (the core 1) sets the output synchronization buffer 1 (one of the output synchronization buffers 1D, 1E, and 1F) that has been in the "standby" state to the "reference target" state, and the output synchronization buffer 1 (one of the output synchronization buffers 1D, 1E, and 1F) that has been in the "reference target" state to the "standby" state, and thereafter, changes the latest output data update flag 1 from on to off (step S251E).

Note that if the latest output data update flag 1 is not on (the latest output data update flag 1 is off), the "standby" state and the "reference target" state of the output synchronization buffers 1 are not changed, and the latest output data update flag 1 is maintained off.

Moreover, in step S251E, the microprocessor 100 (the core 1) copies output data stored in the output synchronization buffer 1 in the "reference target" state to the transmission buffer (the PLC system bus transmission buffer 1043 and/or the field network transmission buffer 1045).

In S272E which is executed when the control program 1 is in the "under execution" state ("under execution" in step S270), the microprocessor 100 (the core 1) sets the execution state of the control program 1 to the "execution finished" state, and copies output data stored in the operation buffer 1 to the output synchronization buffer 1 (one of the output synchronization buffers 1D, 1E, and 1F) in the "write target" state, and thereafter, sets the output synchronization buffer 1 (one of the output synchronization buffers 1D, 1E, and 1F) that has been in the "write target" state to the "standby" state, and the output synchronization buffer 1 (one of the output synchronization buffers 1D, 1E, and 1F) that has been in the "standby" state to the "write target" state, and thereafter, changes the latest output data update flag 1 from off to on (step S272E).

In step S274E which is executed when the control program 1 is in the "under continued execution" state ("under continued execution" in step S270), the microprocessor 100 (the core 1) sets the execution state of the control program 1 to the "execution finished" state, and copies output data stored in the operation buffer 1 to the output synchronization buffer 1 (one of the output synchronization buffers 1D, 1E, and 1F) in the "write target" state, and thereafter, sets the output synchronization buffer 1 (one of the output synchronization buffers 1D, 1E, and 1F) that has been in the "write target" state to the "standby" state, and the output synchronization buffer 1 (one of the output synchronization buffers 1D, 1E, and 1F) that has been in the "standby" state to the "write target" state, and thereafter, changes the latest output data update flag 1 from off to on (step S274E).

Moreover, in step S274E, if the latest input data update flag 1 is on, the input synchronization buffer 1 (one of the input synchronization buffers 1A, 1B, and 1C) that has been in the "standby" state is set to the "reference target" state, and the input synchronization buffer 1 (one of the input synchronization buffers 1A, 1B, and 1C) that has been in the "reference target" state is set to the "standby" state, and thereafter, the latest input data update flag 1 is changed from on to off. In this case, if the latest input data update flag 1 is off, the "standby" state and the "reference target" state of the input synchronization buffers 1 are not changed, and the latest input data update flag 1 is maintained off. Thereafter, the execution state of the control program 1 is set to the "under execution" state, and the core 2 is caused to start execution of the control program 1.

m4: Summary

As described above, in the eighth embodiment, the system program 210 includes, as the execution preparation process for the control operation of the PLC 1, the following processes (a)-(e).

(a) A process for producing reception buffers (the PLC system bus reception buffer 1044 and the field network reception buffer 1046 of FIG. 4) for storing received input data and a transmission buffer (the PLC system bus transmission buffer 1043 and the field network transmission buffer 1045 of FIG. 4) for storing output data to be transmitted, in the main memory 104 (storage means) (step S1 of FIG. 22).

(b) A process for producing, for each input data referred to by a control program, an input synchronization buffer (any number of (one or a plurality of) input synchronization buffers) used by the control program as a reference target for the input data, in the main memory 104 (storage means) (step S1 of FIG. 22).

(c) A process for producing an operation buffer (the operation buffer 1 of FIG. 21) used by the control program for storing output data, in the main memory 104 (storage means) (step S1 of FIG. 22).

(d) A process for producing a first output synchronization buffer, a second output synchronization buffer, and a third output synchronization buffer (the output synchronization buffers 1E, 1F, and 1G of FIG. 21) for storing output data to be copied to the transmission buffer, as a set of output synchronization buffers, for each output data, in the main memory 104 (storage means) (step S1 of FIG. 22).

(e) A process for producing a latest output data update flag in the main memory 104 (storage means) for each control program (step S1 of FIG. 22). To the first output synchronization buffer, the second output synchronization buffer, and the third output synchronization buffer, any of a "write target" state in which output data can be copied from the operation buffer, a "reference target" state in which reference can be made for copying to the transmission buffer, and a "standby" state are allocated without overlapping.

In the eighth embodiment, the system program 210 also includes, as the execution control process for the control operation of the PLC 1, the following processes (f)-(i).

(f) An input copy process for copying received input data from the reception buffers (the PLC system bus reception buffer 1044 and the field network reception buffer 1046 of FIG. 4) to the input synchronization buffer corresponding to that input data (step S256C of FIG. 22).

(g) A control program start process for starting execution of the control program (step S262C of FIG. 22).

(h) An output synchronization buffer storage process for copying, when execution of the control program ends, output data produced by the execution of the control program from the operation buffer to the output synchronization buffer in the "write target" state, and executing a fourth interchange process for interchanging the "write target" state and the "standby" state of the output synchronization buffer in the "write target" state serving as the copy destination and the output synchronization buffer in the "standby" state in the same set as that output synchronization buffer, and turning on the latest output data update flag related to the output copy (step S272E of FIG. 22).

(i) An output copy process for executing, on the condition that the output synchronization buffer storing the latest data is in the "standby" state (i.e., the latest output data update flag related to the output synchronization buffers for the control program whose execution is to be started is on), a fifth interchange process for interchanging the "standby" state and the "reference target" state of the output synchronization buffer in the "standby" state and the output synchronization buffer in the "reference target" state, turning off the latest output data update flag that has been in the on state, and copying output data from the output synchronization buffer set to the "reference target" state to the transmission buffer (step S251E in FIG. 22).

According to the above processing scheme of the eighth embodiment, for each control program three output synchronization buffers are provided for each output data produced by the control program, and one of the output synchronization buffers is always in the "write target" state. Therefore, output data can be copied from the operation buffer to the output synchronization buffer at any time.

Also, according to the eighth embodiment, as means for using the output synchronization buffer storing latest data copied from the operation buffer, as a reference target (a copy source to the transmission buffer), at the start of execution of the control program, the "write target" state and the "standby" state of the output synchronization buffers are interchanged (the fourth interchange process) in the output synchronization buffer storage process, and the "standby" state and the "reference target" state of the output synchronization buffers are interchanged based on the state of the latest output data update flag (the fifth interchange process) in the output copy process. For example, the output synchronization buffer that has been in the "write target" state when data is copied from the operation buffer transitions through the "standby" state to the "reference target" state.

If the number of portions of output data is large, it respectively takes time to copy output data from the operation buffers to the output synchronization buffers and to copy output data from the output synchronization buffers to the transmission buffer. In the eighth embodiment, these copy executions can be designed to be performed in parallel when the copy executions overlap in time, which is more advantageous.

Note that the output copy process for copying output data from the output synchronization buffers to the transmission buffer is preferably executed immediately before execution of transmission. For example, if transmission is executed near the beginning of each control cycle as shown in FIG. 21, the output copy process may be first executed after the start of the control cycle, and following this, transmission may be executed.

N. Latest Data Type Three-Output Synchronization Buffer Interchange Scheme

Ninth Embodiment n1: Overview

As described above, in the ninth embodiment, information for identifying the synchronization buffer storing copied latest data as being in the "latest" state is handled.

n2: Sequence Diagram

An operation in an output direction according to the ninth embodiment is shown in the sequence diagram of FIG. 21. Note that FIG. 21 is a sequence diagram that has also been used to describe the eighth embodiment. In the ninth embodiment, the focus is only on identification of "latest" states shown along the time axes of the output synchronization buffers 1D, 1E, and 1F, and the "latest output data update flag 1" is not required.

n3: Flowchart

Figure 23:
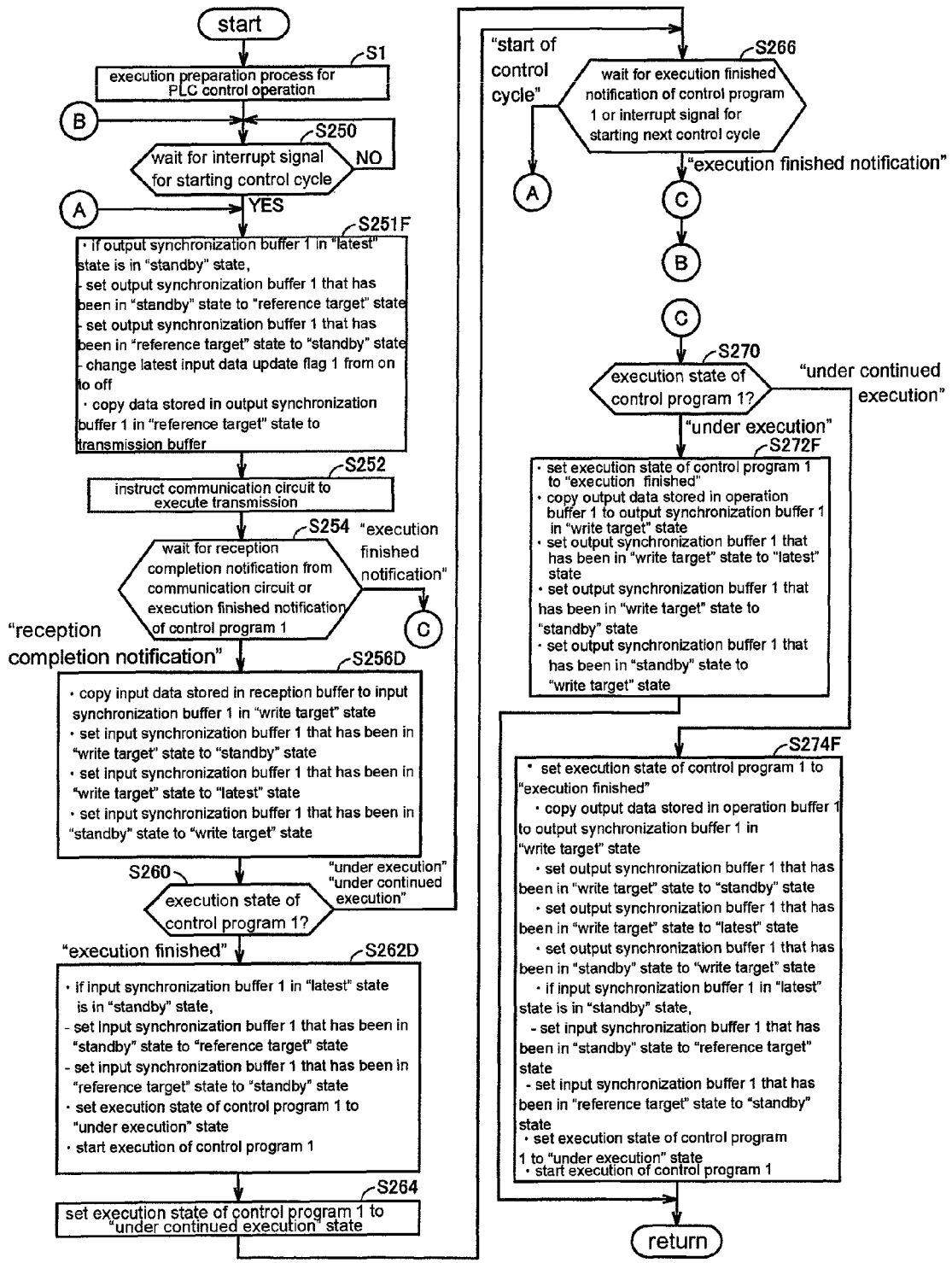
FIG. 23 is a flowchart showing an execution operation according to the ninth embodiment.

FIG. 23 is a flowchart showing an execution operation according to the ninth embodiment. In the flowchart of FIG. 23, steps which execute the same processes as those of the flowchart of FIG. 22 are indicated by the same step numbers as those of FIG. 22.

The flowchart of FIG. 23 is different from the flowchart of FIG. 22 in that processes of steps S251F, S272F, and S274F are executed instead of steps S251E, S272E, and S274E. This difference will be mainly described hereinafter, and the other processes will not be described in detail again.

In step S251F, which is executed when receiving an interrupt signal for starting a control cycle (YES in step S250), if the output synchronization buffer 1 (one of the output synchronization buffers 1D, 1E, and 1F) in the "latest" state is in the "standby" state, the microprocessor 100 (the core 1) sets the output synchronization buffer 1 (one of the output synchronization buffers 1D, 1E, and 1F) that has been in the "standby" state to the "reference target" state, and the output synchronization buffer 1 (one of the output synchronization buffers 1D, 1E, and 1F) that has been in the "reference target" state to the "standby" state (step S251F).

Note that if the output synchronization buffer 1 in the "latest" state is set to the "reference target" state, the "standby" state and the "reference target" state of the output synchronization buffers 1 are not changed and are maintained.

Moreover, in step S251F, the microprocessor 100 (the core 1) copies output data stored in the output synchronization buffer 1 in the "reference target" state to the transmission buffers (the PLC system bus transmission buffer 1043 and/or the field network transmission buffer 1045).

In S272F, which is executed when the control program 1 is in the "under execution" state ("under execution" in step S270), the microprocessor 100 (the core 1) sets the execution state of the control program 1 to the "execution finished" state, and copies output data stored in the operation buffer 1 to the output synchronization buffer 1 (one of the output synchronization buffers 1D, 1E, and 1F) in the "write target" state, and thereafter, sets the output synchronization buffer 1 (one of the output synchronization buffers 1D, 1E, and 1F) that has been in the "write target" state to the "standby" state and the "latest" state, and the output synchronization buffer 1 (one of the output synchronization buffers 1D, 1E, and 1F) that has been in the "standby" state to the "write target" state (step S272F).

In step S274F, which is executed when the control program 1 is in the "under continued execution" state ("under continued execution" in step S270), the microprocessor 100 (the core 1) sets the execution state of the control program 1 to the "execution finished" state, and copies output data stored in the operation buffer 1 to the output synchronization buffer 1 (one of the output synchronization buffers 1D, 1E, and 1F) in the "write target" state, and thereafter, sets the output synchronization buffer 1 (one of the output synchronization buffers 1D, 1E, and 1F) that has been in the "write target" state to the "standby" state and the "latest" state, and the output synchronization buffer 1 (one of the output synchronization buffers 1D, 1E, and 1F) that has been in the "standby" state to the "write target" state (step S274F).

Moreover, in step S274F, if the input synchronization buffer 1 in the "latest" state is in the "standby" state, the input synchronization buffer 1 (one of the input synchronization buffers 1A, 1B, and 1C) that has been in the "standby" state is set to the "reference target" state, and the input synchronization buffer 1 (one of the input synchronization buffers 1A, 1B, and 1C) that has been in the "reference target" state is set to the "standby" state. In this case, if the input synchronization buffer 1 in the "latest" state is not in the "reference target" state, the "standby" state and the "reference target" state of the input synchronization buffers 1 are not changed and are maintained. Thereafter, the execution state of the control program 1 is set to the "under execution" state, and the core 2 is caused to start execution of the control program 1.

m4: Summary

As described above, in the ninth embodiment, the system program 210 includes, as the execution preparation process for the control operation of the PLC 1, the following processes (a)-(e).

(a) A process for producing reception buffers (the PLC system bus reception buffer 1044 and the field network reception buffer 1046 of FIG. 4) for storing received input data and transmission buffers (the PLC system bus transmission buffer 1043 and the field network transmission buffer 1045 of FIG. 4) for storing output data to be transmitted, in the main memory 104 (storage means) (step S1 of FIG. 23).

(b) A process for producing, for each input data referred to by a control program, an input synchronization buffer (any number of (one or a plurality of) input synchronization buffers) used by the control program as a reference target for the input data, in the main memory 104 (storage means) (step S1 of FIG. 23).

(c) A process for producing an operation buffer (the operation buffer 1 of FIG. 21) used by the control program for storing output data, in the main memory 104 (storage means) (step S1 of FIG. 23).

(d) A process for producing a first output synchronization buffer, a second output synchronization buffer, and a third output synchronization buffer (the output synchronization buffers 1E, 1F, and 1G of FIG. 21) for storing output data to be copied to the transmission buffer, as a set of output synchronization buffers, for each output data, in the main memory 104 (storage means) (step S1 of FIG. 23).

(e) A process for producing a latest state recording area in the main memory 104 (storage means) (step S1 of FIG. 23). To the first output synchronization buffer, the second output synchronization buffer, and the third output synchronization buffer, any of a "write target" state in which output data can be copied from the operation buffer, a "reference target" state in which reference can be made for copying to the transmission buffer, and a "standby" state are allocated without overlapping.

In the ninth embodiment, the system program 210 also includes, as the execution control process for the control operation of the PLC 1, the following processes (f)-(i).

(f) An input copy process for copying received input data from the reception buffers (the PLC system bus reception buffer 1044 and the field network reception buffer 1046 of FIG. 4) to the input synchronization buffer corresponding to that input data (step S256D of FIG. 23).

(g) A control program start process for starting execution of the control program (step S262D of FIG. 23).

(h) An output synchronization buffer storage process for copying, when execution of the control program ends, output data produced by the execution of the control program from the operation buffer to the output synchronization buffer in the "write target" state, and executing a fourth interchange process for interchanging the "write target" state and the "standby" state of the output synchronization buffer in the "write target" state as the copy destination and the output synchronization buffer in the "standby" state in the same set as that output synchronization buffer, and recording that the output synchronization buffer as the copy destination is in the latest state, in the latest state recording area (step S272F of FIG. 23).

(i) An output copy process for executing, on the condition that the output synchronization buffer in the "latest" state specified by contents in the latest state recording area is in the "standby" state, a fifth interchange process for interchanging the "standby" state and the "reference target" state of the output synchronization buffer in the "standby" state and the output synchronization buffer in the "reference target" state, and copying output data from the output synchronization buffer set to the "reference target" state to the transmission buffer (step S251F in FIG. 23).

According to the above processing scheme of the ninth embodiment, for each control program three output synchronization buffers are provided for each output data produced by the control program, and any one of the output synchronization buffers is always in the "write target" state. Therefore, output data can be copied from the operation buffer to the output synchronization buffer at any time.

Also, according to the ninth embodiment, as means for using the output synchronization buffer storing latest data copied from the operation buffer, as a reference target (a copy source to the transmission buffer), at the start of execution of the control program, the "write target" state and the "standby" state of the output synchronization buffers are interchanged (fourth interchange process) in the output synchronization buffer storage process, and the "standby" state and the "reference target" state of the output synchronization buffers are interchanged based on the latest states of the output synchronization buffers (fifth interchange process) in the output copy process. For example, the output synchronization buffer that has been in the "write target" state when data is copied from the operation buffer transitions through the "standby" state to the "reference target" state.

If the number of portions of output data is large, it respectively takes time to copy output data from the operation buffers to the output synchronization buffers and to copy output data from the output synchronization buffers to the transmission buffer. In the ninth embodiment, these copy executions can be designed to be performed in parallel when the copy executions overlap in time, which is more advantageous.

Note that the output copy process for copying output data from the output synchronization buffers to the transmission buffer is preferably executed immediately before execution of transmission. For example, if transmission is executed near the beginning of each control cycle as shown in FIG. 21, the output copy process may be first executed after the start of the control cycle, and following this, transmission may be executed.

m5: Further Expansion

From the description of the eighth and ninth embodiments, it will be readily understood that the input schemes of the sixth and seventh embodiments are also applicable to the output schemes. Although not described in detail herein, the input schemes of the second through fifth embodiments are also applicable to the output schemes. Moreover, the input schemes may be suitably combined with the output schemes.

O. Execution Cycle Synchronization Type Single-Buffer Scheme

Tenth Embodiment o1: Overview

If an execution cycle of a control program extends over a plurality of control cycles, and there is another control program having a higher priority level of execution, then execution of that control program may not be started from the first control cycle in the execution cycle. In the first through ninth embodiments, in such a case, it is possible to use latest input data which is received at a reception timing related to a control cycle in which execution of a control program is actually started.

However, instead, it may be, in some cases, desirable that, as input data used in executing a control program, input data which is received at a reception timing related to a control cycle in which an execution cycle of the control program starts be consistently used to provide a fixed effective update period for input data. The input scheme according to the tenth embodiment can meet such a demand.

Note that the term "reception timing related to a control cycle" means the following timing. Specifically, if scheduling is employed in which a control program is executed after reception of input data in the control cycle, the reception timing related to the control cycle is a timing of reception in the control cycle. Alternatively, if scheduling is employed in which input data is received after execution of a control program in the control cycle, the reception timing related to the control cycle is a timing of reception in the control cycle immediately before that control cycle.

In another situation, when an execution cycle of a control program extends over a plurality of control cycles, execution of the control program may end and output data may be produced before the start of the last control cycle in the execution cycle. In the first through ninth embodiments, in such a case, updated output data can be transmitted without waiting for a transmission timing related to the last control cycle.

However, instead, it may be, in some cases, desirable that, as a transmission timing of updated output data, a transmission timing related to the last control cycle in the execution cycle be consistently used to provide a fixed effective update period for output data to be transmitted. An output scheme according to the tenth embodiment can meet such a demand.

Note that the term "transmission timing related to a control cycle" means the following timing. Specifically, if scheduling is employed in which a control program is executed after transmission of output data in the control cycle, the transmission timing related to the control cycle is a timing of transmission in a control cycle immediately after that control cycle. Alternatively, if scheduling is employed in which output data is transmitted after execution of a control program in the control cycle, the transmission timing related to the control cycle is a timing of transmission in the control cycle.

o2: Sequence Diagram

Figure 24:
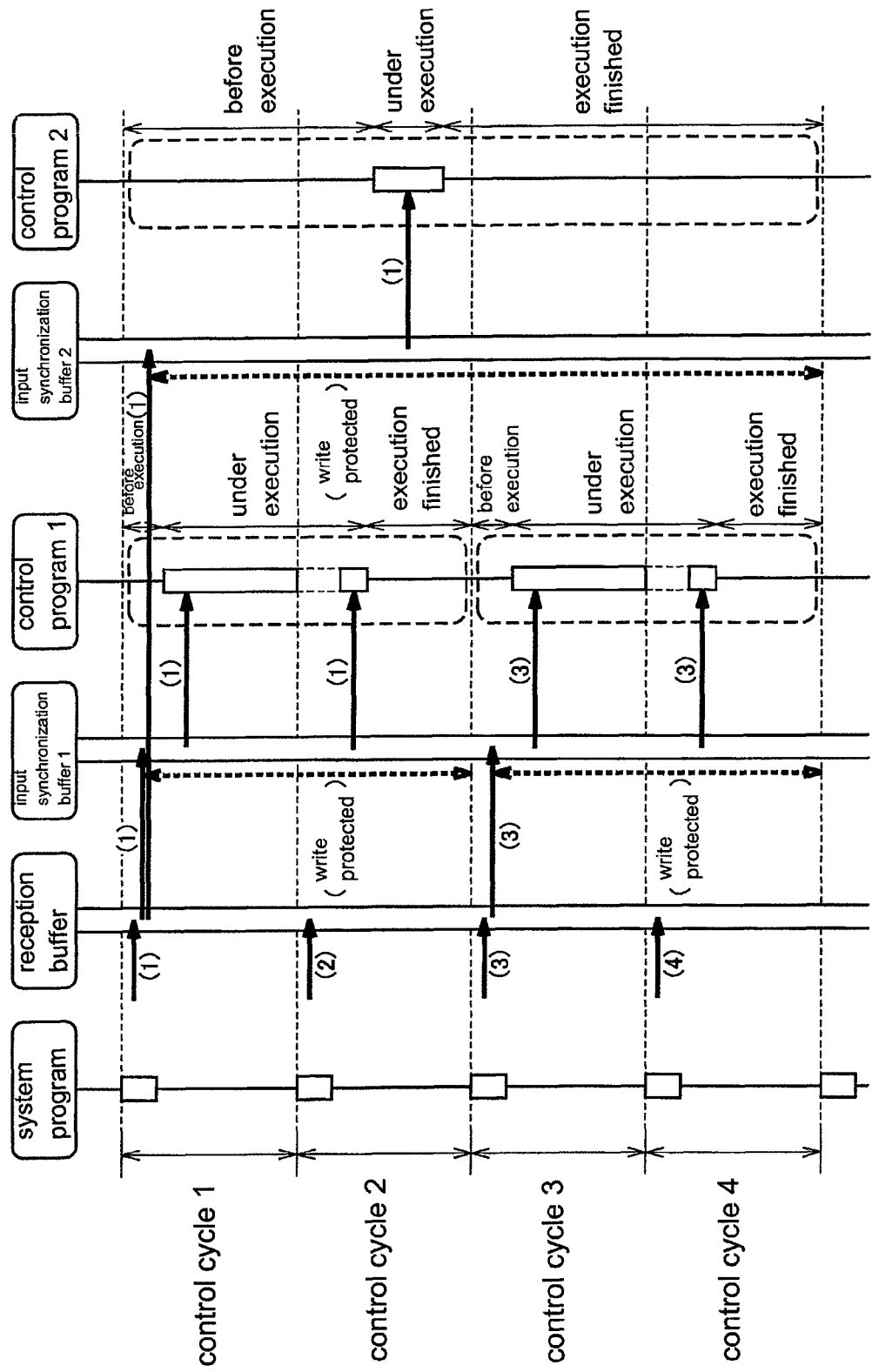
FIG. 24 is a sequence diagram showing an operation in an input direction according to a tenth embodiment.
Figure 25:
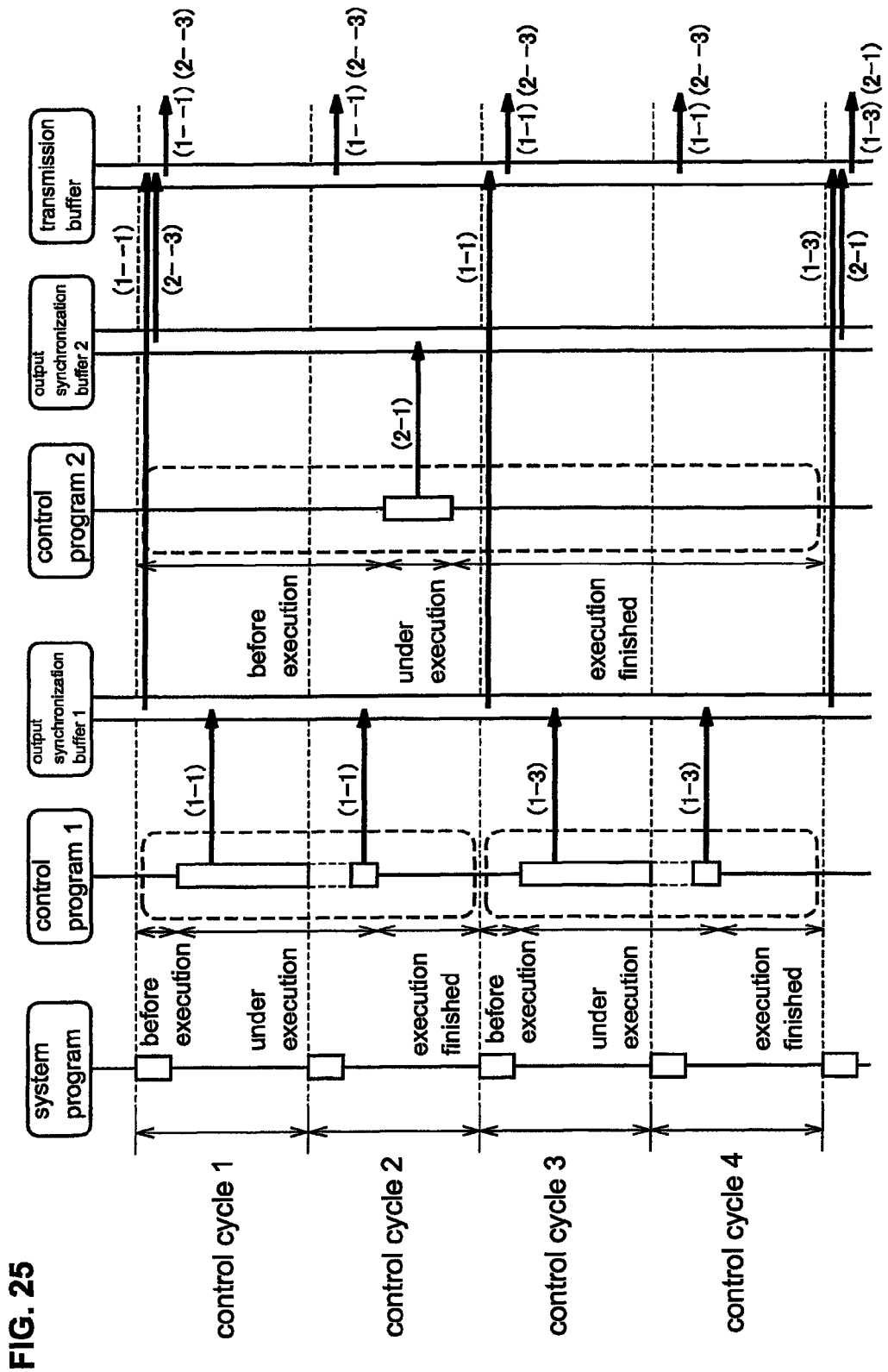
FIG. 25 is a sequence diagram showing an operation in an output direction according to the tenth embodiment.

FIG. 24 is a sequence diagram showing an operation in an input direction according to the tenth embodiment. FIG. 25 is a sequence diagram showing an operation in an output direction according to the tenth embodiment.

There are many points common to the input direction/output direction operations of the tenth embodiment and the above embodiments. Therefore, differences therebetween will be mainly described, and the common points will not be described in detail again.

Firstly, an input scheme according to the tenth embodiment will be described with reference to FIG. 24. For the input scheme, in the first embodiment, the input synchronization buffer is in the "write protected" state while a control program is being executed, and input data is copied from the reception buffer to the input synchronization buffer at each control cycle, except for when the input synchronization buffer as a copy destination is in the "write protected" state.

In contrast to this, in the tenth embodiment, input data is copied from the reception buffer to the input synchronization buffer only in a control cycle in which an execution cycle of a control program starts. This copy control is performed by monitoring whether or not the current control cycle corresponds to the first control cycle of the execution cycle. Alternatively, instead, if input data is copied to an input synchronization buffer, the input synchronization buffer may be set to the "write protected" state, and if the execution cycle of the control program ends, the "write protected" state may be canceled, whereby copying to the input synchronization buffer may be executed only at the first control cycle in which the execution cycle starts.

Next, an output scheme according to the tenth embodiment will be described with reference to FIG. 25. For the output scheme, in the first embodiment, when execution of a control program ends, output data is copied from the output synchronization buffer to the transmission buffer. Thereafter, when the next control cycle starts, output data is transmitted from the transmission buffer.

In contrast to this, in the tenth embodiment, when an execution cycle of a control program starts, output data is copied from the output synchronization buffer to the transmission buffer. Thereafter, output data is transmitted from the transmission buffer.

o3: Flowchart

Figure 26:
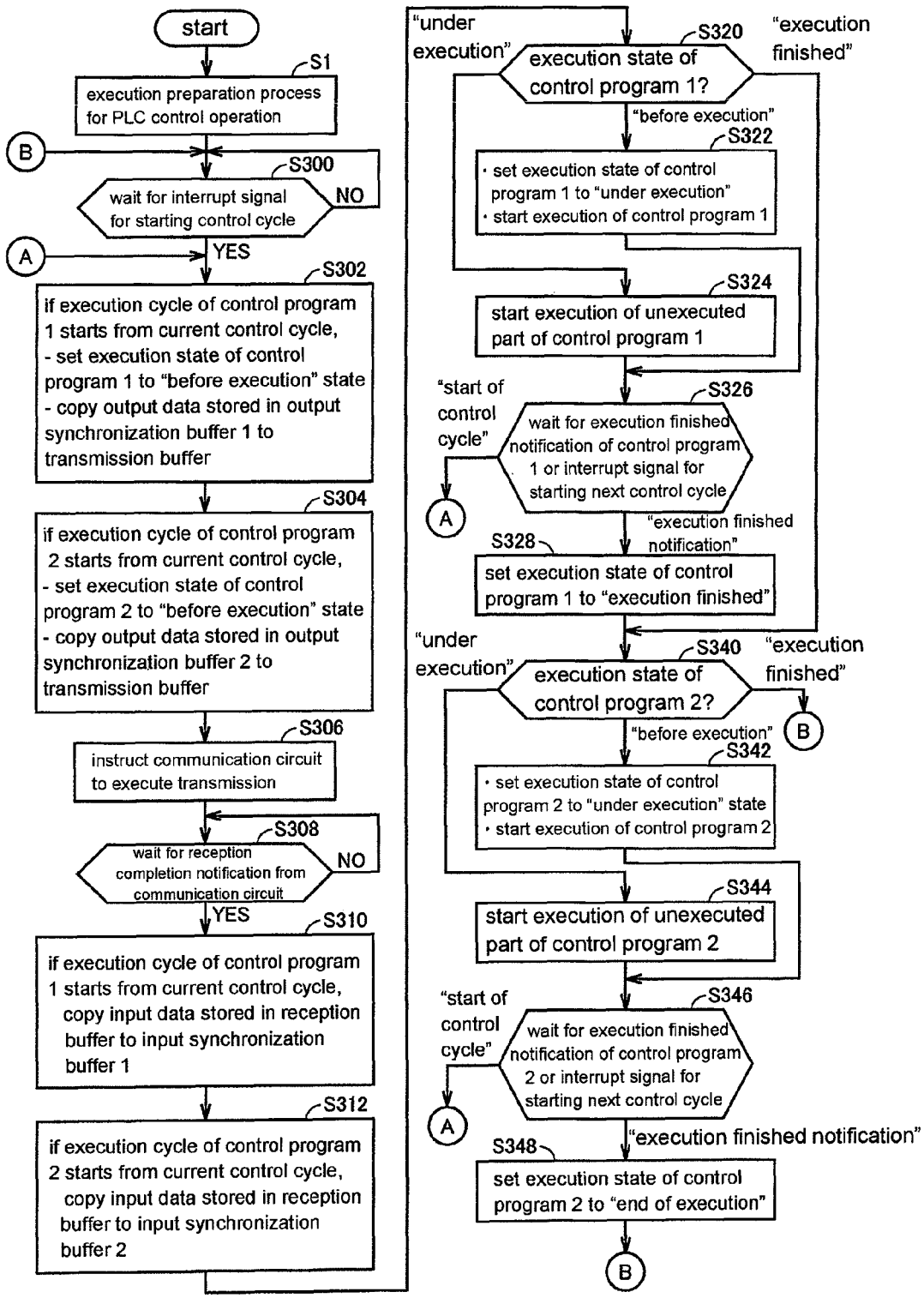
FIG. 26 is a flowchart showing an execution operation according to the tenth embodiment.

FIG. 26 is a flowchart showing an execution operation according to the tenth embodiment. Referring to FIG. 26, the microprocessor 100 executes the execution preparation process for the control operation of the PLC 1 in the system program 210 (step S1). Following this, the microprocessor 100 executes the execution control process for the control operation of the PLC 1 in the system program 210 (step S2 of FIG. 5). Steps S300-S348 correspond to a detailed example of the execution control process for the control operation of the PLC 1.

Initially, the microprocessor 100 waits for an interrupt signal for starting a control cycle (step S300). When receiving an interrupt signal for starting a control cycle (YES in step S300), the microprocessor 100, if an execution cycle of the control program 1 starts from the current control cycle, sets the execution state of the control program 1 to the "before execution" state, and copies output data stored in the output synchronization buffer 1 to the transmission buffer (the PLC system bus transmission buffer 1043 and/or the field network transmission buffer 1045) (step S302).

Following this, when an execution cycle of the control program 2 starts from the current control cycle, the microprocessor 100 sets the execution state of the control program 2 to the "before execution" state, and copies output data stored in the output synchronization buffer 2 to the transmission buffer (the PLC system bus transmission buffer 1043 and/or the field network transmission buffer 1045) (step S304).

Following this, the microprocessor 100 instructs the communication circuits (the PLC system bus controller 120 and/or the field network controller 140) to execute transmission (step S306). In response to the transmission execution instruction, data stored in the transmission buffer (the PLC system bus transmission buffer 1043 and/or the field network transmission buffer 1045) is transmitted to other units etc.

Thereafter, the microprocessor 100 waits for a reception completion notification from the communication circuits (the PLC system bus controller 120 and/or field network controller 140) (step S308).

When receiving a reception completion notification from the communication circuit (YES in step S308), if an execution cycle of the control program 1 starts from the current control cycle, the microprocessor 100 copies input data stored in the reception buffers (the PLC system bus reception buffer 1044 and/or the field network reception buffer 1046) to the input synchronization buffer 1 (step S310), and if an execution cycle of the control program 2 starts from the current control cycle, the microprocessor 100 copies input data stored in the reception buffers (the PLC system bus reception buffer 1044 and/or the field network reception buffer 1046) to the input synchronization buffer 2 (step S312).

Following this, the microprocessor 100 determines the execution state of the control program 1 (step S320).

If the control program 1 is in the "before execution" state ("before execution" in step S320), the microprocessor 100 sets the execution state of the control program 1 to the "under execution" state, and starts execution of the control program 1 (step S322). Thereafter, the process proceeds to step S326.

If the control program 1 is in the "under execution" state ("under execution" in step S320), the microprocessor 100 starts execution of the unexecuted part of the control program 1 (step S324). Thereafter, the process proceeds to step S326.

If the control program 1 is in the "execution finished" state ("execution finished" in step S320), the process proceeds to step S340.

When starting (or restarting) execution of the control program 1 in step S322 or S334, the microprocessor 100 waits for an execution finished notification of the control program 1 or an interrupt signal for starting the next control cycle (step S326). Note that in step S232 or S234, the start (or restart) of execution of the control program 1 switches a process executed by the microprocessor 100 from a process of the system program to a process of the control program 1. In other words, the microprocessor 100 does not execute the system program during a period of time from the start to end of execution of the control program 1. If an interrupt for starting the next control cycle occurs before the end of execution of the control program 1, the real-time OS 200 interrupts the execution of the control program 1 in the microprocessor 100, and causes the microprocessor 100 to restart execution of the system program. Alternatively, if there is a notification indicating the end of execution of the control program 1 (an execution finished notification of the control program 1), a target to be executed by the microprocessor 100 is changed from the control program 2 back to the system program.

When receiving an execution finished notification of the control program 1 ("execution finished notification" in step S316), the microprocessor 100 sets the execution state of the control program 1 to the "execution finished" state (step S328). Thereafter, the process proceeds to step S340.

On the other hand, when receiving an interrupt signal for starting the next control cycle before an execution finished notification of the control program 1 ("start of control cycle" in step S336), the control program 1 which is being executed in the microprocessor 100 is interrupted, and the microprocessor 100 executes step S302 and the following steps again.

In step S340, the microprocessor 100 determines the execution state of the control program 2 (step S340).

If the control program 2 is in the "before execution" state ("before execution" in step S340), the microprocessor 100 sets the execution state of the control program 2 to the "under execution" state, and starts execution of the control program 2 (step S342). Thereafter, the process proceeds to step S346.

If the control program 2 is in the "under execution" state ("under execution" in step S340), the microprocessor 100 starts execution of the unexecuted part of the control program 2 (step S344). Thereafter, the process proceeds to step S346.

If the control program 2 is in the "execution finished" state ("execution finished" in step S340), the process proceeds to step S300.

When starting (or restarting) execution of the control program 2 in step S342 or S344, the microprocessor 100 waits for an execution finished notification of the control program 2 or an interrupt signal for starting the next control cycle (step S346).

When receiving an execution finished notification of the control program 2 ("execution finished notification" in step S346), the microprocessor 100 sets the execution state of the control program 2 to the "execution finished" state (step S348). Thereafter, the process proceeds to step S300.

On the other hand, when receiving an interrupt signal for starting the next control cycle before an execution finished notification of the control program 2 ("start of control cycle" in step S346), the control program 2 which is being executed in the microprocessor 100 is interrupted, and the microprocessor 100 executes step S302 and the following steps again.

o4: Summary

As described above, in the tenth embodiment, the system program 210 includes, as the execution preparation process for the control operation of the PLC 1 which is related to inputting of input data, the following processes (a) and (b). Note that reception of input data is executed at each execution cycle.

(a) A process for producing reception buffers (the PLC system bus reception buffer 1044 and the field network reception buffer 1046 of FIG. 4) for storing received input data, in the main memory 104 (storage means) (step S1 of FIG. 26).

(b) A process for producing, for each input data referred to by a control program, an input synchronization buffer (the input synchronization buffers 1 and 2 of FIG. 24) used by the control program as a reference target for the input data, in the main memory 104 (storage means) (the input synchronization buffer area 1042*b* of FIG. 4) (step S1 of FIG. 26).

In the tenth embodiment, the system program 210 also includes, as the execution control process for the control operation of the PLC 1, the following processes (c) and (d).

(c) An input copy process for copying received input data from the reception buffers (the PLC system bus reception buffer 1044 and the field network reception buffer 1046 of FIG. 4) to the input synchronization buffer corresponding to that input data, on the condition that the input data is received at a reception timing related to the control cycle in which an execution cycle of the control program started (step S310 or S312 of FIG. 26).

(d) A control program start process for starting execution of the control program at every execution cycle as an integer multiple of the control cycle (step S322 or S342 of FIG. 26).

According to the above processing scheme related to input data of the tenth embodiment, if an execution cycle of a control program extends over a plurality of control cycles, input data which is received at a reception timing related to a control cycle in which an execution cycle of the control program starts is consistently used as input data used to execute the control program.

Note that the term "starting execution of a control program at every execution cycle as an integer multiple of a control cycle" does not exclude cases where the execution cycle time varies, and encompasses, for example, cases where if the control program does not end within an execution cycle, the execution cycle is extended in units of one control cycle time.

On the other hand, in the tenth embodiment, the system program 210 includes, as the execution preparation process for the control operation of the PLC 1, the following processes (α)-(γ) including processes related to outputting of output data.

(α) A process for producing reception buffers (the PLC system bus reception buffer 1044 and the field network reception buffer 1046 of FIG. 4) for storing received input data and a transmission buffer (the PLC system bus transmission buffer 1043 and the field network transmission buffer 1045 of FIG. 4) for storing output data to be transmitted, in the main memory 104 (storage means) (step S1 of FIG. 26).

(β) A process for producing, for each input data referred to by a control program, an input synchronization buffer (the input synchronization buffers 1 and 2 of FIG. 24) used by the control program as a reference target for the input data, in the main memory 104 (storage means) (the input synchronization buffer area 1042*b* of FIG. 4) (step S1 of FIG. 26).

(γ) A process for producing output synchronization buffers (the output synchronization buffers 1 and 2 of FIG. 25) for storing output data to be copied to the transmission buffer, in the main memory 104 (storage means) (the output synchronization buffer area 1042*a* of FIG. 4) (step S1 of FIG. 26).

In the tenth embodiment, the system program 210 also includes, as the execution control process for the control operation of the PLC 1, the following processes (δ)-(ζ).

(δ) An input copy process for copying received input data from the reception buffers (the PLC system bus reception buffer 1044 and the field network reception buffer 1046 of FIG. 4) to the input synchronization buffer corresponding to that input data (step S310 or S312 of FIG. 26).

(ε) A control program start process for starting execution of the control program (steps S322 or S342 of FIG. 26).

(ζ) An output copy process for copying output data from the output synchronization buffer to the transmission buffer, at a timing when the output data is to be transmitted from the transmission buffer in the first control cycle of an execution cycle following an execution cycle in which the control program that produced the output data is executed (step S302 or S304 of FIG. 26).

According to the above processing scheme related to output data of the tenth embodiment, if an execution cycle of a control program extends over a plurality of control cycles, a transmission timing related to the last control cycle in the execution cycle may be consistently used as a transmission timing of updated output data.

Note that if output data is transmitted at each transmission cycle, output data which has been updated and stored in the transmission buffer since before a transmission timing related to the last control cycle in the execution cycle of the control program, is repeatedly transmitted at transmission timings other than the transmission timing related to the last control cycle.

P. Execution Cycle Synchronization Type Update Flag Type Three-Buffer Interchange Scheme

Eleventh Embodiment p1: Overview

In the eleventh embodiment and in the twelfth and thirteenth embodiments described below, similar to the tenth embodiment, the three-buffer interchange schemes of the sixth through ninth embodiments are applied to achieve effective input data reception and output data transmission synchronous with execution cycles of a control program.

p2: Sequence Diagram

Figure 27:
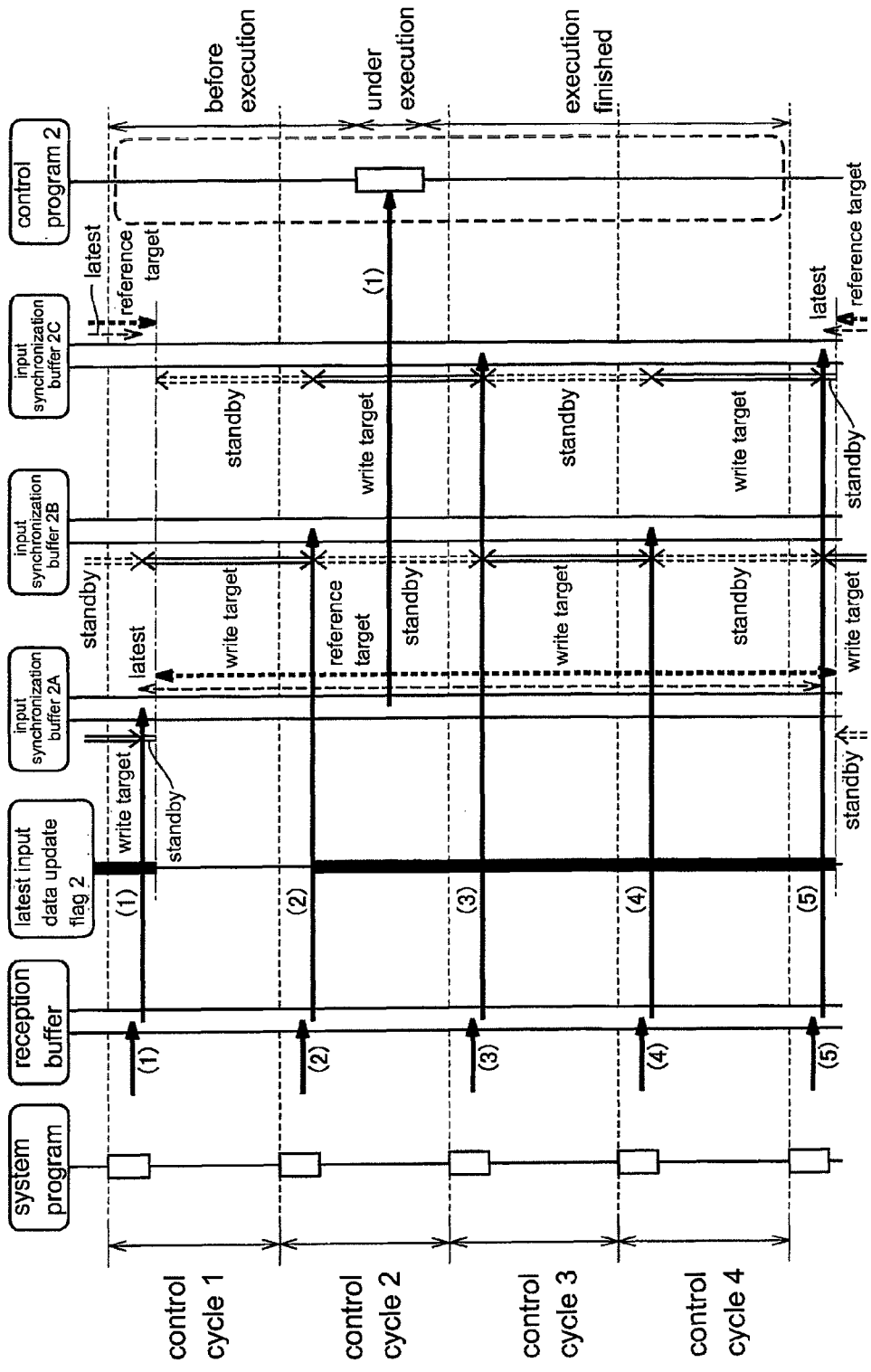
FIG. 27 is a sequence diagram showing operations in an input direction according to eleventh, twelfth, and thirteenth embodiments.
Figure 28:
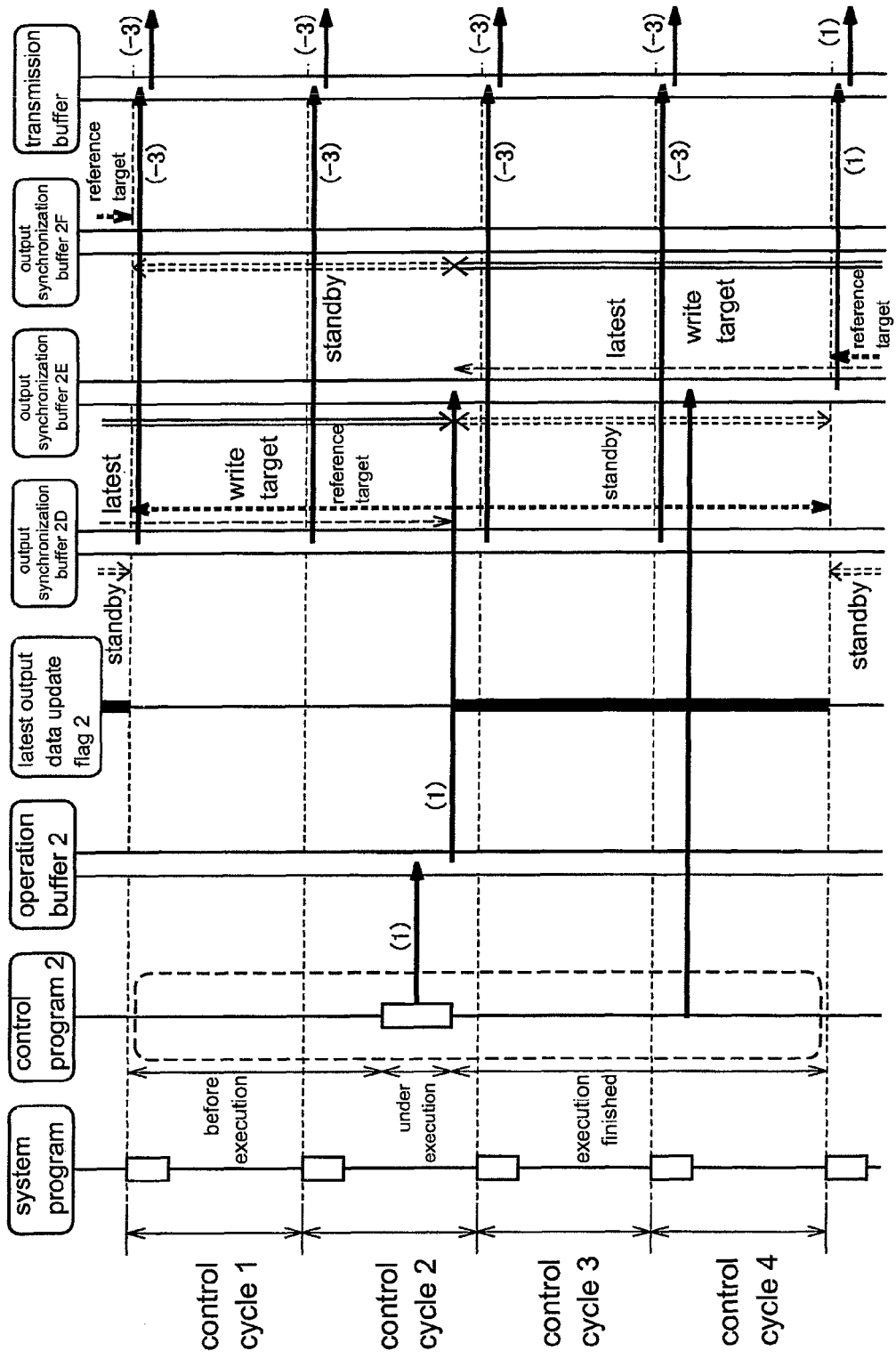
FIG. 28 is a sequence diagram showing operations in an output direction according to the eleventh, twelfth, and thirteenth embodiments.

FIG. 27 is a sequence diagram showing an operation in an input direction according to the eleventh embodiment. FIG. 28 is a sequence diagram showing an operation in an output direction according to the eleventh embodiment. Control programs 1 and 2 in the eleventh embodiment are the same programs as those of the tenth embodiment shown in FIGS. 24 and 25, and are executed based on similar schedules. In FIGS. 27 and 28, only the control program 2 is shown, and the control program 1 is not shown.

There are many points common to the input direction/output direction operations of the eleventh embodiment and the above six and eighth embodiments. Therefore, differences therebetween will be mainly described, and the common points will not be described in detail again.

Firstly, an input scheme according to the eleventh embodiment will be described with reference to FIG. 27. For the input scheme, in the sixth embodiment, when the latest input data update flag is on "before the start of execution of a control program," the "standby" state and the "reference target" state of input synchronization buffers are interchanged, and the latest input data update flag is turned off.

In contrast to this, in the eleventh embodiment, "after input data is copied from the reception buffer to an input synchronization buffer, on the condition that the current control cycle is the first control cycle in an execution cycle of a control program," if the latest input data update flag is on, the "standby" state and the "reference target" state of input synchronization buffers are interchanged, and the latest input data update flag is turned off.

Next, an output scheme according to the eleventh embodiment will be described with reference to FIG. 28. For the output scheme, in the eighth embodiment, "when a control cycle starts," then if the latest output data update flag is on, the "standby" state and the "reference target" state of output synchronization buffers are interchanged, and the latest output data update flag is turned off.

In contrast to this, in the eleventh embodiment, "when an execution cycle of a control program starts," then if the latest output data update flag is on, the "standby" state and the "reference target" state of output synchronization buffers are interchanged, and the latest output data update flag is turned off.

p3: Flowchart

Figure 29:
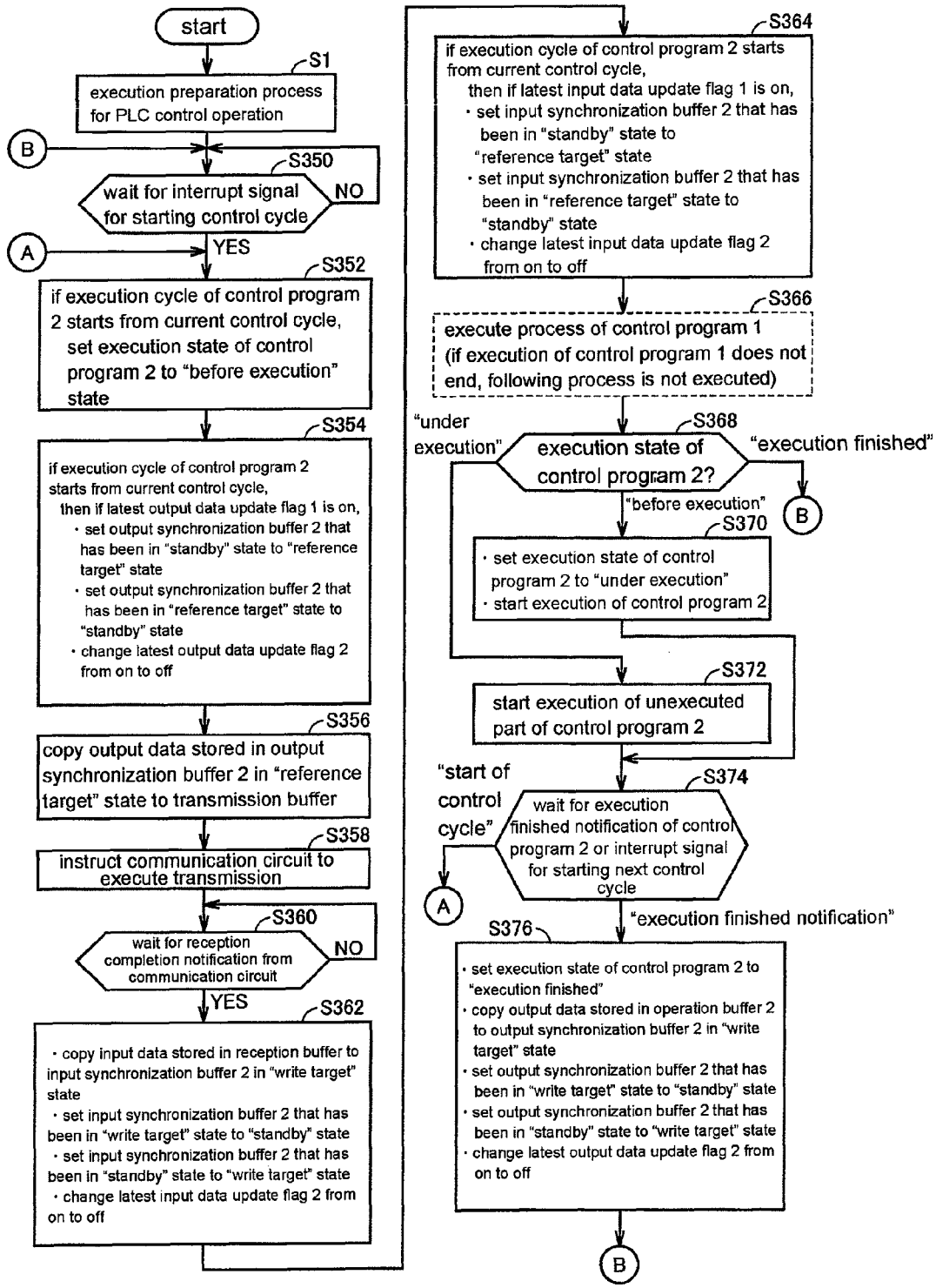
FIG. 29 is a flowchart showing an execution operation according to the eleventh embodiment.

FIG. 29 is a flowchart showing an execution operation according to the eleventh embodiment. In FIG. 29, processes related to the control program 1 are not shown. Referring to FIG. 29, the microprocessor 100 executes the execution preparation process for the control operation of the PLC 1 in the system program (step S1). Following this, the microprocessor 100 executes the execution control process for the control operation of the PLC 1 in the system program 210 (step S2 of FIG. 5). Steps S350-S376 correspond to a detailed example of the execution control process for the control operation of the PLC 1.

Initially, the microprocessor 100 waits for an interrupt signal for starting a control cycle (step S350). When receiving an interrupt signal for starting a control cycle (YES in step S350), if an execution cycle of the control program 2 starts from the current control cycle, the microprocessor 100 sets the execution state of the control program 2 to the "before execution" state (step S352).

Following this, when an execution cycle of the control program 2 starts from the current control cycle, then if the latest output data update flag 1 is on, the microprocessor 100 sets an output synchronization buffer 2 (one of output synchronization buffers 2D, 2E, and 2F) that has been in the "standby" state to the "reference target" state, and an output synchronization buffer 2 (one of the output synchronization buffers 2D, 2E, and 2F) that has been in the "reference target" state to the "standby" state, and thereafter, changes a latest output data update flag 2 from on to off (step S354). In this case, if the latest output data update flag 2 is off, the "standby" state and the "reference target" state of the output synchronization buffers 2 are not changed, and the latest output data update flag 2 is maintained off.

The microprocessor 100 copies output data stored in the output synchronization buffer 2 in the "reference target" state to the transmission buffer (the PLC system bus transmission buffer 1043 and/or the field network transmission buffer 1045) (step S356).

Following this, the microprocessor 100 instructs the communication circuits (the PLC system bus controller 120 and/or the field network controller 140) to execute transmission (step S358). In response to the transmission execution instruction, data stored in the transmission buffer (the PLC system bus transmission buffer 1043 and/or the field network transmission buffer 1045) is transmitted to other units etc.

Thereafter, the microprocessor 100 waits for a reception completion notification from the communication circuits (the PLC system bus controller 120 and/or field network controller 140) (step S360).

When receiving a reception completion notification from the communication circuits (YES in step S360), the microprocessor 100 copies input data stored in the reception buffers (the PLC system bus reception buffer 1044 and/or the field network reception buffer 1046) to an input synchronization buffer 2 (one of input synchronization buffers 2A, 2B, and 2C) in the "write target" state, and sets the input synchronization buffer 2 (one of input synchronization buffers 2A, 2B, and 2C) that has been in the "write target" state to the "standby" state, and an input synchronization buffer 2 (one of input synchronization buffers 2A, 2B, and 2C) that has been in the "standby" state to the "write target" state, and thereafter, changes the latest input data update flag 2 from on to off (step S362).

Following this, when an execution cycle of the control program 2 starts from the current control cycle, then if the latest input data update flag 1 is on, the microprocessor 100 sets the input synchronization buffer 2 (one of the input synchronization buffers 2A, 2B, and 2C) that has been in the "standby" state to the "reference target" state, and an input synchronization buffer 2 (one of the input synchronization buffers 2A, 2B, and 2C) that has been in the "reference target" state to the "standby" state, and thereafter, changes the latest input data update flag 2 from on to off (step S364). In this case, if the execution cycle of the control program 2 has not started from the current control cycle, the "reference target" state and the "standby" state of the input synchronization buffers 2 are not changed, and the latest input data update flag 2 is maintained off.

Thereafter, the microprocessor 100 executes a process of the control program 1 (step S366). In step S366, the start of execution of the control program 1 switches a process executed by the microprocessor 100 from a process of the system program to the process of the control program 1. In other words, the microprocessor 100 does not execute the system program during a period of time from the start to end of execution of the control program 1. If an interrupt for starting the next control cycle occurs before the end of execution of the control program 1, the real-time OS 200 interrupts the execution of the control program 1 in the microprocessor 100, and causes the microprocessor 100 to restart execution of the system program. Alternatively, if there is a notification indicating the end of execution of the control program 1 (an execution finished notification of the control program 1), a predetermined process for the control program 1 is executed before the process proceeds to step S368.

In step S368, the microprocessor 100 determines the execution state of the control program 2 (step S368).

If the control program 2 is in the "before execution" state ("before execution" in step S368), the microprocessor 100 sets the execution state of the control program 2 to the "under execution" state, and starts execution of the control program 2 (step S370). Thereafter, the process proceeds to step S374.

If the control program 2 is in the "under execution" state ("under execution" in step S368), the microprocessor 100 starts execution of the unexecuted part of the control program 1 (step S372). Thereafter, the process proceeds to step S374.

If the control program 2 is in the "execution finished" state ("execution finished" in step S368), the process proceeds to step S350.

When starting (or restarting) execution of the control program 2 in step S370 or S372, the microprocessor 100 waits for an execution finished notification of the control program 2 or an interrupt signal for starting the next control cycle (step S374).

When receiving an execution finished notification of the control program 2 ("execution finished notification" in step S374), the microprocessor 100 sets the execution state of the control program 2 to the "execution finished" state, and copies output data stored in an operation buffer 2 to the output synchronization buffer 2 (one of the output synchronization buffers 2D, 2E, and 2F) in the "write target" state, and thereafter, sets the output synchronization buffer 2 (one of the output synchronization buffers 2D, 2E, and 2F) that has been in the "write target" state to the "standby" state, and the output synchronization buffer 2 (one of the output synchronization buffers 2D, 2E, and 2F) that has been in the "standby" state to the "write target" state, and thereafter, changes the latest output data update flag 2 from off to on (step S376). Thereafter, the process proceeds to step S350.

On the other hand, when receiving an interrupt signal for starting the next control cycle before an execution finished notification of the control program 2 ("start of control cycle" in step S374), the control program 2 which is being executed in the microprocessor 100 is interrupted, and the microprocessor 100 executes step S352 and the following steps again.

p4: Summary

According to the eleventh embodiment, when the PLC system program employs the three-buffer schemes of the sixth through ninth embodiments, input data reception and output data transmission synchronous with execution cycles of a control program can be achieved by slightly changing the algorithm.

Q. Execution Cycle Synchronization Type Latest Data Type Three-Buffer Interchange Scheme Twelfth Embodiment q1: Overview As described above, in the twelfth embodiment, the three-buffer interchange schemes of the sixth through ninth embodiments are applied to achieve effective input data reception and output data transmission synchronous with execution cycles of a control program.

q2: Sequence Diagram

There are many points common to the input direction/output direction operations of the twelfth embodiment and the above seventh and ninth embodiments. Therefore, differences therebetween will be mainly described, and the common points will not be described in detail again.

Firstly, an input scheme according to the twelfth embodiment will be described with reference to FIG. 27. For the input scheme, in the seventh embodiment, when the input synchronization buffer in the "latest" state is in the "standby" state "before the start of execution of a control program," the "standby" state and the "reference target" state of the input synchronization buffers are interchanged.

In contrast to this, in the twelfth embodiment, "after input data is copied from the reception buffer to an input synchronization buffer, on the condition that the current control cycle is the first control cycle in an execution cycle of a control program," if an input synchronization buffer in the "latest" state is in the "standby" state "before the start of execution of the control program," the "standby" state and the "reference target" state of input synchronization buffers are interchanged.

Next, an output scheme according to the twelfth embodiment will be described with reference to FIG. 28. For the output scheme, in the ninth embodiment, "when a control cycle starts," then if an output synchronization buffer in the "latest" state is in the "standby" state, the "standby" state and the "reference target" state of output synchronization buffers are interchanged.

In contrast to this, in the eleventh embodiment, "when an execution cycle of a control program starts," then if an output synchronization buffer in the "latest" state is in the "standby" state, the "standby" state and the "reference target" state of output synchronization buffers are interchanged.

q3: Flowchart

Figure 30:
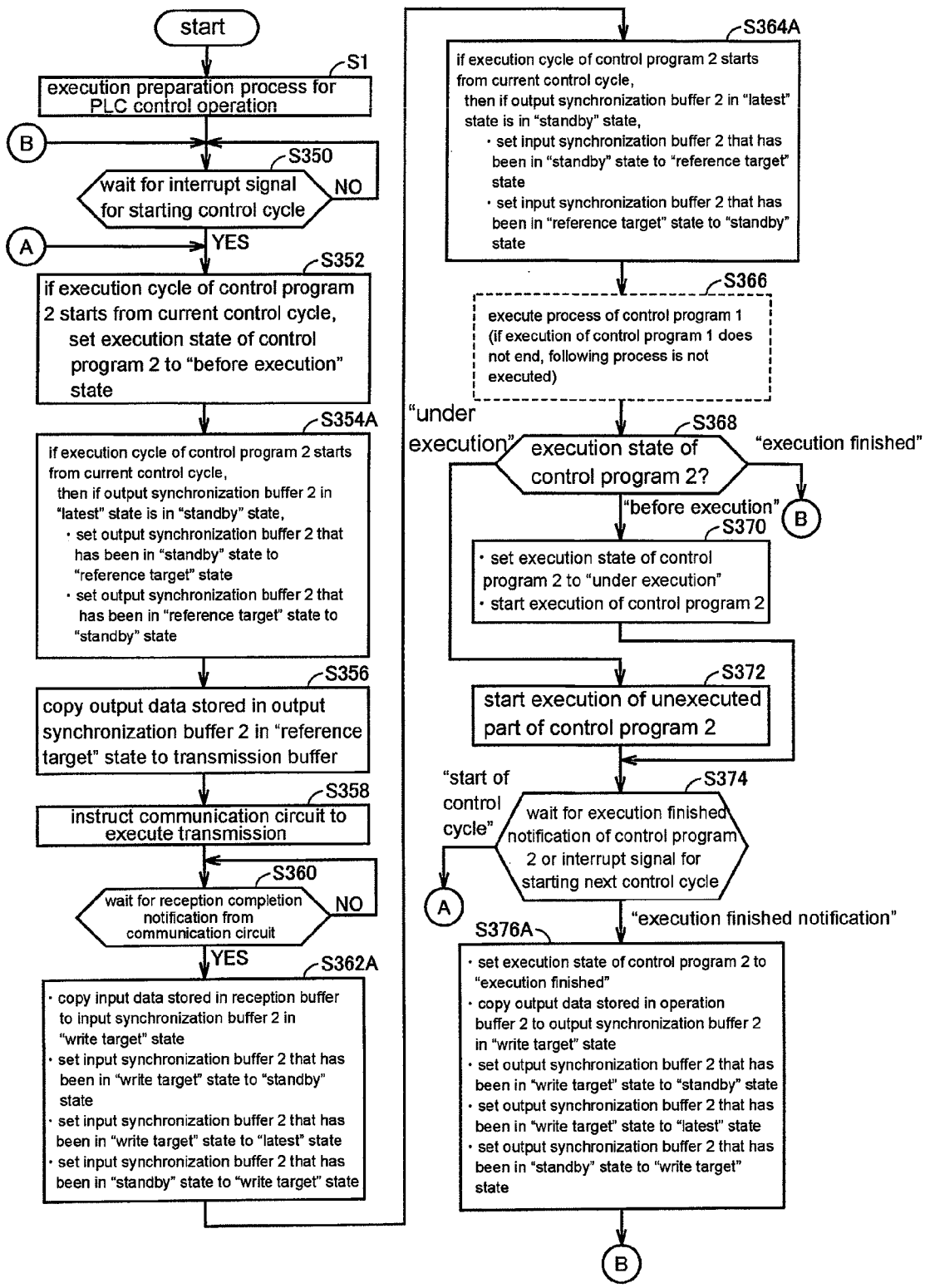
FIG. 30 is a flowchart showing an execution operation according to the twelfth embodiment.

FIG. 30 is a flowchart showing an execution operation according to the twelfth embodiment. Also in FIG. 30, processes related to the control program 1 are not shown.

The flowchart of FIG. 30 is different from the flowchart of FIG. 29 in that processes of steps S354A, S362A, S364A, and S376A are executed instead of steps S354, S362, S364, and S376. This difference will be mainly described hereinafter, and the other processes will not be described in detail again.

In step S354A which is executed following step S352, when an execution cycle of the control program 2 starts from the current control cycle, then if the output synchronization buffer 2 (one of output synchronization buffers 2D, 2E, and 2F) in the "latest" state is in the "standby" state, the microprocessor 100 sets the output synchronization buffer 2 (one of output synchronization buffers 2D, 2E, and 2F) that has been in the "standby" state to the "reference target" state, and the output synchronization buffer 2 (one of the output synchronization buffers 2D, 2E, and 2F) that has been in the "reference target" state to the "standby" state (step S354A).

In this case, if the output synchronization buffer 2 in the "latest" state is in the "reference target" state, the "standby" state and the "reference target" state of the output synchronization buffers 2 are not changed and are maintained.

In step S362A which is executed when receiving a reception completion notification from the communication circuit (YES in step S360), the microprocessor 100 copies input data stored in the reception buffers (the PLC system bus reception buffer 1044 and/or the field network reception buffer 1046) to the input synchronization buffer 2 (one of input synchronization buffers 2A, 2B, and 2C) in the "write target" state, and sets the input synchronization buffer 2 (one of input synchronization buffers 2A, 2B, and 2C) that has been in the "write target" state to the "standby" state, and the input synchronization buffer 2 (one of input synchronization buffers 2A, 2B, and 2C) that has been in the "standby" state to the "write target" state (step S362A).

In step S364A which is executed following step S362A, when an execution cycle of the control program 2 starts from the current control cycle, then if the output synchronization buffer 2 in the "latest" state is in the "standby" state, the microprocessor 100 sets the input synchronization buffer 2 (one of the input synchronization buffers 2A, 2B, and 2C) that has been in the "standby" state to the "reference target" state, and the input synchronization buffer 2 (one of the input synchronization buffers 2A, 2B, and 2C) that has been in the "reference target" state to the "standby" state (step S364A). In this case, if the execution cycle of the control program 2 has not started from the current control cycle, the "reference target" state and the "standby" state of the input synchronization buffers 2 are not changed and are maintained.

In step S376A which is executed when receiving an execution finished notification of the control program 2 ("execution finished notification" in step S374), the microprocessor 100 sets the execution state of the control program 2 to the "execution finished" state, and copies output data stored in the operation buffer 2 to the output synchronization buffer 2 (one of the output synchronization buffers 2D, 2E, and 2F) in the "write target" state, and thereafter, sets the output synchronization buffer 2 (one of the output synchronization buffers 2D, 2E, and 2F) that has been in the "write target" state to the "standby" state and the "latest" state, and the output synchronization buffer 2 (one of the output synchronization buffers 2D, 2E, and 2F) that has been in the "standby" state to the "write target" state (step S376A).

q4: Summary

According to the twelfth embodiment, when the PLC system program employs the buffer schemes of the sixth through ninth embodiments, input data reception and output data transmission synchronous with execution cycles of a control program can be achieved by slightly changing the algorithm.

R. Execution Cycle Synchronization Type Update No-Check Type Three-Buffer Interchange Scheme Thirteenth Embodiment r1: Overview As described above, in the thirteenth embodiment, the three-buffer interchange schemes of the sixth through ninth embodiments are applied to achieve effective input data reception and output data transmission synchronous with execution cycles of a control program.

r2: Sequence Diagram

A sequence diagram showing an operation in an input direction according to the thirteenth embodiment is substantially the same as that of FIG. 27 of the eleventh embodiment. A sequence diagram showing an operation in an output direction according to the thirteenth embodiment is substantially the same as that of FIG. 28 of the eleventh embodiment.

In the above eleventh embodiment, the latest input data update flag and the latest output data update flag are used to check the updated states of input data and output data. In the above twelfth embodiment, the latest states of the input synchronization buffers and the output synchronization buffers are used to check the updated states of input data and output data.

However, if at least reception of input data and copying to the input synchronization buffer are reliably performed in the first control cycle in an execution cycle of a control program, it is not necessary to check the updated state of input data. Also, if production of output data and copying to the output synchronization buffer are reliably performed at each execution cycle of a control program, the update of the output data may be omitted.

Therefore, in the thirteenth embodiment, the updated states of input data and output data are not checked.

Note that if it is not necessarily true that input data is always received at the first control cycle in an execution cycle and output data is always produced in the execution cycle (including the extension of the execution cycle), it is useful to check the updated states of input data and output data as in the eleventh or twelfth embodiment.

r3: Flowchart

FIG. 30 is a flowchart showing an execution operation according to the thirteenth embodiment. Also in FIG. 31, processes related to the control program 1 are not shown.

The flowchart of FIG. 30 is different from the flowchart of FIG. 29 in that processes of steps S354B, S362B, S364B, and S376B are executed instead of steps S354, S362, S364, and S376. This difference will be mainly described hereinafter, and the other processes will not be described in detail again.

In step S354B which is executed following step S352, when an execution cycle of the control program 2 starts from the current control cycle, the microprocessor 100 sets the output synchronization buffer 2 (one of output synchronization buffers 2D, 2E, and 2F) that has been in the "standby" state to the "reference target" state, and the output synchronization buffer 2 (one of the output synchronization buffers 2D, 2E, and 2F) that has been in the "reference target" state to the "standby" state (step S354B).

In step S362B which is executed when receiving a reception completion notification from the communication circuit (YES in step S360), the microprocessor 100 copies input data stored in the reception buffers (the PLC system bus reception buffer 1044 and/or the field network reception buffer 1046) to the input synchronization buffer 2 (one of input synchronization buffers 2A, 2B, and 2C) in the "write target" state, and sets the input synchronization buffer 2 (one of input synchronization buffers 2A, 2B, and 2C) that has been in the "write target" state to the "standby" state, and the input synchronization buffer 2 (one of input synchronization buffers 2A, 2B, and 2C) that has been in the "standby" state to the "write target" state (step S362B).

In step S364B which is executed following step S362B, when an execution cycle of the control program 2 starts from the current control cycle, the microprocessor 100 sets the input synchronization buffer 2 (one of the input synchronization buffers 2A, 2B, and 2C) that has been in the "standby" state to the "reference target" state, and the input synchronization buffer 2 (one of the input synchronization buffers 2A, 2B, and 2C) that has been in the "reference target" state to the "standby" state (step S364B). In this case, if the execution cycle of the control program 2 has not started from the current control cycle, the "reference target" state and the "standby" state of the input synchronization buffers 2 are not changed and are maintained.

In step S376B which is executed when receiving an execution finished notification of the control program 2 ("execution finished notification" in step S374), the microprocessor 100 sets the execution state of the control program 2 to the "execution finished" state, and copies output data stored in the operation buffer 2 to the output synchronization buffer 2 (one of the output synchronization buffers 2D, 2E, and 2F) in the "write target" state, and thereafter, sets the output synchronization buffer 2 (one of the output synchronization buffers 2D, 2E, and 2F) that has been in the "write target" state to the "standby" state, and the output synchronization buffer 2 (one of the output synchronization buffers 2D, 2E, and 2F) that has been in the "standby" state to the "write target" state (step S376B).

r4: Summary

As described above, in the thirteenth embodiment, the system program 210 includes, as the execution preparation process for the control operation of the PLC 1 which is related to inputting of input data, the following processes (a) and (b). Note that reception of input data is executed at each execution cycle.

Figure 31:
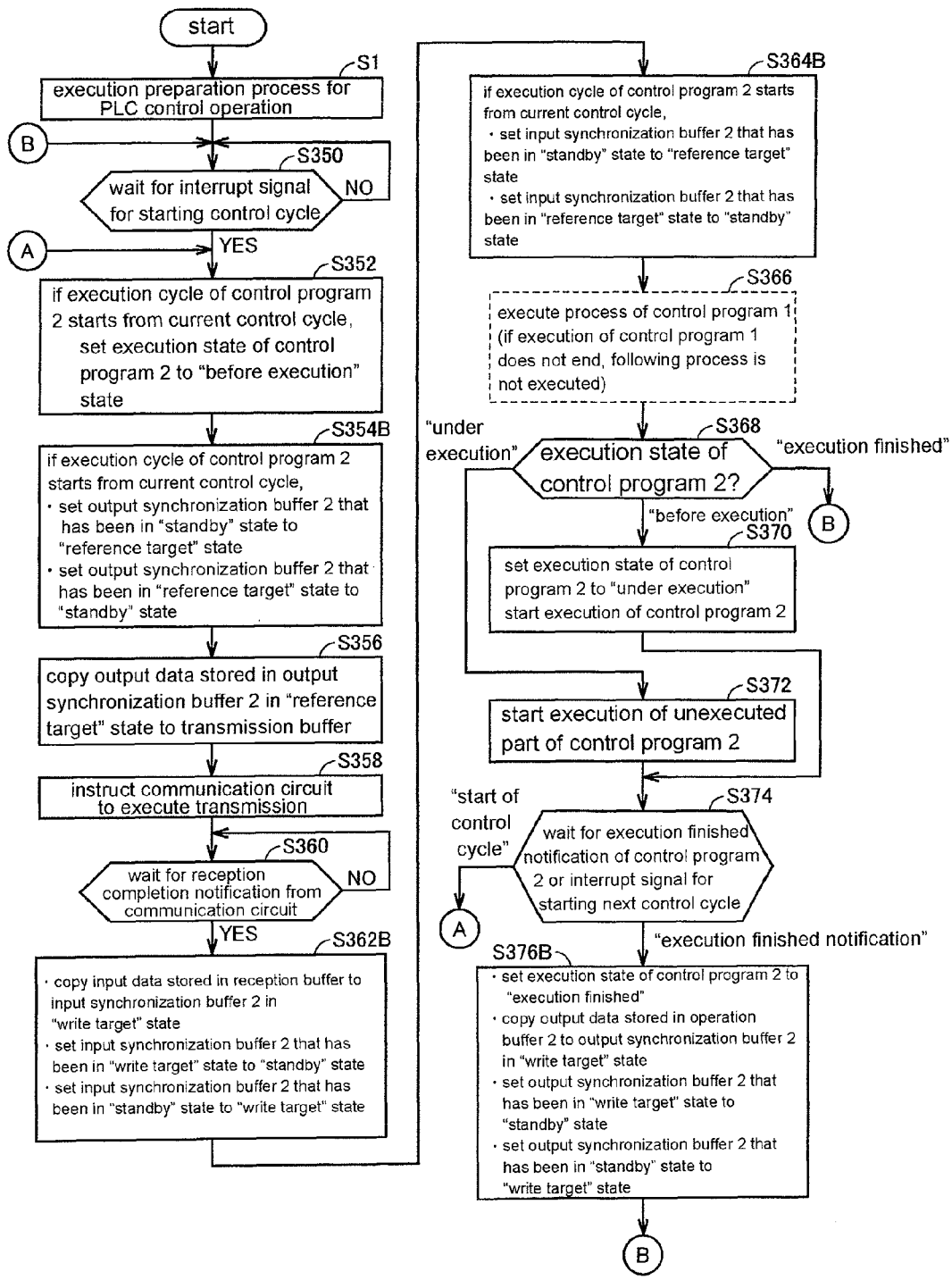
FIG. 31 is a flowchart showing an execution operation according to the thirteenth embodiment.

(a) A process for producing reception buffers (the PLC system bus reception buffer 1044 and the field network reception buffer 1046 of FIG. 4) for storing received input data, in the main memory 104 (storage means) (step S1 of FIG. 31).

(b) A process for producing, for each input data referred to by a control program, a first input synchronization buffer, a second input synchronization buffer, and a third input synchronization buffer (the input synchronization buffers 2A, 2B, and 2C of FIG. 27), as a set of input synchronization buffers, which are used by the control program as a reference target for the input data, in the main memory 104 (storage means) (step S1 of FIG. 31). To the first input synchronization buffer, the second input synchronization buffer, and the third input synchronization buffer, any of the "write target" state in which input data can be copied from the reception buffers (the PLC system bus reception buffer 1044 and/or the field network reception buffer 1046 of FIG. 4), the "reference target" state in which input data can be referred to by the control program, and the "standby" state are allocated without overlapping.

In the thirteenth embodiment, the system program 210 also includes, as the execution control process for the control operation of the PLC 1, the following processes (c)-(e).

(c) An input copy process for copying received input data from the reception buffers (the PLC system bus reception buffer 1044 and the field network reception buffer 1046 of FIG. 4) to the input synchronization buffer in the "write target" state corresponding to the input data, and executing a first interchange process for interchanging the "write target" state and the "standby" state of the input synchronization buffer in the "write target" state as the copy destination and the input synchronization buffer in the "standby" state belonging to the same set as that input synchronization buffer (step S362B of FIG. 31).

(d) An execution cycle input initialization process for executing, on the condition that it is a control cycle in which an execution cycle of the control program started, a second interchange process for interchanging the "standby" state and the "reference target" state of the input synchronization buffer in the "standby" state and the input synchronization buffer in the "reference target" state (step S364B of FIG. 31).

(e) A control program start process for starting execution of the control program at every execution cycle as an integer multiple of the control cycle (step S370 of FIG. 31).

On the other hand, in the thirteenth embodiment, the system program 210 includes, as the execution preparation process for the control operation of the PLC 1, the following processes ($\alpha$)-($\gamma$) including processes related to outputting of output data.

($\alpha$) A process for producing reception buffers (the PLC system bus reception buffer 1044 and the field network reception buffer 1046 of FIG. 4) for storing received input data and a transmission buffer (the PLC system bus transmission buffer 1043 and the field network transmission buffer 1045 of FIG. 4) for storing output data to be transmitted, in the main memory 104 (storage means) (step S1 of FIG. 31).

($\beta$) A process for producing, for each input data referred to by a control program, an input synchronization buffer (the input synchronization buffers 2A, 2B, and 2C of FIG. 27) used by the control program as a reference target for the input data, in the main memory 104 (storage means) (the input synchronization buffer area 1042b of FIG. 4) (step S1 of FIG. 31).

($\gamma$) A process for producing a first output synchronization buffer, a second output synchronization buffer, and a third output synchronization buffer (the output synchronization buffers 2D, 2E, and 2F of FIG. 28) for storing output data to be copied to the transmission buffer, in the main memory 104 (storage means) (the output synchronization buffer area 1042a of FIG. 4) (step S1 of FIG. 31). To the first output synchronization buffer, the second output synchronization buffer, and the third output synchronization buffer, any of a "write target" state in which output data can be copied from the operation buffer, a "reference target" state in which reference can be made for copying to the transmission buffer, and a "standby" state are allocated without overlapping.

In the thirteenth embodiment, the system program 210 also includes, as the execution control process for the control operation of the PLC 1, the following processes ($\delta$)-($\zeta$).

($\delta$) An input copy process for copying received input data from the reception buffers (the PLC system bus reception buffer 1044 and the field network reception buffer 1046 of FIG. 4) to the input synchronization buffer corresponding to that input data (step S362B of FIG. 31).

($\epsilon$) A control program start process for starting execution of the control program (step S370 of FIG. 31).

($\zeta$) An output synchronization buffer storage process for copying, when execution of the control program ends, output data produced by the execution of the control program from the operation buffer to the output synchronization buffer in the "write target" state, and executing a fourth interchange process for interchanging the "write target" state and the "standby" state of the output synchronization buffer in the write target state as the copy destination and the output synchronization buffer in the "standby" state in the same set as that output synchronization buffer (step S376B of FIG. 31).

($\eta$) An output copy process for copying output data from the output synchronization buffer in the "reference target" state to the transmission buffer after the start of each control cycle before transmission of output data from the transmission buffer, executing, on the condition that it is a control cycle in which an execution cycle of the control program started, a fifth interchange process for interchanging the "standby" state and the "reference" target state of the output synchronization buffer in the "standby" state and the output synchronization buffer in the "reference target" state, before execution of the copy to the transmission buffer, and thereby copying the output data from the output synchronization buffer to the transmission buffer at a timing when the output data is to be transmitted from the transmission buffer in the first control cycle of an execution cycle following an execution cycle in which the control program that produced the output data is executed.

According to the thirteenth embodiment, when the PLC system program employs the three-buffer schemes of the sixth through ninth embodiments, input data reception and output data transmission synchronous with execution cycles of a control program can be achieved by slightly changing the algorithm.

S. Support Device

Next, the PLC support device 8 for, for example, producing a program to be executed by the PLC 1 and maintaining the PLC 1, will be described.

Figure 32:
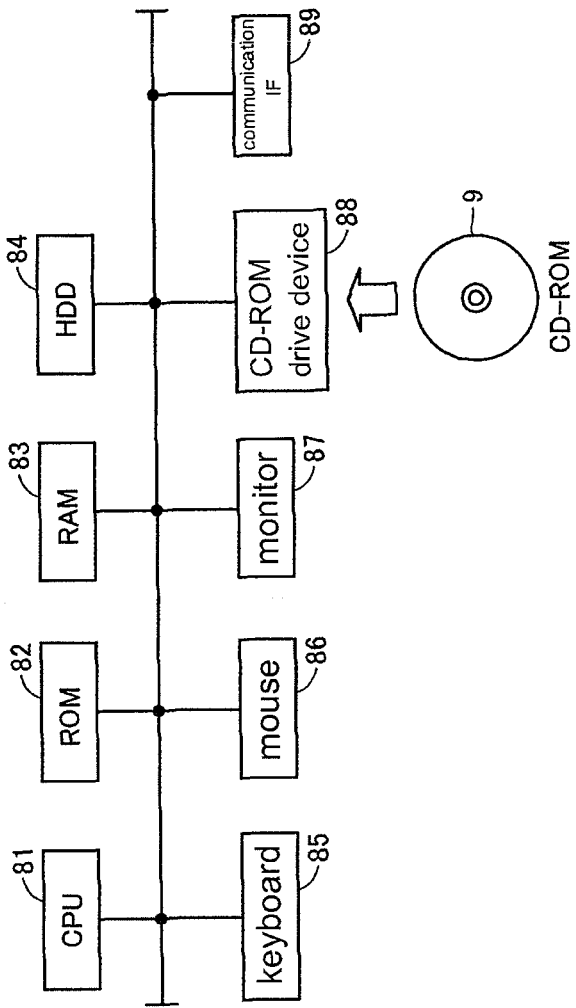
FIG. 32 is a schematic diagram showing a hardware configuration of a PLC support device which is, in use, connected to the CPU unit of the embodiment of the present disclosure.

FIG. 32 is a schematic diagram showing a hardware configuration of the PLC support device 8 which is, in use, connected to the CPU unit of this embodiment of the present disclosure. Referring to FIG. 32, the PLC support device 8 is typically configured using a general-purpose computer. Note that a highly portable notebook-type personal computer is preferable in terms of maintenance.

Referring to FIG. 32, the PLC support device 8 includes a CPU 81 which executes various programs including an OS, a ROM (Read Only Memory) 82 which stores a BIOS and various kinds of data, a memory RAM 83 which provides a working area for storing data required for execution of a program in the CPU 81, and a hard disk (HDD) 84 which stores the program executed by the CPU 81 in a non-volatile manner.

The PLC support device 8 further includes a keyboard 85 and a mouse 86 which receive the user's operation, and a monitor 87 which presents information to the user. The PLC support device 8 further includes a communication interface (IF) 89 for communicating with the PLC 1 (the CPU unit 13) etc.

As described below, various programs executed by the PLC support device 8 are distributed on a CD-ROM 9. The program stored on the CD-ROM 9 is read by a CD-ROM (Compact Disk-Read Only Memory) drive 88, and stored into the hard disk (HDD) 84 etc. Alternatively, the program may be downloaded from a host computer at a higher level via a network.

As described above, the PLC support device 8 is implemented using a general-purpose computer, and therefore, will not be described in greater detail.

Figure 33:
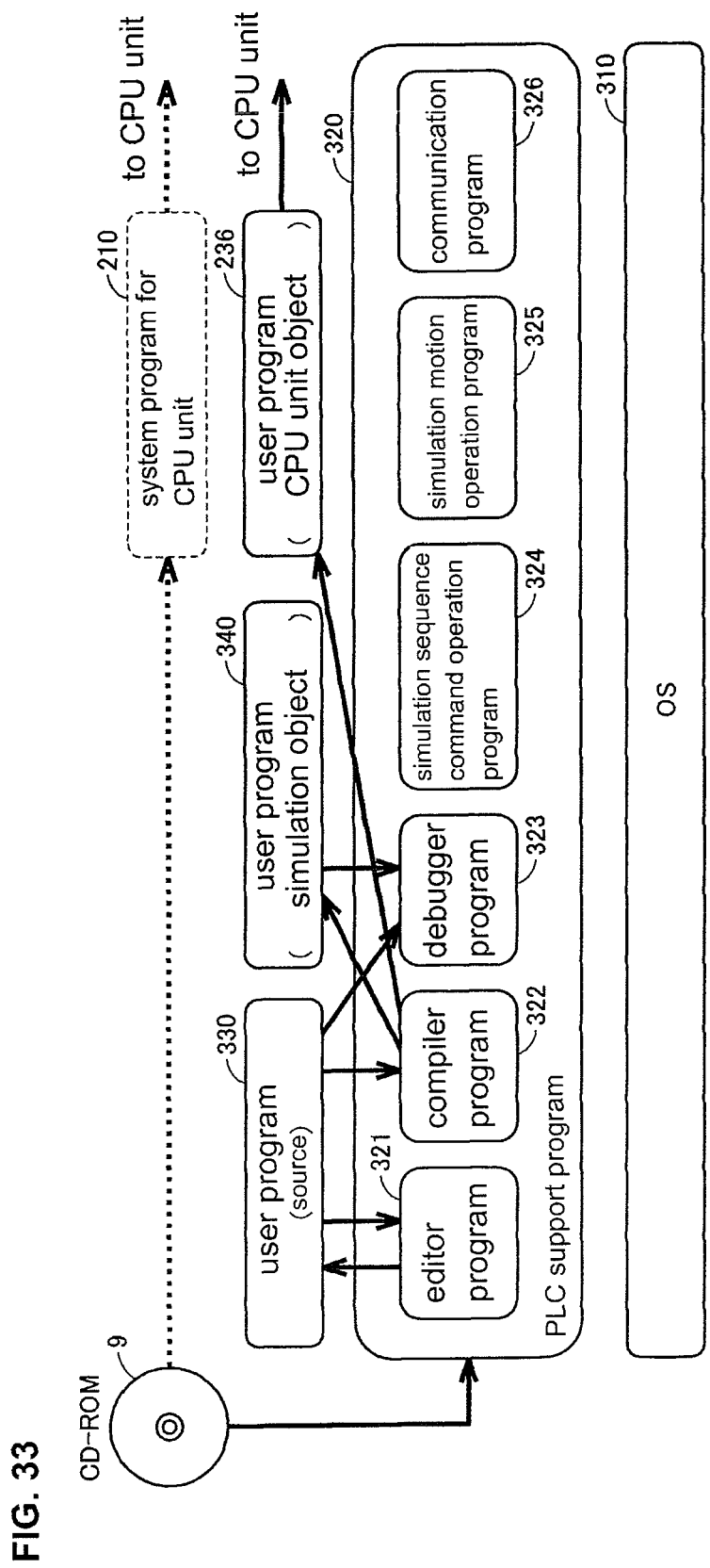
FIG. 33 is a schematic diagram showing a software configuration of the PLC support device which is, in use, connected to the CPU unit of the embodiment of the present disclosure.

FIG. 33 is a schematic diagram showing a software configuration of the PLC support device 8 which is, in use, connected to the CPU unit of this embodiment of the present disclosure. Referring to FIG. 33, in the PLC support device 8, an OS 310 is executed, and an environment is provided in which various programs contained in a PLC support program 320 can be executed.

The PLC support program 320 includes an editor program 321, a compiler program 322, a debugger program 323, a simulation sequence command operation program 324, a simulation motion operation program 325, and a communication program 326. The programs contained in the PLC support program 320 are typically distributed on the CD-ROM 9, and installed in the PLC support device 8.

The editor program 321 provides a function, such as inputting and editing, for producing a user program 236. More specifically, the editor program 321 provides a function of enabling the user to produce a source program 330 for the user program 236 by operating the keyboard 85 or the mouse 86, and in addition, functions of saving and editing the produced source program 330. The editor program 321 receives an external source program for the control program 230 (particularly, the user program 236), or edits an existing source program for the control program 230 based on the user's operation.

The compiler program 322 provides a function of compiling the source program for the control program 230 to produce the user program 236 in the form of an object program which is executable by the microprocessor 100 of the CPU unit 13. The compiler program 322 also provides a function of compiling the source program 330 to produce a user program 340 in the form of an object program which is executable by the CPU 81 of the PLC support device 8. The user program 340 is a simulation object program which is used by the PLC support device 8 to simulate an operation of the PLC 1.

The debugger program 323 provides a function for debugging the source program for the control program 230. This debugging includes executing a partial range of the source program specified by the user, tracking changes in the value of a variable over time when the source program is being executed, etc.

The debugger program 323 further provides a function of executing the simulation object program for the control program 230. In this simulation, a simulation sequence command operation program 324 and a simulation motion operation program 325 which are contained in the PLC support program 320 are used instead of the sequence command operation program 232 and the motion operation program 234 which are contained in the system program of the CPU unit 13.

The communication program 326 provides a function of transferring the object program for the CPU unit 13 of the control program 230 to the CPU unit 13 of the PLC 1.

Typically, the system program 210 is installed in the PLC 1 by being stored into the non-volatile memory 106 of the CPU unit 13 during manufacture of the CPU unit 13. Note that if the system program 210 is stored on the CD-ROM 9, the user may copy the system program 210 on the CD-ROM 9 to the PLC support device 8, and transfers the copied system program 210 to the CPU unit 13 using the function provided by the communication program 326. Moreover, if the real-time OS 200 which is executed by the CPU unit 13 of the PLC 1 is stored on the CD-ROM 9, the real-time OS 200 can be reinstalled by the user's operation.

T. Other Embodiments

The sequence diagrams of FIGS. 13, 15, 18, and 21 show example operations of a PLC including a multi-core microprocessor.

For example, if a microprocessor having a first core and a second core is employed, an input/output process and a control program can be executed in parallel by the first core and the second core, respectively, in an actual implementation. However, the control program which is executed by the PLC uses received input data to produce output data to be transmitted, and therefore, the input/output process and the control program are normally alternately executed. Also, the input/output process is preferably executed in each control cycle and at as fixed intervals as possible.

The above constraint on the control program which is executed by the PLC also exists when a multi-core microprocessor is employed. Therefore, even when a multi-core microprocessor is employed, then if an input/output process and a control program are always executed in parallel by the first core and the second core, respectively, more useless operations which do not contribute to a control operation are executed.

On the other hand, the execution time of a control program varies depending on conditions, such as the contents of input data etc., and therefore, if the period of the control cycle is set to be slightly longer than the average execution time of the control program, the control program whose execution has started since the end of an input/output process may not end before the start of the next input/output process.

This problem may be addressed in the following manner when a single-core microprocessor is employed.

The control cycle is extended until the execution of the control program ends (in this case, the period of the input/output process is not fixed).

The execution of the control program is interrupted to perform an input/output process, and thereafter, the execution of the control program is restarted (the execution of the control program which would otherwise be newly started in the restarted control cycle is cancelled).

In contrast to this, when a multi-core microprocessor is employed, an input/output process and a control program can be executed in parallel, and therefore, even if execution of the control program does not end in a control cycle, the execution is continued, and thereafter, if the execution ends in the next control cycle, execution of the control program can be continuously and newly started. This idea is embodied in the operation of FIG. 13 etc.

A PLC having such an operation is described as follows. Specifically, a CPU unit of a PLC controlling an object of control includes a microprocessor, storage means, and a communication circuit. The CPU unit of a PLC is configured to control the object of control by repeating transmission of output data, reception of input data and execution of a control program producing the output data using the input data. The storage means is used for storing the control program and the system program. The microprocessor has at least a first core and a second core. The communication circuit transmits the output data and receives the input data. The system program is executed by any of the cores of the microprocessor. The system program includes processes for causing the first and second cores to operate as follows. Specifically, the first core controls execution of an input/output process including allowing output data produced by the control program to be transmitted at each control cycle, and allowing received input data to be used by the control program. The second core (1) starts a first execution of the control program after the end of execution of the input/output process in a first control cycle, (2) if the first execution of the control program ends before the end of execution of the input/output process in a second control cycle following the first control cycle, starts a second execution of the control program after the end of execution of the input/output process in the second control cycle, and (3) if the first execution of the control program does not end before the end of execution of the input/output process in the second control cycle, starts a second execution of the control program without waiting for the end of execution of the input/output process in a third control cycle following the second control cycle.

According to the PLC, even when the execution of the control program of which the first execution has started in the first control cycle does not end before the start of the input/output process in the second control cycle, the first execution of the control program may end before the end of the input/output process. In this case, the control program whose execution is newly started after the end of the input/output process can use new input data.

Also, when the execution of the control program of which the first execution has started in the first control cycle does not end before the end of the input/output process in the second control cycle, the start of the second execution of the control program is delayed. However, if the average execution time of the control program is shorter than a period of time from the end of the input/output process to the start of the next input/output process, control is highly likely to return to the state in which execution of the control program starts following the end of the input/output process, within several control cycles.

Before that time, the PLC can operate in a state in which newly received input data is used by the control program as much as possible, and newly produced data is transmitted as much as possible.

The present embodiments are to be considered in all respects as illustrative and not restrictive. The scope of the disclosure is indicated by the appended claims rather than by the foregoing description. All changes coming within the meaning and equivalency range of the appended claims are intended to be embraced therein.

INDEX TO THE REFERENCE NUMERALS

1 PLC, 2 field network, 3 servo motor driver, 4 servo motor, 5 remote IO terminal, 6 detection switch, 7 relay, 8 PLC support device, 9 CD-ROM, 10 connection cable, 11 PLC system bus, 12 power source unit, 13 CPU unit, 14, 53 IO unit, 15 special unit, 51 terminal bus, 52 communication coupler, 81 CPU, 83 RAM, 85 keyboard, 86 mouse, 87 monitor, 88 drive, 100 microprocessor, 102 chip set, 104 main memory, 106 non-volatile memory, 108 system timer, 110 USB connector, 120 PLC system bus controller, 122 DMA control circuit, 124 PLC system bus control circuit, 126, 146 buffer memory, 130 connector, 140 field network controller, 142 DMA control circuit, 144 field network control circuit, 200 real-time OS, 210, 220 system program, 212 scheduler program, 214 output process program, 216 input process program, 218 IO process program, 230 control program, 232 sequence command operation program, 234 motion operation program, 236, 340 user program, 320 support program, 321 editor program, 322 compiler program, 323 debugger program, 324 simulation sequence command operation program, 325 simulation motion operation program, 326 communication program, 330 source program, 1041 program area, 1042 control program working area, 1042*a* output synchronization buffer area, 1042*b* input synchronization buffer area, 1043 PLC system bus transmission buffer, 1044 PLC system bus reception buffer, 1045 field network transmission buffer, 1046 field network reception buffer, SYS system.

What is claimed is:

1. A central processor of a programmable logic controller (PLC) for controlling an object of control, the central processor being configured to control the object by repeating transmission of output data, reception of input data and execution of a control program producing the output data using the input data, comprising:

a storage that stores a system program and the control program; and a microprocessor that executes the control program and the system program;

a communication circuit that transmits the output data and receives the input data, wherein the system program comprising, as an execution preparation process for controlling the PLC:

a process for producing a reception buffer that stores the received input data in the storage, and a process for producing, for each of the input data referred to by the control program, an input synchronization buffer used by the control program as a reference target for the input data; and the system program further comprising, as an execution control process for the controlling the PLC, an input copy process for copying the received input data from the reception buffer to the input synchronization buffer corresponding to the input data, and a control program start process for starting an execution of the control program.

2. The central processor of the PLC according to claim 1,
wherein the process for producing the input synchronization buffer comprises producing a first input synchronization buffer and a second input synchronization buffer as a set of input synchronization buffers, for each of the input data referred to by the control program,
wherein to the first input synchronization buffer and the second input synchronization buffer, at least one of a write target state in which the input data can be copied from the reception buffer and a reference target state in which reference can be made by the control program, are allocated without overlapping, and
wherein the input copy process comprises copying to an input synchronization buffer that is in the write target state.

3. The central processor of the PLC according to claim 2,
wherein the process for producing the input synchronization buffer comprises producing the first input synchronization buffer, the second input synchronization buffer and a third input synchronization buffer as a set of input synchronization buffers for each of the input data referred to by the control program;
wherein to the first input synchronization buffer, the second input synchronization buffer and the third input synchronization buffer, at least one of the write target state, the reference target state and a standby state are allocated without overlapping;
wherein the input copy process further includes a first interchange process for interchanging the write target state and the standby state of the input synchronization buffer in the write target state as a copy destination and the input synchronization buffer in the standby state belonging to the same set as the input synchronization buffer; and
wherein the control program start process comprises a second interchange process for interchanging, when the input synchronization buffers for the control program of which execution is to be started, the input synchronization buffer storing latest data is in the standby state, the standby state and the reference target state of the input synchronization buffer in the standby state and the input synchronization buffer in the reference target state.

4. The central processor of the PLC according to claim 3,
wherein the system program further includes, as the execution preparation process for the control operation of the PLC, a process for producing a latest input data update flag in the storage, for each control program;
wherein the input copy process further includes a process for turning on the latest input data update flag related to the input copy process; and
wherein the control program start process further comprises, when the latest input data update flag related to the input synchronization buffers for the control program of which execution is to be started is on, the second interchange process and a process for turning off the latest input data update flag, whereby
the second interchange process executed when the input synchronization buffer storing the latest data is in the standby state is realized.

5. The central processor of the PLC according to claim 3,
wherein the system program further includes, as the execution preparation process for the control operation of the PLC, a process for generating a latest state recording area in the storage;
wherein the input copy process further includes a process for recording that the input synchronization buffer as a copy destination is in the latest state in the latest state recording area; and
the control program start process further includes the second interchange process executed when the input synchronization buffer in the latest state specified by contents in the latest state recording area is in the standby state.

6. The central processor of the PLC according to claim 2,
wherein the control program start process further includes a third interchange process for interchanging, when the input synchronization buffers for the control program of which execution is to be started, the input synchronization buffer storing latest data is in the write target state, the write target state of the input synchronization buffer in the write target state and the reference target state of the input synchronization buffer in the reference target state.

7. The central processor of the PLC according to claim 1,
wherein the process for generating the input synchronization buffer comprises generating a first input synchronization buffer and a second input synchronization buffer as a set of synchronization buffers, for each input data referred to by the control program,
wherein the system program further includes, as the execution preparation process for the control operation of the PLC, a process for generating a latest state recording area in the storage,
wherein the input copy process further includes a process for recording that the input synchronization buffer as a copy destination is in the latest state in the latest state recording area, and
wherein the control program start process further includes a process for setting the input synchronization buffer in the latest state specified by contents in the latest state recording area to the reference target state to be referred to in executing the control program.

8. The central processor of the PLC according to claim 1,
wherein the control program start process further includes a process for setting the input synchronization buffer to be referred to by the control program of which execution is to be started to a write protected state,
wherein the system program further includes, as the execution control process for the control operation of the PLC, a process for cancelling, when execution of the control program ends, the write protected state of the synchronization buffer that has been in the write protected state, and
wherein the input copy process is executed when the input synchronization buffer as a copy destination is not in the write protected state.

9. The central processor of the PLC according to claim 1,
wherein the process for generating the input synchronization buffer comprises generating a first input synchronization buffer and a second input synchronization buffer as a set of synchronization buffers, for each input data referred to by the control program,
wherein the second input synchronization buffer is an input synchronization buffer used as a reference target by the control program referring to input data,
wherein the input copy process comprises copying to the first input synchronization buffer, and
wherein the control program start process further includes copying data stored in the first input synchronization buffer to the second input synchronization buffer before starting execution of the control program.

10. The central processor of the PLC according to claim 1,
wherein the system program further includes, as the execution preparation process for the control operation of the PLC,
a process for generating a transmission buffer for storing output data to be transmitted in the storage, and
a process for generating an output synchronization buffer for storing the output data to be copied to the transmission buffer in the storage, for each of the output data;
wherein the system program further includes, as the execution control process for the control operation of the PLC,
an output copy process for copying the output data from the output synchronization buffer to the transmission buffer.

11. The central processor of the PLC according to claim 10, wherein
the output copy process comprises copying the output data when execution of the control program ends.

12. The central processor of the PLC according to claim 10,
wherein the system program further includes, as the execution preparation process for the control operation of the PLC, a process for producing an operation buffer used by the control program for storing the output data, in the storage,
wherein the process for generating the output synchronization buffer comprises generating a first output synchronization buffer, a second output synchronization buffer and a third output synchronization buffer as a set of output synchronization buffers for each of the output data,
wherein to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping,
wherein the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer; and
wherein the output copy process is for executing, when the output synchronization buffer storing the latest data is in the standby state, a fifth interchange process for interchanging the standby state and the reference target state of the output synchronization buffer in the standby state and the output synchronization buffer in the reference target state, and copying the output data from the output synchronization buffer set to the reference target state to the transmission buffer.

13. The central processor of the PLC according to claim 1,
wherein reception of the input data is executed at each control cycle,
wherein the input copy process comprises copying the received input data from the reception buffer to the input synchronization buffer corresponding to the input data, when the input data is received at a reception timing related to the control cycle in which an execution cycle of the control program started, and
wherein the control program start process comprises starting execution of the control program at every the execution cycle as an integral multiple of the control cycle.

14. The central processor of the PLC according to claim 1,
wherein the process for generating the input synchronization buffer comprises generating a first input synchronization buffer, a second input synchronization buffer and a third input synchronization buffer as a set of input synchronization buffers, for each input data referred to by the control program;
wherein to the first input synchronization buffer, the second input synchronization buffer and the third input synchronization buffer, at least one of a write target state in which the input data can be copied from the reception buffer, a reference target state in which reference can be made by the control program, and a standby state are allocated without overlapping;
wherein reception of the input data is executed at each control cycle;
wherein the input copy process comprises copying to the input synchronization buffer in the write target state and further executing a first interchange process for interchanging the write target state and the standby state of the input synchronization buffer in the write target state as a copy destination and the input synchronization buffer in the standby state belonging to the same set as the input synchronization buffer;
wherein the system program further includes, as an execution control process for the control operation of the PLC, an execution cycle input initial process for executing, when the control cycle in which an execution cycle of the control program started, a second interchange process for interchanging the standby state and the reference target state of the input synchronization buffer in the standby state and the input synchronization buffer in the reference target state; and
wherein the control program start process comprises starting execution of the control program at every execution cycle as an integer multiple of the control cycle.

15. The central processor of the PLC according to claim 1,
wherein the system program further includes, as the execution preparation process for the control operation of the PLC,
a process for generating a transmission buffer for storing output data to be transmitted in the storage, and
a process for generating an output synchronization buffer for storing the output data to be copied to the transmission buffer in the storage, for each of the output data,
wherein the system program further includes, as the execution control process for the control operation of the PLC,
an output copy process for copying the output data from the output synchronization buffer to the transmission buffer, at a timing when the output data is to be transmitted from the transmission buffer in a first control cycle of the execution cycle following the execution cycle in which the control program that produced the output data is executed.

16. The central processor of the PLC according to claim 15,
wherein the system program further includes, as the execution preparation process for the control operation of the PLC, a process for generating an operation buffer used by the control program for storing the output data, in the storage,
wherein the process for generating the output synchronization buffer comprises generating a first output synchronization buffer, a second output synchronization buffer and a third output synchronization buffer as a set of output synchronization buffers for each of the output data, wherein to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping, wherein the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer; and wherein the output copy process comprises copying the output data from the output synchronization buffer in the reference target state to the transmission buffer after the start of each control cycle before transmission of the output data from the transmission buffer, executing, when it is the control cycle in which an execution cycle of the control program started, a fifth interchange process for interchanging the standby state and the reference target state of the output synchronization buffer in the standby state and the output synchronization buffer in the reference target state, before execution of the copy to the transmission buffer, and thereby copying the output data from the output synchronization buffer to the transmission buffer at a timing when the output data is to be transmitted from the transmission buffer in a first control cycle of the execution cycle following the execution cycle in which the control program that produced the output data is executed.

17. A method for transferring data between an input/output process and a control program in a programmable logic circuit (PLC), the method comprising:

storing a system program and a control program;
executing the system program and the control program;
transmitting output data and receiving input data;
generating, with the system program as an execution preparation process, a reception buffer for storing the received input data in the storage, and
generating, with the system program as an execution preparation process, for each input data referred to by the control program, an input synchronization buffer used by the control program as a reference target for the input data; and
the system program causes, as an execution control process for the control operation of the PLC,
executing, with the system program as an execution control process, an input copy process for copying the received input data from the reception buffer to the input synchronization buffer corresponding to the input data, and
executing, with the system program as an execution control process, a control program start process for starting execution of the control program.

18. The method according to claim 17, wherein generating the input synchronization buffer comprises generating a first input synchronization buffer and a second input synchronization buffer as a set of input synchronization buffers, for each input data referred to by the control program, wherein to the first input synchronization buffer and the second input synchronization buffer, at least one of a write target state in which the input data can be copied from the reception buffer and a reference target state in which reference can be made by the control program, are allocated without overlapping, and wherein the input copy process comprises copying to the input synchronization buffer which is in the write target state.

19. The method according to claim 18, wherein generating the input synchronization buffer comprises generating the first input synchronization buffer, the second input synchronization buffer and a third input synchronization buffer as a set of input synchronization buffers for each of the input data referred to by the control program, wherein to the first input synchronization buffer, the second input synchronization buffer and the third input synchronization buffer, at least one of the write target state, the reference target state and a standby state are allocated without overlapping, wherein the input copy process further includes a first interchange process for interchanging the write target state and the standby state of the input synchronization buffer in the write target state as a copy destination and the input synchronization buffer in the standby state belonging to the same set as the input synchronization buffer, wherein the control program start process further includes a second interchange process for interchanging, when the input synchronization buffers for the control program of which execution is to be started, the input synchronization buffer storing latest data is in the standby state, the standby state and the reference target state of the input synchronization buffer in the standby state and the input synchronization buffer in the reference target state.

20. The method according to claim 18, wherein the control program start process further includes a third interchange process for interchanging, when the input synchronization buffers for the control program of which execution is to be started, the input synchronization buffer storing latest data is in the write target state, the write target state of the input synchronization buffer in the write target state and the reference target state of the input synchronization buffer in the reference target state.

21. The method according to claim 17, wherein generating the input synchronization buffer comprises generating a first input synchronization buffer and a second input synchronization buffer as a set of synchronization buffers, for each input data referred to by the control program, wherein the system program further includes, as the execution preparation process for the control operation of the PLC, a process for generating a latest state recording area in the storage, wherein the input copy process further includes a process for recording that the input synchronization buffer as a copy destination is in the latest state in the latest state recording area, and wherein the control program start process further includes a process for setting the input synchronization buffer in the latest state specified by contents in the latest state recording area to the reference target state to be referred to in executing the control program.

22. The method according to claim 17, wherein the control program start process further includes setting the input synchronization buffer to be referred to by the control program of which execution is to be started to a write protected state, wherein the system program further includes, as the execution control process for the control operation of the PLC, a process for cancelling, when execution of the control program ends, the write protected state of the synchronization buffer that has been in the write protected state, and wherein the input copy process is executed when the input synchronization buffer as a copy destination is not in the write protected state.

23. The method according to claim 17, wherein the process for generating the input synchronization buffer comprises generating a first input synchronization buffer and a second input synchronization buffer as a set of synchronization buffers, for each input data referred to by the control program, wherein the second input synchronization buffer is an input synchronization buffer used as a reference target by the control program referring to input data, wherein the input copy process comprises copying to the first input synchronization buffer, and wherein the control program start process further includes a process for copying data stored in the first input synchronization buffer to the second input synchronization buffer before starting execution of the control program.

24. The method according to claim 17, wherein the system program further includes, as the execution preparation process for the control operation of the PLC, a process for generating a transmission buffer for storing output data to be transmitted in the storage, and a process for generating an output synchronization buffer for storing the output data to be copied to the transmission buffer in the storage, for each of the output data, and wherein the system program further includes, as the execution control process for the control operation of the PLC, an output copy process for copying the output data from the output synchronization buffer to the transmission buffer.

25. The method according to claim 24, wherein the output copy process comprises copying the output data when execution of the control program ends.

26. The method according to claim 24, wherein the system program further includes, as the execution preparation process for the control operation of the PLC, a process for generating an operation buffer used by the control program for storing the output data, in the storage, wherein the process for generating the output synchronization buffer comprises generating a first output synchronization buffer, a second output synchronization buffer and a third output synchronization buffer as a set of output synchronization buffers for each of the output data, wherein to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping, wherein the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer, and wherein the output copy process is for executing, when the output synchronization buffer storing the latest data is in the standby state, a fifth interchange process for interchanging the standby state and the reference target state of the output synchronization buffer in the standby state and the output synchronization buffer in the reference target state, and copying the output data from the output synchronization buffer set to the reference target state to the transmission buffer.

27. The method according to claim 17, wherein reception of the input data is executed at each control cycle, wherein the input copy process comprises copying the received input data from the reception buffer to the input synchronization buffer corresponding to the input data, when the input data is received at a reception timing related to the control cycle in which an execution cycle of the control program started, and wherein the control program start process comprises starting execution of the control program at every the execution cycle as an integer multiple of the control cycle.

28. The method according to claim 17, wherein the process for generating the input synchronization buffer comprises generating a first input synchronization buffer, a second input synchronization buffer and a third input synchronization buffer as a set of input synchronization buffers, for each input data referred to by the control program, wherein to the first input synchronization buffer, the second input synchronization buffer and the third input synchronization buffer, at least one of a write target state in which the input data can be copied from the reception buffer, a reference target state in which reference can be made by the control program, and a standby state are allocated without overlapping, wherein reception of the input data is executed at each control cycle, wherein the input copy process comprises for copying to the input synchronization buffer in the write target state and further executing a first interchange process for interchanging the write target state and the standby state of the input synchronization buffer in the write target state as a copy destination and the input synchronization buffer in the standby state belonging to the same set as the input synchronization buffer, wherein the system program further includes, as an execution control process for the control operation of the PLC, an execution cycle input initial process for executing, when it is the control cycle in which an execution cycle of the control program started, a second interchange process for interchanging the standby state and the reference target state of the input synchronization buffer in the standby state and the input synchronization buffer in the reference target state, and wherein the control program start process comprises starting execution of the control program at every the execution cycle as an integer multiple of the control cycle.

29. The method according to claim 17, wherein the system program further includes, as the execution preparation process for the control operation of the PLC, a process for generating a transmission buffer for storing output data to be transmitted in the storage, and a process for generating an output synchronization buffer for storing the output data to be copied to the transmission buffer in the storage, for each output data and wherein the system program further includes, as the execution control process for the control operation of the PLC, an output copy process for copying the output data from the output synchronization buffer to the transmission buffer, at a timing when the output data is to be transmitted from the transmission buffer in a first control cycle of the execution cycle following the execution cycle in which the control program that produced the output data is executed.

30. The method according to claim 29, wherein the system program further includes, as the execution preparation process for the control operation of the PLC, a process for generating an operation buffer used by the control program for storing the output data, in the storage, wherein the process for generating the output synchronization buffer comprises generating a first output synchronization buffer, a second output synchronization buffer and a third output synchronization buffer as a set of output synchronization buffers for each of the output data, wherein to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping, wherein the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer, and wherein the output copy process comprises copying the output data from the output synchronization buffer in the reference target state to the transmission buffer after the start of each control cycle before transmission of the output data from the transmission buffer, executing, when it is the control cycle in which an execution cycle of the control program started, a fifth interchange process for interchanging the standby state and the reference target state of the output synchronization buffer in the standby state and the output synchronization buffer in the reference target state, before execution of the copy to the transmission buffer, and thereby copying the output data from the output synchronization buffer to the transmission buffer at a timing when the output data is to be transmitted from the transmission buffer in a first control cycle of the execution cycle following the execution cycle in which the control program that produced the output data is executed.

31. A non-transitory computer readable medium storing a program that allows a computer apparatus to perform a process for transferring data between an input/output process and a control program in a programmable logic circuit (PLC), the program allowing the computer apparatus to perform:

storing a system program and a control program;

executing the system program and the control program;
transmitting output data and receiving input data;
generating, with the system program as an execution preparation process, a reception buffer for storing the received input data in the storage, and
generating, with the system program as an execution preparation process, for each input data referred to by the control program, an input synchronization buffer used by the control program as a reference target for the input data; and
the system program causes, as an execution control process for the control operation of the PLC,
executing, with the system program as an execution control process, an input copy process for copying the received input data from the reception buffer to the input synchronization buffer corresponding to the input data, and
executing, with the system program as an execution control process, a control program start process for starting execution of the control program.

32. The non-transitory computer readable medium according to claim 31, wherein generating the input synchronization buffer comprises generating a first input synchronization buffer and a second input synchronization buffer as a set of input synchronization buffers, for each input data referred to by the control program, wherein to the first input synchronization buffer and the second input synchronization buffer, at least one of a write target state in which the input data can be copied from the reception buffer and a reference target state in which reference can be made by the control program, are allocated without overlapping, and wherein the input copy process comprises copying to the input synchronization buffer which is in the write target state.

33. The non-transitory computer readable medium according to claim 32, wherein generating the input synchronization buffer comprises generating the first input synchronization buffer, the second input synchronization buffer and a third input synchronization buffer as a set of input synchronization buffers for each of the input data referred to by the control program, wherein to the first input synchronization buffer, the second input synchronization buffer and the third input synchronization buffer, at least one of the write target state, the reference target state and a standby state are allocated without overlapping, wherein the input copy process further includes a first interchange process for interchanging the write target state and the standby state of the input synchronization buffer in the write target state as a copy destination and the input synchronization buffer in the standby state belonging to the same set as the input synchronization buffer, wherein the control program start process further includes a second interchange process for interchanging, when the input synchronization buffers for the control program of which execution is to be started, the input synchronization buffer storing latest data is in the standby state, the standby state and the reference target state of the input synchronization buffer in the standby state and the input synchronization buffer in the reference target state.

34. The non-transitory computer readable medium according to claim 32, wherein the control program start process further includes a third interchange process for interchanging, when the input synchronization buffers for the control program of which execution is to be started, the input synchronization buffer storing latest data is in the write target state, the write target state of the input synchronization buffer in the write target state and the reference target state of the input synchronization buffer in the reference target state.

35. The non-transitory computer readable medium according to claim 31, wherein generating the input synchronization buffer comprises generating a first input synchronization buffer and a second input synchronization buffer as a set of synchronization buffers, for each input data referred to by the control program,
- wherein the system program further includes, as the execution preparation process for the control operation of the PLC, a process for generating a latest state recording area in the storage,
- wherein the input copy process further includes a process for recording that the input synchronization buffer as a copy destination is in the latest state in the latest state recording area, and
- wherein the control program start process further includes a process for setting the input synchronization buffer in the latest state specified by contents in the latest state recording area to the reference target state to be referred to in executing the control program.

36. The non-transitory computer readable medium according to claim 31, wherein the control program start process further includes setting the input synchronization buffer to be referred to by the control program of which execution is to be started to a write protected state,
- wherein the system program further includes, as the execution control process for the control operation of the PLC, a process for cancelling, when execution of the control program ends, the write protected state of the synchronization buffer that has been in the write protected state, and
- wherein the input copy process is executed when the input synchronization buffer as a copy destination is not in the write protected state.

37. The non-transitory computer readable medium according to claim 31, wherein the process for generating the input synchronization buffer comprises generating a first input synchronization buffer and a second input synchronization buffer as a set of synchronization buffers, for each input data referred to by the control program,
- wherein the second input synchronization buffer is an input synchronization buffer used as a reference target by the control program referring to input data,
- wherein the input copy process comprises copying to the first input synchronization buffer, and
- wherein the control program start process further includes a process for copying data stored in the first input synchronization buffer to the second input synchronization buffer before starting execution of the control program.

38. The non-transitory computer readable medium according to claim 31, wherein the system program further includes, as the execution preparation process for the control operation of the PLC,
- a process for generating a transmission buffer for storing output data to be transmitted in the storage, and
- a process for generating an output synchronization buffer for storing the output data to be copied to the transmission buffer in the storage, for each of the output data, and
- wherein the system program further includes, as the execution control process for the control operation of the PLC, an output copy process for copying the output data from the output synchronization buffer to the transmission buffer.

39. The non-transitory computer readable medium according to claim 38, wherein the output copy process comprises copying the output data when execution of the control program ends.

40. The non-transitory computer readable medium according to claim 38, wherein the system program further includes, as the execution preparation process for the control operation of the PLC, a process for generating an operation buffer used by the control program for storing the output data, in the storage,
- wherein the process for generating the output synchronization buffer comprises generating a first output synchronization buffer, a second output synchronization buffer and a third output synchronization buffer as a set of output synchronization buffers for each of the output data,
- wherein to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping,
- wherein the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer, and
- wherein the output copy process is for executing, when the output synchronization buffer storing the latest data is in the standby state, a fifth interchange process for interchanging the standby state and the reference target state of the output synchronization buffer in the standby state and the output synchronization buffer in the reference target state, and copying the output data from the output synchronization buffer set to the reference target state to the transmission buffer.

41. The non-transitory computer readable medium according to claim 31, wherein reception of the input data is executed at each control cycle,
- wherein the input copy process comprises copying the received input data from the reception buffer to the input synchronization buffer corresponding to the input data, when the input data is received at a reception timing related to the control cycle in which an execution cycle of the control program started, and
- wherein the control program start process comprises starting execution of the control program at every the execution cycle as an integer multiple of the control cycle.

42. The non-transitory computer readable medium according to claim 31, wherein the process for generating the input synchronization buffer comprises generating a first input synchronization buffer, a second input synchronization buffer and a third input synchronization buffer as a set of input synchronization buffers, for each input data referred to by the control program,
- wherein to the first input synchronization buffer, the second input synchronization buffer and the third input synchronization buffer, at least one of a write target state in which the input data can be copied from the reception buffer, a reference target state in which reference can be made by the control program, and a standby state are allocated without overlapping, wherein reception of the input data is executed at each control cycle, wherein the input copy process comprises for copying to the input synchronization buffer in the write target state and further executing a first interchange process for interchanging the write target state and the standby state of the input synchronization buffer in the write target state as a copy destination and the input synchronization buffer in the standby state belonging to the same set as the input synchronization buffer, wherein the system program further includes, as an execution control process for the control operation of the PLC, an execution cycle input initial process for executing, when it is the control cycle in which an execution cycle of the control program started, a second interchange process for interchanging the standby state and the reference target state of the input synchronization buffer in the standby state and the input synchronization buffer in the reference target state, and wherein the control program start process comprises starting execution of the control program at every the execution cycle as an integer multiple of the control cycle.

43. The non-transitory computer readable medium according to claim 31, wherein the system program further includes, as the execution preparation process for the control operation of the PLC, a process for generating a transmission buffer for storing output data to be transmitted in the storage, and a process for generating an output synchronization buffer for storing the output data to be copied to the transmission buffer in the storage, for each the output data and wherein the system program further includes, as the execution control process for the control operation of the PLC, an output copy process for copying the output data from the output synchronization buffer to the transmission buffer, at a timing when the output data is to be transmitted from the transmission buffer in a first control cycle of the execution cycle following the execution cycle in which the control program that produced the output data is executed.

44. The non-transitory computer readable medium according to claim 43, wherein the system program further includes, as the execution preparation process for the control operation of the PLC, a process for generating an operation buffer used by the control program for storing the output data, in the storage, wherein the process for generating the output synchronization buffer comprises generating a first output synchronization buffer, a second output synchronization buffer and a third output synchronization buffer as a set of output synchronization buffers for each of the output data, wherein to the first output synchronization buffer, the second output synchronization buffer and the third output synchronization buffer, at least one of a write target state in which the output data can be copied from the operation buffer, a reference target state in which reference can be made for copying to the transmission buffer, and a standby state are allocated without overlapping, wherein the system program further includes, as the execution control process for the control operation of the PLC, an output synchronization buffer storage process for copying, when execution of the control program ends, the output data produced by the execution of the control program from the operation buffer to the output synchronization buffer in the write target state and for executing a fourth interchange process for interchanging the write target state and the standby state of the output synchronization buffer in the write target state as the copy destination and the output synchronization buffer in the standby state in the same set as the output synchronization buffer, and wherein the output copy process comprises copying the output data from the output synchronization buffer in the reference target state to the transmission buffer after the start of each control cycle before transmission of the output data from the transmission buffer, executing, when it is the control cycle in which an execution cycle of the control program started, a fifth interchange process for interchanging the standby state and the reference target state of the output synchronization buffer in the standby state and the output synchronization buffer in the reference target state, before execution of the copy to the transmission buffer, and thereby copying the output data from the output synchronization buffer to the transmission buffer at a timing when the output data is to be transmitted from the transmission buffer in a first control cycle of the execution cycle following the execution cycle in which the control program that produced the output data is executed.

* * * * *